US012724712B2

(12) United States Patent
Oswald et al.

(10) Patent No.: US 12,724,712 B2
(45) Date of Patent: Sep. 1, 2026

(54) SCOPE TREE CONSISTENCY PROTOCOL FOR CACHE COHERENCE

(71) Applicant: NVIDIA CORPORATION, Santa Clara, CA (US)

(72) Inventors: Nicolai Alexander Oswald, San Jose, CA (US); Evgeny Bolotin, Kenmore, WA (US); Daniel Joseph Lustig, Woburn, MA (US); David Nellans, Round Rock, TX (US); Sean J. Treichler, Piedmont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 98 days.

(21) Appl. No.: 18/625,084

(22) Filed: Apr. 2, 2024

(65) Prior Publication Data

US 2025/0307148 A1 Oct. 2, 2025

(51) Int. Cl.

| | |
|---|---|
| ***G06F 12/0815*** | (2016.01) |
| ***G06F 12/0811*** | (2016.01) |
| ***G06F 12/0817*** | (2016.01) |
| ***G06F 12/0842*** | (2016.01) |

(52) U.S. Cl.

CPC ...... *G06F 12/0815* (2013.01); *G06F 12/0811* (2013.01); *G06F 12/0817* (2013.01); *G06F 12/0842* (2013.01)

(58) Field of Classification Search

None

See application file for complete search history.

(56) References Cited

U.S. PATENT DOCUMENTS

| | | | | |
|---|---|---|---|---|
| 11,068,410 | B2 * | 7/2021 | Ros | G06F 12/0808 |
| 2010/0110934 | A1 | 5/2010 | Li et al. | |
| 2012/0159080 | A1 | 6/2012 | Donley et al. | |
| 2013/0044924 | A1 * | 2/2013 | Spencer | G06V 10/955 600/463 |
| 2013/0047162 | A1 * | 2/2013 | Stefanov | G06F 9/5033 718/102 |
| 2014/0032854 | A1 | 1/2014 | Lih et al. | |

(Continued)

OTHER PUBLICATIONS

Non Final Office Action received for U.S. Appl. No. 18/625,104 dated Jun. 20, 2025, 11 pages.

(Continued)

*Primary Examiner* — Kaushikkumar M Patel

(74) *Attorney, Agent, or Firm* — Artegis Law Group, LLP

(57) ABSTRACT

Various embodiments include techniques for migrating points of coherence (PoCs) in a cache hierarchy. The techniques comprise receiving, at a first cache memory and from a second cache memory, a memory access request associated with a first scope group, and, in response to determining a first directory within the first cache memory includes a first entry indicating (i) a third cache memory is a child of the first cache memory in a tree associated with the first scope group, and (ii) the first cache memory is a root of the tree associated with the first scope group: performing one or more operations to acquire a PoC token from a descendant cache memory of the first cache memory in the tree associated with the first scope group, and updating the first entry to indicate that the first cache memory is a PoC of the tree associated with the first scope group.

20 Claims, 27 Drawing Sheets

(56) References Cited

U.S. PATENT DOCUMENTS

| | | | | |
|---|---|---|---|---|
| 2014/0337587 | A1* | 11/2014 | Hower .................... | G06F 9/522 711/154 |
| 2015/0058567 | A1 | 2/2015 | Hechtman et al. | |
| 2016/0139624 | A1* | 5/2016 | Orr ..................... | G06F 12/0871 713/400 |
| 2018/0088858 | A1* | 3/2018 | Basu ..................... | G06F 3/0679 |
| 2020/0278930 | A1 | 9/2020 | Eckert et al. | |
| 2022/0100391 | A1 | 3/2022 | LeBeane et al. | |
| 2023/0032278 | A1 | 2/2023 | Zhu et al. | |

OTHER PUBLICATIONS

Sinclair et al., "Efficient GPU synchronization without scopes: Saying no to complex consistency models," 2015 48th Annual IEEE/ACM International Symposium on Microarchitecture (MICRO), 2015, pp. 647-659, doi: 10.1145/2830772.2830821., 13 pages.

Ren et al., "HMG: Extending Cache Coherence Protocols Across Modern Hierarchical Multi-GPU Systems," 2020 IEEE International Symposium on High Performance Computer Architecture (HPCA), San Diego, CA, USA, 2020, pp. 582-595, doi: 10.1109/HPCA47549.2020.00054, 14 pages.

Notice of Allowance received for U.S. Appl. No. 18/625,104 dated Oct. 27, 2025, 9 pages.

Non Final Office Action received for U.S. Appl. No. 18/625,106 dated Oct. 30, 2025, 22 pages.

Notice of Allowance received for U.S. Appl. No. 18/625,106 dated Mar. 11, 2026, 10 pages.

* cited by examiner

SCOPE TREE CONSISTENCY PROTOCOL FOR CACHE COHERENCE

BACKGROUND

Field of the Various Embodiments

Various embodiments relate generally to computer science and computer architecture and, more specifically, to scope tree consistency protocols for cache coherence.

Description of the Related Art

Cache coherence refers to the consistency and synchronization of data stored in different cache memories (also referred to herein as "caches") within a multiprocessor or multicore system. In such systems, each processor is typically coupled to a respective first level cache that is private to the processor or core and one or more additional levels of cache (e.g., second level, third level, or further levels) that are shared between the different processors or cores. During operation of a multiprocessor or multicore system, multiple processors or cores can concurrently execute groups of threads, such as cooperative thread arrays (CTAs), by modifying copies of the same data that are stored in different caches accessible to the processors or cores that are executing the groups of threads. However, a cache coherence problem can arise when multiple caches in the system store copies of the same data, and modifications made to a copy of the data stored in one cache (e.g., a first level cache) are not propagated to copies of the data stored in the other caches (e.g., other first level caches, a second level cache, or a third level cache). Failure to maintain cache coherency can result in data corruption and incorrect program behavior.

Various software-based cache coherence protocols have been implemented in an attempt to address the cache coherence problem set forth above. In one such implementation, threads of a program being executed by the processors or cores of a multiprocessor or multicore system are designed such that the threads communicate by reading data from, and writing data to, cache memories (e.g., level one, level two, or level three cache memories) that are specified in the program. For two threads executing on different processors or cores of a multiprocessor or multicore system to communicate with each other, the two threads need to read data from, and write data to, the same cache memory that is accessible by the different processors or cores. One drawback of this type of approach is that, because some cache memories may be accessible to only a subset of processors or cores of a multiprocessor or multicore system, the threads that need to read data from, and write data to, the same cache memories can only be scheduled to execute on certain processors or cores that have access to the same cache memories. The highest level cache in a cache hierarchy is, as a general matter, accessible to all processors or cores of a multiprocessor or multicore system. However, designing the threads of a program to utilize the highest level cache can be inefficient when the processors or cores that the threads execute on have access to a shared cache memory at a lower level of cache that is, for example, private to the processors or cores. Accordingly, conventional software-based cache coherence protocols can be inefficient and result in performance issues.

Various hardware-based cache coherence protocols have been implemented as well in an attempt to address the cache coherence problem set forth above. In one such implementation, a shared bus that connects the different caches in a multiprocessor or multicore system is monitored by snooping logic included in the different caches for memory transactions. More particularly, in operation, the snooping logic monitors the different bus transactions to determine whether a copy of a memory block in a particular cache remains valid or whether that copy of the memory block should be invalidated or updated instead. In this regard, each time a particular cache performs a write operation, the cache broadcasts a message on the bus to inform the other caches of the change, and the snooping logic in those various caches causes the copies of the memory block stored within the various caches to be updated or invalidated accordingly. One drawback to this type of approach, however, is that, when a multiprocessor or multicore system includes a relatively larger number of processors, cores, and/or levels of cache, the bus that connects the different caches can become overloaded with messages that are broadcast each time a particular cache performs a memory transaction. Accordingly, these types of hardware-based solutions oftentimes cannot be effectively scaled.

As the foregoing illustrates, what is needed in the art are more effective techniques for addressing cache coherency problems in multiprocessor and multicore systems.

SUMMARY

One embodiment of the present disclosure sets forth a method for migrating points of coherence in a cache hierarchy. The method includes receiving, at a first cache memory and from a second cache memory coupled to the first cache memory, a memory access request associated with a first scope group. The method further includes, in response to determining that a first directory residing within the first cache memory includes a first entry indicating that (i) a third cache memory is a child of the first cache memory in a tree associated with the first scope group, and (ii) the first cache memory is a root of the tree associated with the first scope group: performing one or more operations to acquire a point of coherence token from a descendant cache memory of the first cache memory in the tree associated with the first scope group, and updating the first entry to indicate that the first cache memory is a point of coherence of the tree associated with the first scope group.

Another embodiment of the present disclosure sets forth a method for growing a tree associated with a first scope group in a cache hierarchy. The method includes receiving, at a first cache memory, a memory access request associated with the first scope group. The method further includes, in response to determining that a first directory residing within the first cache memory does not include an entry associated with the first scope group, allocating a first entry associated with the first scope group in the first directory. In addition, the method includes setting the first entry to indicate that the first cache memory is a branch of the tree associated with the first scope group.

Another embodiment of the present disclosure sets forth a method for performing a synchronization operation. The method includes receiving, at a first cache memory, a memory release request that is associated with a first scope group. The method further includes, in response to determining that the first cache memory is a point of coherence of the first scope group, storing first data included in the memory release request in the first cache memory. The method also includes receiving, at the first cache memory, a memory acquire request associated with the first scope group. In addition, the method includes, in response to determining that the first cache memory is the point of coherence of the first scope group, responding to the memory acquire request with the first data stored in the first cache memory.

Other embodiments include, without limitation, a system that implements one or more aspects of the disclosed techniques, and one or more computer readable media including instructions for performing one or more aspects of the disclosed techniques.

At least one technical advantage is that the disclosed techniques can be more readily scaled relative to prior art approaches, which allows the disclosed techniques to be implemented more effectively in multiprocessor or multi-core systems that include a relatively larger number of processors, cores, and/or levels of cache. Another technical advantage of the disclosed techniques relative to the prior art is that, with the disclosed techniques, the cache within a cache hierarchy at which data associated with a given scope is written to and read from can be determined dynamically at runtime based on the number and/or locations of the processors or cores executing threads associated with the given scope group. With the disclosed techniques, overall cache use is more efficient relative to prior art approaches because data associated with scope groups can be written to and read from lower levels of cache (e.g., level one), thereby reducing access latencies and data movement relative to prior art approaches. These technical advantages provide one or more technological improvements over prior art approaches.

BRIEF DESCRIPTION OF THE DRAWINGS

So that the manner in which the features of the various embodiments recited herein can be understood in detail, a more particular description of the inventive concepts, briefly summarized herein, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts can be practiced without one or more of these specific details.

System Overview

Figure 1:
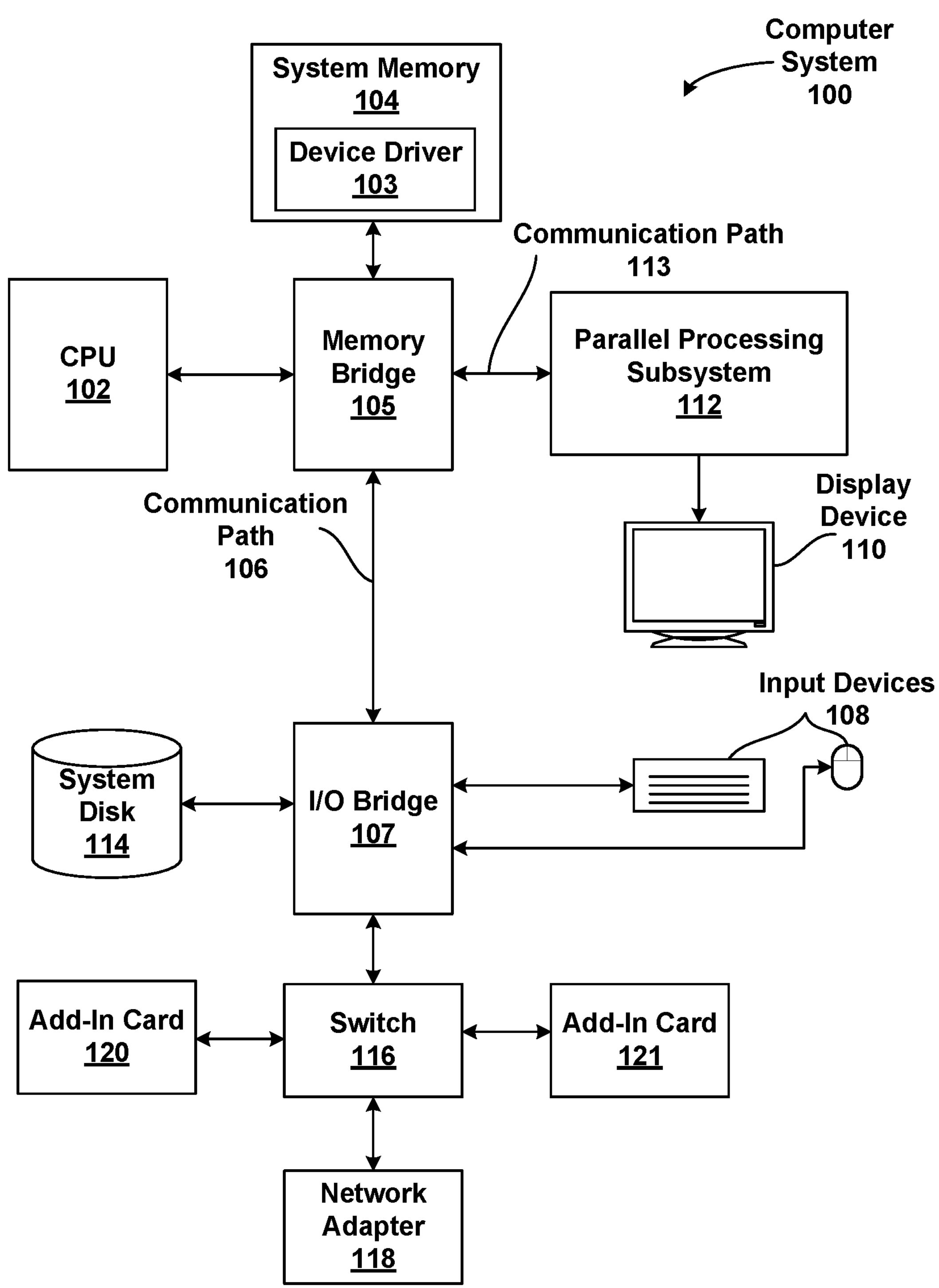
FIG. 1 is a block diagram of a computing system configured to implement one or more aspects of the various embodiments.

FIG. 1 is a block diagram of a computing system 100 configured to implement one or more aspects of the various embodiments. As shown, computing system 100 includes, without limitation, a central processing unit (CPU) 102 and a system memory 104 coupled to a parallel processing subsystem 112 via a memory bridge 105 and/or a communication path 113. Memory bridge 105 is further coupled to an I/O (input/output) bridge 107 via a communication path 106, and/or I/O bridge 107 is, in turn, coupled to a switch 116.

In operation, I/O bridge 107 is configured to receive user input information from input devices 108, such as a keyboard or a mouse, and/or forward the input information to CPU 102 for processing via communication path 106 and/or memory bridge 105. In some examples, without limitation, input devices 108 are employed to verify the identities of one or more users in order to permit access of computing system 100 to authorized users and/or deny access of computing system 100 to unauthorized users. Switch 116 is configured to provide connections between I/O bridge 107 and/or other components of the computing system 100, such as a network adapter 118 and/or various add-in cards 120 and 121. In some examples, without limitation, network adapter 118 serves as the primary or exclusive input device to receive input data for processing via the disclosed techniques.

As also shown, I/O bridge 107 is coupled to a system disk 114 that can be configured to store content and/or applications and/or data for use by CPU 102 and/or parallel processing subsystem 112. As a general matter, system disk 114 provides non-volatile storage for applications and/or data and can include fixed or removable hard disk drives, flash memory devices, and/or CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and/or the like, can be connected to I/O bridge 107 as well.

In various embodiments, memory bridge 105 can be a Northbridge chip, and/or I/O bridge 107 can be a Southbridge chip. In addition, communication paths 106 and/or 113, as well as other communication paths within computing system 100, can be implemented using any technically suitable protocols, including, without limitation, Peripheral Component Interconnect Express (PCIe), HyperTransport, or any other bus or point-to-point communication protocol known in the art.

In some embodiments, parallel processing subsystem 112 comprises a graphics subsystem that delivers pixels to a display device 110 that can be any conventional cathode ray tube, liquid crystal display, light-emitting diode display, or the like. In such embodiments, the parallel processing subsystem 112 incorporates circuitry optimized for graphics and/or video processing, including, for example, without limitation, video output circuitry. As described in greater detail herein in FIG. 2, such circuitry can be incorporated across one or more parallels included within parallel processing subsystem 112. Parallel processing subsystem 112 includes one or more processing units that can execute instructions such as a central processing unit (CPU), a parallel processing unit (PPU) of FIGS. 2-4, a graphics processing unit (GPU), a direct memory access (DMA) unit, an intelligence processing unit (IPU), neural processing unit (NAU), tensor processing unit (TPU), neural network processor (NNP), a data processing unit (DPU), a vision processing unit (VPU), an application specific integrated circuit (ASIC), a field-programmable gate array (FPGA), and/or the like.

In some embodiments, parallel processing subsystem 112 includes two processors, referred to herein as a primary processor (normally a CPU) and/or a secondary processor. Typically, the primary processor is a CPU and/or the secondary processor is a GPU. Additionally or alternatively, each of the primary processor and/or the secondary processor can be any one or more of the types of parallels disclosed herein, in any technically feasible combination. The secondary processor receives secure commands from the primary processor via a communication path that is not secured. The secondary processor accesses a memory and/or other storage system, such as system memory 104, Compute eXpress Link (CXL) memory expanders, memory managed disk storage, on-chip memory, and/or the like. The secondary processor accesses this memory and/or other storage system across an insecure connection. The primary processor and/or the secondary processor can communicate with one another via a GPU-to-GPU communications channel, such as Nvidia Link (NVLink). Further, the primary processor and/or the secondary processor can communicate with one another via network adapter 118. In general, the distinction between an insecure communication path and/or a secure communication path is application dependent. A particular application program generally considers communications within a die or package to be secure. Communications of unencrypted data over a standard communications channel, such as PCIe, are considered to be unsecure.

In some embodiments, the parallel processing subsystem 112 incorporates circuitry optimized for general purpose and/or compute processing. Again, such circuitry can be incorporated across one or more parallel processing units included within parallel processing subsystem 112 that are configured to perform such general purpose and/or compute operations. In yet other embodiments, the one or more parallel processing units included within parallel processing subsystem 112 can be configured to perform graphics processing, general purpose processing, and/or compute processing operations. System memory 104 includes at least one device driver 103 configured to manage the processing operations of the one or more parallels within parallel processing subsystem 112.

In various embodiments, parallel processing subsystem 112 can be integrated with one or more of the other elements of FIG. 1 to form a single system. For example, without limitation, parallel processing subsystem 112 can be integrated with CPU 102 and/or other connection circuitry on a single chip to form a system on chip (SoC).

It will be appreciated that the system shown herein is illustrative and that variations and/or modifications are possible. The connection topology, including the number and/or arrangement of bridges, the number of CPUs 102, and/or the number of parallel processing subsystems 112, can be modified as desired. For example, without limitation, in some embodiments, system memory 104 can be connected to CPU 102 directly rather than through memory bridge 105, and/or other devices would communicate with system memory 104 via memory bridge 105 and/or CPU 102. In other alternative topologies, parallel processing subsystem 112 can be connected to I/O bridge 107 or directly to CPU 102, rather than to memory bridge 105. In still other embodiments, I/O bridge 107 and/or memory bridge 105 can be integrated into a single chip instead of existing as one or more discrete devices. Lastly, in certain embodiments, one or more components shown in FIG. 1 can not be present. For example, without limitation, switch 116 can be eliminated, and/or network adapter 118 and/or add-in cards 120, 121 would connect directly to I/O bridge 107.

Figure 2:
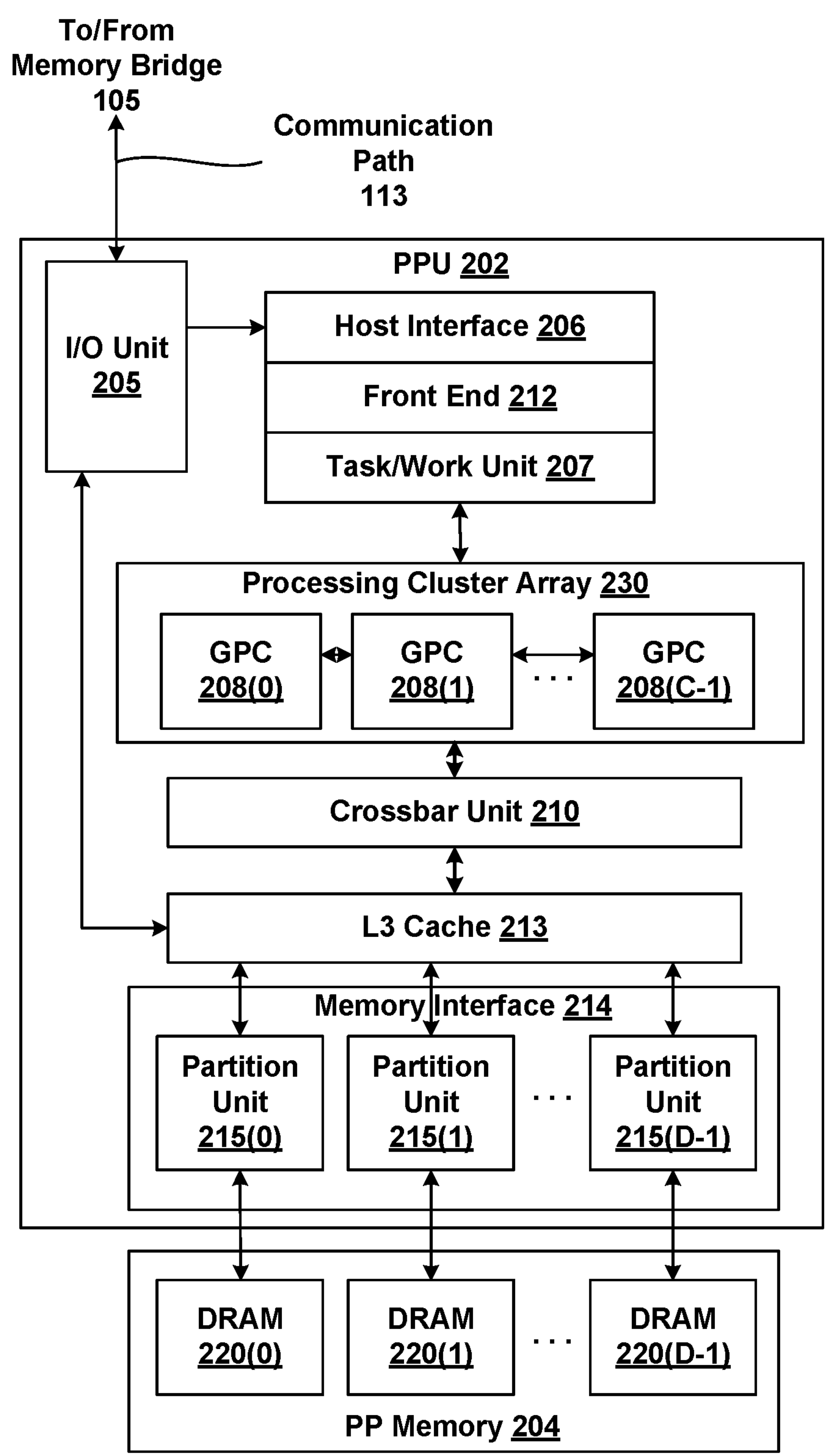
FIG. 2 is a block diagram of a parallel processing unit (PPU) included in the parallel processing subsystem of FIG. 1, according to various embodiments.

FIG. 2 is a block diagram of a parallel processing unit (PPU) 202 included in the parallel processing subsystem 112 of FIG. 1, according to various embodiments. Although FIG. 2 depicts one PPU 202, as indicated herein, parallel processing subsystem 112 can include any number of PPUs 202. Further, the PPU 202 of FIG. 2 is one non-limiting example of a parallel included in parallel processing subsystem 112 of FIG. 1. Alternative parallels include, without limitation, CPUs, GPUs, DMA units, IPUs, NPUs, TPUs, NNPs, DPUs, VPUs, ASICs, FPGAs, and/or the like. The techniques disclosed in FIGS. 2-4 with respect to PPU 202 apply equally to any type of parallel(s) included within parallel processing subsystem 112, in any combination. As shown, PPU 202 is coupled to a local parallel processing (PP) memory 204. PPU 202 and/or PP memory 204 can be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that can be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 can be used to store and/or update pixel data and/or deliver final pixel data or display frames to display device 110 for display. In some embodiments, PPU 202 also can be configured for general-purpose processing and/or compute operations.

In operation, CPU 102 is the master processor of computing system 100, controlling and/or coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that can be located in system memory 104, PP memory 204, or another storage location accessible to both CPU 102 and/or PPU 202. Additionally or alternatively, processors and/or processing units other than CPU 102 can write one or more streams of commands for PPU 202 to a data structure. A pointer to the data structure is written to a pushbuffer to initiate processing of the stream of commands in the data structure. The PPU 202 reads command streams from the pushbuffer and/or then executes commands asynchronously relative to the operation of CPU 102. In embodiments where multiple pushbuffers are generated, execution priorities can be specified for each pushbuffer by an application program via device driver 103 to control scheduling of the different pushbuffers.

As also shown, PPU 202 includes an I/O (input/output) unit 205 that communicates with the rest of computing system 100 via the communication path 113 and/or memory bridge 105. I/O unit 205 generates packets (or other signals) for transmission on communication path 113 and/or also receives all incoming packets (or other signals) from communication path 113, directing the incoming packets to appropriate components of PPU 202. For example, without limitation, commands related to processing tasks can be directed to a host interface 206, while commands related to memory operations (e.g., reading from or writing to PP memory 204) can be directed to a crossbar unit 210. Host interface 206 reads each pushbuffer and/or transmits the command stream stored in the pushbuffer to a front end 212.

As mentioned herein in conjunction with FIG. 1, the connection of PPU 202 to the rest of computing system 100 can be varied. In some embodiments, parallel processing subsystem 112, which includes at least one PPU 202, is implemented as an add-in card that can be inserted into an expansion slot of computing system 100. In other embodiments, PPU 202 can be integrated on a single chip with a bus bridge, such as memory bridge 105 or I/O bridge 107. Again, in still other embodiments, some or all of the elements of PPU 202 can be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and/or stored in memory. The pointers to TMDs are included in a command stream that is stored as a pushbuffer and received by the front end 212 from the host interface 206. Processing tasks that can be encoded as TMDs include indices associated with the data to be processed as well as state parameters and/or commands that define how the data is to be processed. For example, without limitation, the state parameters and/or commands can define the program to be executed on the data. The task/work unit 207 receives tasks from the front end 212 and/or ensures that GPCs 208 are configured to a valid state before the processing task specified by each one of the TMDs is initiated. A priority can be specified for each TMD that is used to schedule the execution of the processing task. Processing tasks also can be received from the processing cluster array 230. Optionally, the TMD can include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 can be allocated for processing different types of programs or for performing different types of computations. The allocation of GPCs 208 can vary depending on the workload arising for each type of program or computation. As will be described in more detail herein, one or more GPCs 208 can concurrently execute threads in a cooperative thread array (CTA) that cooperate and share data to perform collective computations.

In the illustrated example of FIG. 2, PPU 202 further includes a level three (L3) cache memory, or L3 cache, 213. As will be described in more detail herein, the L3 cache 213 is shared by GPCs 208 included in the PPU 202. In a cache hierarchy, the L3 cache 213 is positioned further upstream from streaming multiprocessors (SMs) executing threads than level one (L1) and level two (L2) caches included in the PPU 202. In some examples, such as in the illustrated example of FIG. 2, the L3 cache 213 is the highest level cache (HLC) in a cache hierarchy. In some examples, the PPU 202 and/or the parallel processing subsystem 112 includes one or more additional levels of cache (e.g., level four (L4) cache, level five (L5) cache, etc.) that are positioned further upstream in a cache hierarchy. In some examples, the PPU does not include an L3 cache 213. In such examples, the L2 caches included in the PPU 202 are at the highest level of cache in the PPU 202 and/or the parallel processing subsystem 112.

The L3 cache 213 is coupled to a memory interface 214. The memory interface 214 includes a set of D of partition units 215, where D≥1. Each partition unit 215 is coupled to one or more dynamic random access memories (DRAMs) 220 residing within PP memory 204. In one embodiment, the number of partition units 215 equals the number of DRAMs 220, and/or each partition unit 215 is coupled to a different DRAM 220. In other embodiments, the number of partition units 215 can be different than the number of DRAMs 220. In some embodiments, one or more caches, such as L3 cache 213, can also be partitioned. For example, every L3 cache partition could handle read and write accesses for a specific address range. In such cases, a scope tree, discussed in greater detail below in conjunction with FIGS. 4-19, can be created for each address range.

Persons of ordinary skill in the art will appreciate that a DRAM 220 can be replaced with any other technically suitable storage device. In operation, various render targets, such as texture maps and/or frame buffers, can be stored across DRAMs 220, allowing partition units 215 to write portions of each render target in parallel to efficiently use the available bandwidth of PP memory 204.

A given GPC 208 can process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 can use virtual channels to separate traffic streams between the GPCs 208 and/or partition units 215.

Again, GPCs 208 can be programmed to execute processing tasks relating to a wide variety of applications, including, without limitation, linear and/or nonlinear data transforms, filtering of video and/or audio data, modeling operations (e.g., applying laws of physics to determine position, velocity, and/or other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and/or write result data back to system memory 104 and/or PP memory 204. The result data can then be accessed by other system components, including CPU 102, another PPU 202 within parallel processing subsystem 112, or another parallel processing subsystem 112 within computing system 100.

As noted herein, any number of PPUs 202 can be included in a parallel processing subsystem 112. For example, without limitation, multiple PPUs 202 can be provided on a single add-in card, or multiple add-in cards can be connected to communication path 113, or one or more of PPUs 202 can be integrated into a bridge chip. PPUs 202 in a multi-PPU system can be identical to or different from one another. For example, without limitation, different PPUs 202 might have different numbers of processing cores and/or different amounts of PP memory 204. In implementations where multiple PPUs 202 are present, those PPUs can be operated in parallel to process data at a higher throughput than is possible with a single PPU 202. Systems incorporating one or more PPUs 202 can be implemented in a variety of configurations and/or form factors, including, without limitation, desktops, laptops, handheld personal computers or other handheld devices, servers, workstations, game consoles, embedded systems, and/or the like.

Figure 3:
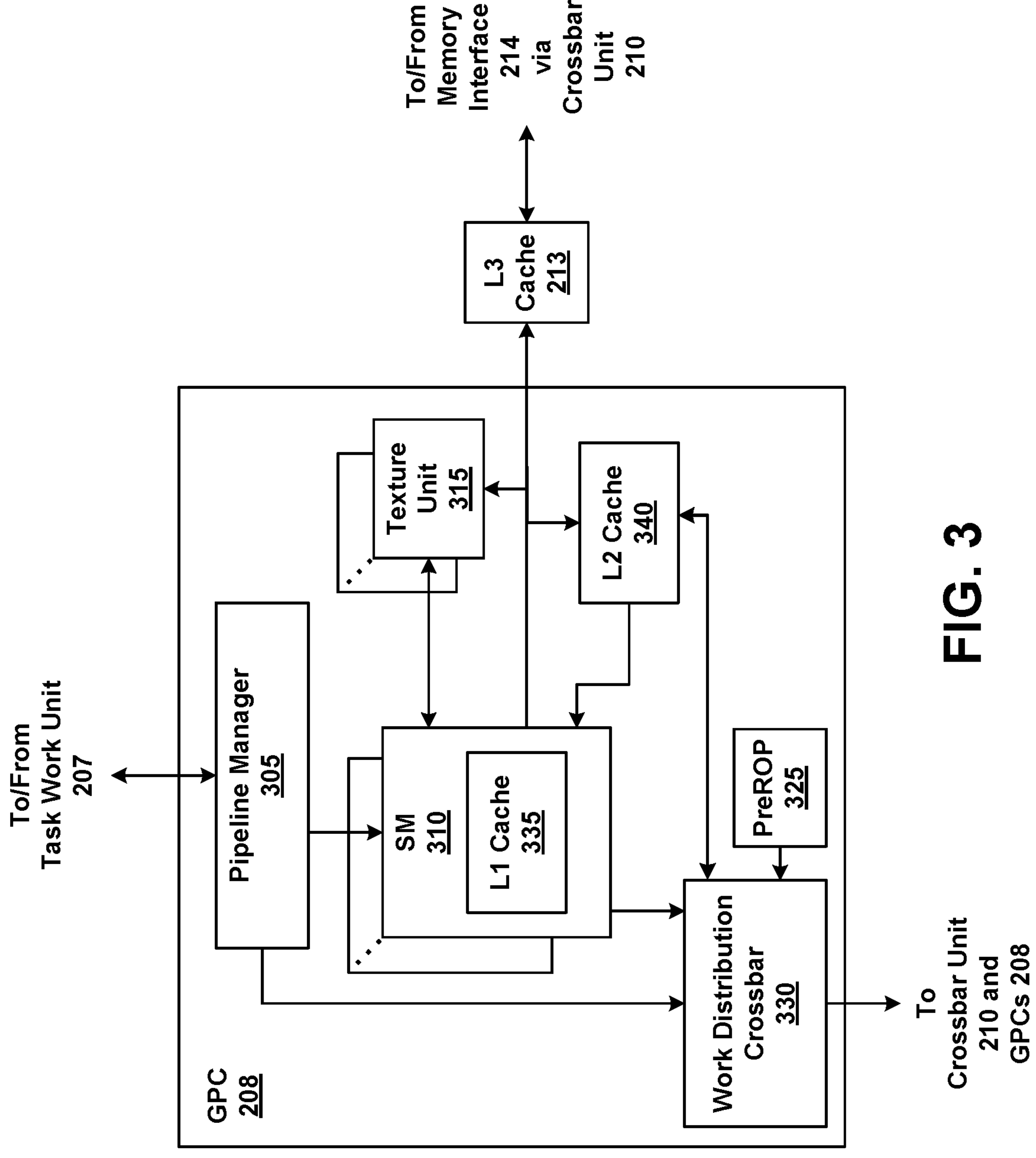
FIG. 3 is a block diagram of a general processing cluster (GPC) included in the parallel processing unit of FIG. 2, according to various embodiments.

FIG. 3 is a block diagram of a general processing cluster (GPC) 208 included in the parallel processing unit (PPU) 202 of FIG. 2, according to various embodiments. In operation, GPC 208 can be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 can also be configured to control a work distribution crossbar 330 by specifying destinations for processed data output by SMs 310.

In one embodiment, GPC 208 includes a set of Q SMs 310, where Q≥1. Also, each SM 310 includes a set of functional execution units (not shown), such as execution units and/or load-store units. Processing operations specific to any of the functional execution units can be pipelined, which enables a new instruction to be issued for execution before a previous instruction has completed execution. Any combination of functional execution units within a given SM 310 can be provided. In various embodiments, the functional execution units can be configured to support a variety of different operations including integer and/or floating point arithmetic (e.g., addition and/or multiplication), comparison operations, Boolean operations (e.g., AND, OR, XOR), bit-shifting, and/or computation of various algebraic functions (e.g., planar interpolation and/or trigonometric, exponential, and/or logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group can include fewer threads than the number of execution units within the SM 310, in which case some of the execution can be idle during cycles when that thread group is being processed. A thread group can also include more threads than the number of execution units within the SM 310, in which case processing can occur over consecutive clock cycles and/or across multiple SMs 310. Since each SM 310 can support up to G thread groups concurrently, it follows that up to G*Q thread groups can be executing in GPC 208 at any given time.

Additionally, a plurality of related thread groups can be active (in different phases of execution) at the same time within one or more SMs 310. This collection of thread groups is referred to herein as a "cooperative thread array" ("CTA") or "thread array." The size of a particular CTA is equal to q*k, where k is the number of concurrently executing threads in a thread group, which is typically an integer multiple of the number of execution units within the SM 310, and q is the number of thread groups simultaneously active within the one or more SMs 310. In various embodiments, a software application written in the compute unified device architecture (CUDA) programming language describes the behavior and/or operation of threads executing on GPC 208, including any of the behaviors and/or operations described herein. A given processing task can be specified in a CUDA program such that the SM 310 can be configured to perform and/or manage general-purpose compute operations.

As will be described in more detail herein, each SM 310 is coupled to a private level one (L1) cache memory, or L1 cache, 335 that supports, among other things, load and/or store operations performed by the execution units. Each SM 310 in a particular GPC 208 also has access to a level two (L2) cache, or L2 cache, 340 that is shared among all SMs 310 in the particular GPC 208 and the L3 cache 213 that is shared among the GPCs 208 in PPU 202. The L2 caches 340 and L3 cache 213 can be used to transfer data between threads. Persons skilled in the art will understand that the three levels of caches illustrated in FIGS. 2 and 3 are provided as non-limiting examples of cache memory, and that in other examples, a PPU 202 can include and/or be coupled to fewer or more than two levels of cache. In some examples, the PPU 202 includes and/or is coupled to two levels of cache memory. In other examples, the PPU 202 includes and/or is coupled to four levels of cache memory, five levels of cache memory, or some other number of levels of cache memory.

In addition to various levels of cache memory, SMs 310 also have access to off-chip "global" memory, which can include PP memory 204 and/or system memory 104. It is to be understood that any memory external to PPU 202 can be used as global memory. As shown in FIGS. 2 and 3, the L3 cache 213 and/or the L2 caches 340 can be configured to receive and/or hold data requested from memory via memory interface 214 by an SM 310. Such data can include, without limitation, instructions, uniform data, and/or constant data. As will be described in more detail herein, each GPC 208 can have an associated memory management unit (MMU) that is configured to map virtual addresses into physical addresses. In various embodiments, MMU can reside either within GPC 208 or within the memory interface 214. The MMU includes a set of page table entries (PTEs) used to map a virtual address to a physical address of a tile or memory page and/or optionally a cache line index. The MMU can include address translation lookaside buffers (TLB) or caches that can reside within SMs 310, within one or more L1 caches 335, one or more L2 caches 340, the L3 cache 213, and/or within GPC 208. In some examples, the MMU includes or is in addition to the scope tree and coherence protocol controllers described herein with respect to the different levels of cache memory.

In graphics and/or compute applications, GPC 208 can be configured such that each SM 310 is coupled to a texture unit 315 for performing texture mapping operations, such as determining texture sample positions, reading texture data, and/or filtering texture data.

In operation, each SM 310 transmits a processed task to work distribution crossbar 330 in order to provide the processed task to another GPC 208 for further processing or to store the processed task in an L2 cache 340 or an L3 cache 213, parallel processing memory 204, or system memory 104 via crossbar unit 210. In addition, a pre-raster operations (preROP) unit 325 is configured to receive data from an SM 310, direct data to one or more raster operations (ROP) units within partition units 215, perform optimizations for color blending, organize pixel color data, and/or perform address translations.

Figure 4:
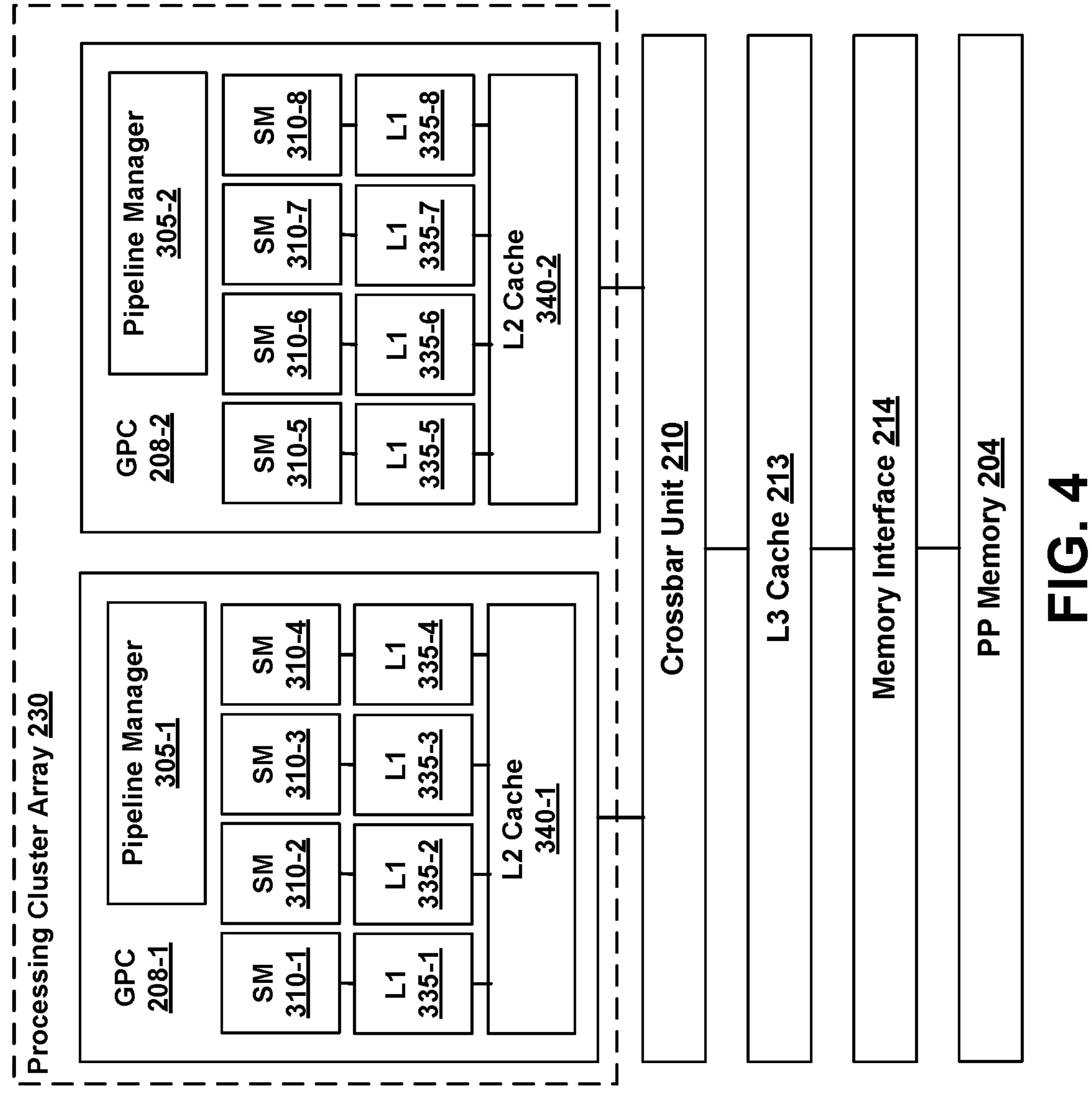
FIG. 4 is a more detailed illustration of an exemplar processing cluster array included in the parallel processing unit of FIG. 2, according to various embodiments.

FIG. 4 is a more detailed illustration of an exemplar processing cluster array 230 included in the parallel processing unit 202 of FIG. 2, according to various illustrated embodiments. Persons skilled in the art will understand that the number of components included in the processing cluster array 230 illustrated in FIG. 4 are provided as a non-limiting example. Moreover, persons skilled in the art will understand that the exemplar processing cluster array illustrated in FIG. 4 can include more or fewer than the number of components illustrated in FIG. 4. As shown in FIG. 4, the exemplar processing cluster array 230 includes a first GPC 208-1 and a second GPC 208-2. The second GPC 208-1 is coupled to the first GPC 208-1 via the crossbar unit 210. Persons skilled in the art will understand that, in other examples, the processing cluster array 230 can include fewer or more than two GPCs 208. For example, a processing cluster array 230 can include three GPCs 208, four GPCs 208, or more.

The first GPC 208-1 includes a respective pipeline manager 305-1 and a plurality of SMs 310-1-310-4. In the illustrated example of FIG. 4, the first GPC 208-1 includes four SMs 310-1-310-4. However, persons skilled in the art will understand that in other examples, the first GPC 208-1 can include fewer or more than four SMs 310. Each SM 310 included in the second GPC 208-2 is coupled to a respective L1 cache 335 included in the second GPC 208-2. For example, the SM 310-5 is coupled to the L1 cache 335-5, the SM 310-6 is coupled to the L1 cache 335-6, the SM 310-7 is coupled to the L1 cache 335-7, and the SM 310-8 is coupled to the L1 cache 335-8. The L2 cache 340-2 included in the second GPC 208-2 is coupled to every L1 cache 335 included in the second GPC 208-2 and to the L3 cache 213 by the crossbar unit 210.

Similarly, the second GPC 208-2 includes a respective pipeline manager 305-2 and a plurality of SMs 310-5-310-8. In the illustrated example of FIG. 4, the second GPC 208-2 includes four SMs 310-5-310-8. However, persons skilled in the art will understand that in other examples, the second GPC 208-2 can include fewer or more than four SMs. Each SM 310 included in the GPC 208-1 is coupled to a respective L1 cache 335 included in the first GPC 208-1. For example, the SM 310-1 is coupled to the L1 cache 335-1, the SM 310-2 is coupled to the L1 cache 335-2, the SM 310-3 is coupled to the L1 cache 335-3, and the SM 310-4 is coupled to the L1 cache 335-4. The L2 cache 340-1 included in the first GPC 208-1 is coupled to every L1 cache 335 included in the first GPC 208-1 and to the L3 cache 213 by the crossbar unit 210.

As described above with respect to FIGS. 2 and 3, each SM 310 included in the processing cluster array 230 is configured to process one or more thread groups. As used herein, a "thread group" or "warp" refers to a group of threads concurrently executing the same program on different input data, with one thread of the group being assigned to a different execution unit within an SM 310. A thread group can include fewer threads than the number of execution units within the SM 310, in which case some of the execution can be idle during cycles when that thread group is being processed. A thread group can also include more threads than the number of execution units within the SM 310, in which case processing can occur over consecutive clock cycles. Since each SM 310 can support up to G thread groups concurrently, it follows that up to G*Q thread groups can be executing in GPC 208 at any given time.

Additionally, a plurality of related thread groups can be active (in different phases of execution) at the same time within one or more SMs 310. This collection of thread groups is referred to herein as a "cooperative thread array" ("CTA") or "thread array." The size of a particular CTA is equal to q*k, where k is the number of concurrently executing threads in a thread group, which is typically an integer multiple of the number of execution units within an SM 310, and q is the number of thread groups simultaneously active within the one or more SMs 310. In various embodiments, a software application written in the compute unified device architecture (CUDA) programming language describes the behavior and/or operation of threads executing on GPC 208, including any of the behaviors and/or operations described herein. A given processing task can be specified in a CUDA program such that an SM 310 can be configured to perform and/or manage general-purpose compute operations.

In many instances, threads in a CTA can be executing across multiple different SMs 310 at the same time. In some examples, SMs 310 in the same GPC 208 concurrently execute threads in the same CTA. For example, SM 310-1 and 310-2 included in the first GPC 208-1 can concurrently execute threads in the same CTA. In some examples, SMs 310 included in different GPCs 208 can concurrently execute threads in the same CTA. For example, SM 310-1 in the first GPC 208-1 and SM 310-5 in the second GPC 208-2 can concurrently execute threads in the same CTA. When a particular SM 310 executes threads in a CTA, the particular SM 310 accesses and/or modifies an object (e.g., data) stored in one or more cache memories, such as the L1 cache 335 coupled to the particular SM 310, an L2 cache 340, and/or the L3 cache 213. The techniques disclosed herein are implemented to maintain consistency between the data stored in different cache memories that is accessed and/or modified by SMs 310 executing threads in the same CTA.

With the disclosed techniques, a dynamic scope programming model can be applied to maintain consistency across CTA threads executing concurrently across multiple SMs 310. This dynamic scope programming model, or scoping mechanism, allows for a programmer to arbitrarily group threads that require a coherent view of any shared objects, such as memory locations that can be tracked to some minimum granularity (e.g., byte, sector, or cache line), into a scope group. In some embodiments, the programmer provides each defined scope group with a unique scope group identifier (ID) that identifies the defined scope group. For example, the programmer can annotate within code of an application the threads, which comprise tasks and/or instructions, in a CTA with the unique scope group ID to identify that the respective threads belong to the scope group associated with the unique scope group ID. As an example, a programmer can annotate a memory access request, such as a "load" command, with a scope group ID "SG0" to identify that the load command "load. SG0" is associated with the scope group SG0. Accordingly, if a thread associated with, or within, a scope group accesses and/or modifies an object, the access and/or modification to the object can be tracked in all cache memories between the SM 310 serving the thread and the last level cache that initially fetched a copy of that object from memory. In some embodiments, in addition to or in lieu of threads belonging to scope groups being annotated within the code of an application, threads belonging to scope groups can also be annotated by a driver and/or a scheduler.

When an object in cache and/or other memory is accessed and/or modified by an SM 310 executing threads in a scope group, the object itself can also be tagged with the scope group ID to distinguish the memory access of the object from memory accesses associated with other scope groups (e.g., from different kernels). In this regard, a particular cache memory can distinguish between the memory accesses originating from different groups of threads, or scope groups, that are not cooperating because the scope group IDs associated with the different memory accesses would not match. As will be described in more detail herein, a scope group ID is a globally unique ID associated with a scope group of cooperative threads that is a function of program, kernel, and dynamic scope identifiers within a coherent cache hierarchy.

Figure 5:
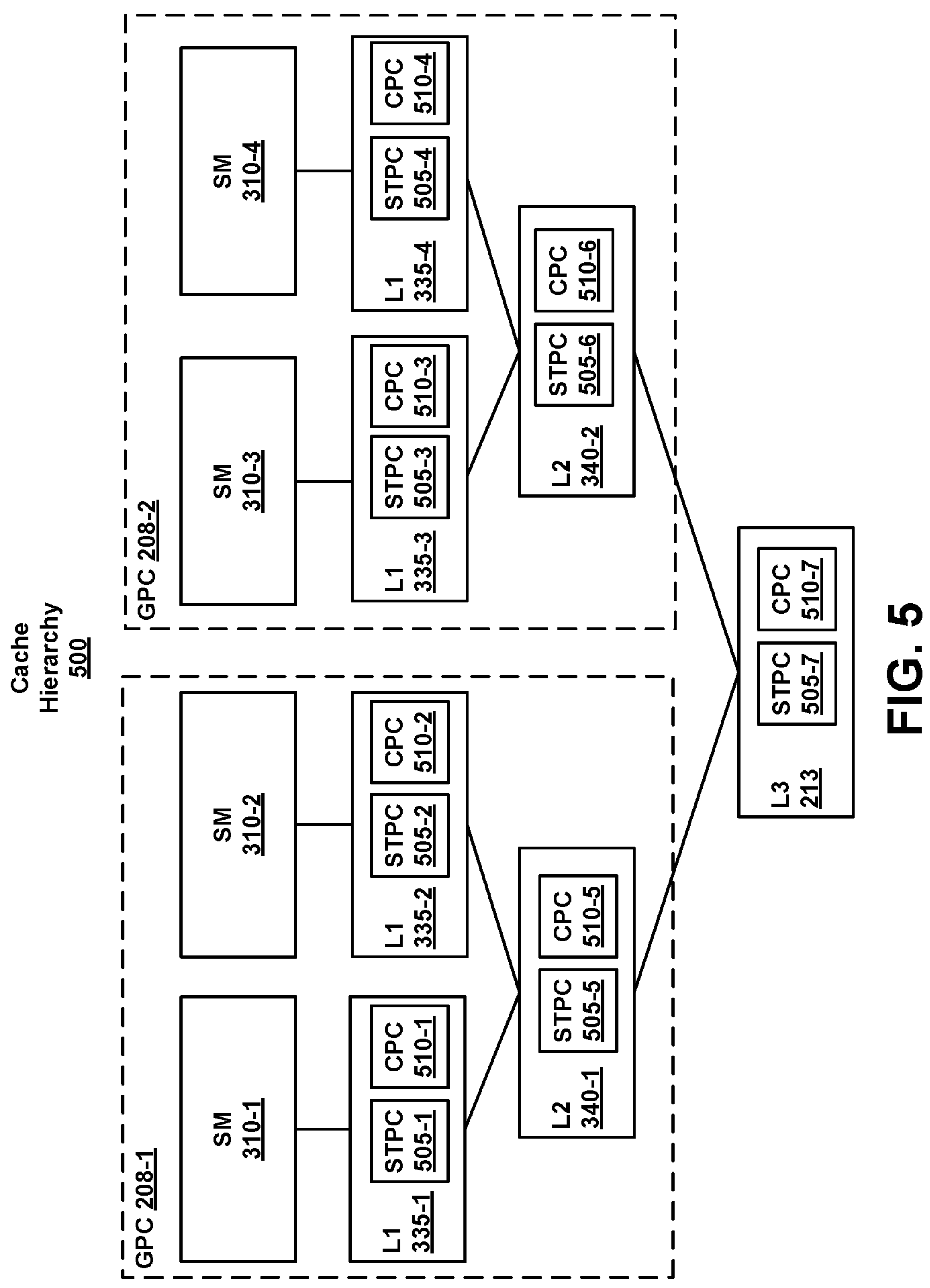
FIG. 5 is a block diagram of an exemplar cache hierarchy, according to various embodiments.

FIG. 5 is a block diagram of an exemplar cache hierarchy 500, according to various embodiments. In the illustrated example of FIG. 5, the cache hierarchy 500 includes three levels of a cache (e.g., a first level (L1), a second level (L2), and a third level (L3)). However, persons skilled in the art will understand that the levels of caches illustrated in FIG. 5 are non-limiting, and that in other examples, fewer or more than three levels of cache can be included in the cache hierarchy 500. The L1 caches 335-1, 335-2, 335-3, and 335-4 (referred to herein as collectively as "L1 caches 335" and individually as an "L1 cache 335") included in the cache hierarchy 500 are considered to be the furthest "downstream" cache memories in cache hierarchy 500 because the L1 caches 335 are closest to the SMs 310. In contrast, in the illustrated example of FIG. 5, the L3 cache 213 is considered to be the highest level, or furthest "upstream," cache memory because the L3 cache 213 is furthest away from the SMs 310.

As further shown in FIG. 5, the cache hierarchy 500 includes a number of scope tree protocol controllers (STPCs) 505-1 to 505-7 (referred to herein as collectively as "STPCs 505" and individually as an "STPC 505") and coherence protocol controller (CPCs) 510-1 to 510-7 (referred to herein as collectively as "CPCs 510" and individually as a "CPC 510"). The STPCs 505 reside in each cache memory included in the cache hierarchy 500. Illustratively, the STPC 505-1 resides in the L1 cache 335-1, the STPC 505-2 resides in the L1 cache 335-2, the STPC 505-3 resides in the L1 cache 335-3, the STPC 505-4 resides in the L1 cache 335-4, the STPC 505-5 resides in the L2 cache 340-1, the STPC 505-6 resides in the L2 cache 340-2, and the STPC 505-7 resides in the L3 cache 213. As will be described in more detail herein, the STPC 505_s_ function as a scope group state machine, or state directory, that keeps track of the respective scope group states of each cache memory included in the cache hierarchy 500. In that regard, in some embodiments, the STPCs 505 implement a distributed scope tree controller that tracks which threads executing on the SMs 310 belong to particular scope groups and which cache memories in the cache hierarchy 500 support threads belonging to the particular scope groups. The STPCs 505 are also referred to herein as portions of such a distributed scope tree controller. As discussed in greater detail in conjunction with FIGS. 7-8, in some embodiments, each STPC 505 is implemented as a table, or directory, (also referred to herein as a "scope tree directory") that includes a first column that indicates a scope group ID, a second column that indicates a scope group state for a respective scope group, and a third column that indicates child cache memories for respective scope groups. For example, the STPC 505-1 tracks and controls the respective scope group states of the L1 cache 335-1 and the STPC 505-2 tracks and controls the respective scope group states of the L1 cache 335-2. In some examples, the STPCs 505 are implemented in hardware, in firmware, and/or in ROM instructions. For example, in some embodiments, each of the STPCs 500 is implemented in hardware in a respective cache memory, in firmware in a respective cache memory, and/or in ROM instructions in a respective cache memory. In other examples, the STPCs 505 are implemented in software. In operation, the different STPCs 505 communicate with each other to track and update the respective scope group states of the cache memories in which the STPCs 505 reside.

Similarly, the CPCs 510 reside in each cache memory included in the cache hierarchy 500, and the CPCs 510 implement a distributed coherence protocol controller. The CPCs 510 are also referred to herein as portions of the distributed coherence protocol controller. Illustratively, the CPC 510-1 resides in the L1 cache 335-1, the CPC 510-2 resides in the L1 cache 335-2, the CPC 510-3 resides in the L1 cache 335-3, the CPC 510-4 resides in the L1 cache 335-4, the CPC 510-5 resides in the L2 cache 340-1, the CPC 510-6 resides in the L2 cache 340-2, and the CPC 510-7 resides in the L3 cache 213. As will be described in more detail herein, the CPC 510 works in accordance with the STPC 505 to maintain consistency between data stored in the different cache memories included in the cache hierarchy 500. For example, the CPC 510-1 services memory access requests associated with data stored in the L1 cache 335-1, and the CPC 510-2 services memory access requests associated with data stored in the L1 cache 335-2. In some examples, the CPCs 510 are implemented in the cache hierarchy 500 in hardware, in firmware, and/or in ROM instructions. For example, each CPC 510 can be implemented in hardware in a respective cache memory, in firmware in a respective cache memory, and/or in ROM instructions in a respective cache memory. In other examples, the CPC 510 is implemented in software.

In some embodiments, the STPCs 505 control operation of the CPCs 510. In such examples, the CPCs 510 services memory access requests (e.g., load requests, read requests, etc.) in response to commands received from the STPCs 505. In some examples, the STPCs 505 and the CPCs 510 are integrated in a single controller. Persons skilled in the art will understand that operation of the cache hierarchy 500, the STPCs 505, and the CPCs 510 described herein is also applicable to cache hierarchies that include more or fewer than three levels of cache memory. In operation, the different CPCs 510 communicate with each other and/or the different STPCs 505 to maintain coherency between data stored in the different cache memories.

To enforce cache coherence between data associated with a particular scope group, the STCPs 505 guarantee that an SM 310 serving thread(s) associated with the particular scope group ID becomes visible at a point of coherence (PoC) for the scope group when a synchronization operation is performed. The PoC for a particular scope group refers to the point, or location, in the cache hierarchy 500 at which threads executing on the SMs 310 and cache memories are guaranteed to see the same copy of an object (e.g., the same copy of data). For example, the PoC in cache hierarchy 500 for a particular scope group can be one of the cache memories included in the cache hierarchy 500. In operation, there can only be one unique PoC per scope group in the cache hierarchy 500. For example, the L1 cache 335-2 and the L2 cache 340-1 cannot both be a PoC for the same scope group. In some examples, a cache memory in the cache hierarchy 500 can be a PoC for multiple different scope groups executing on SMs 310. In some examples, a particular cache memory in the cache hierarchy 500 can be the PoC for a first scope group executing on SM(s) 310 but not be the PoC for a second scope group executing on SM(s) 310.

As will be described in more detail herein, the PoC for a particular scope group can be migrated within the cache hierarchy 500 to improve performance based on the locations of threads in the scope group executing on SMs 310. In general, the STPCs 505 can migrate the PoC for a particular scope group to the level of cache in the cache hierarchy 500 that is both (1) visible to all threads in the scope group that are executing on SMs 310 and (2) positioned closest to, or furthest downstream relative to, all of the SMs 310 executing the threads in the scope group. In operation, the physical cache level in the cache hierarchy 500 that acts as the PoC for a given scope group can change dynamically based on the scheduling of threads to SMs 310 and the dynamic access patterns of those individual threads.

With the disclosed techniques, the STPCs 505 implement a mechanism in hardware, which is also referred to herein as a "scope tree," to track and identify which cache in the cache hierarchy 500 is acting as the PoC for scope groups executing on the SMs 310. For example, the STPCs 505 generate and use a scope tree to track (at runtime) which SMs 310 are executing all of the cooperating threads from each active scope group. The STPCs 505 residing in the cache hierarchy 500 collectively build and maintain (in hardware) a separate scope tree for every scope group. Moreover, the STPCs 505 use the information in the scope tree to identify which cache in the cache hierarchy 500 is currently serving as the PoC for a given scope group.

Figure 6:
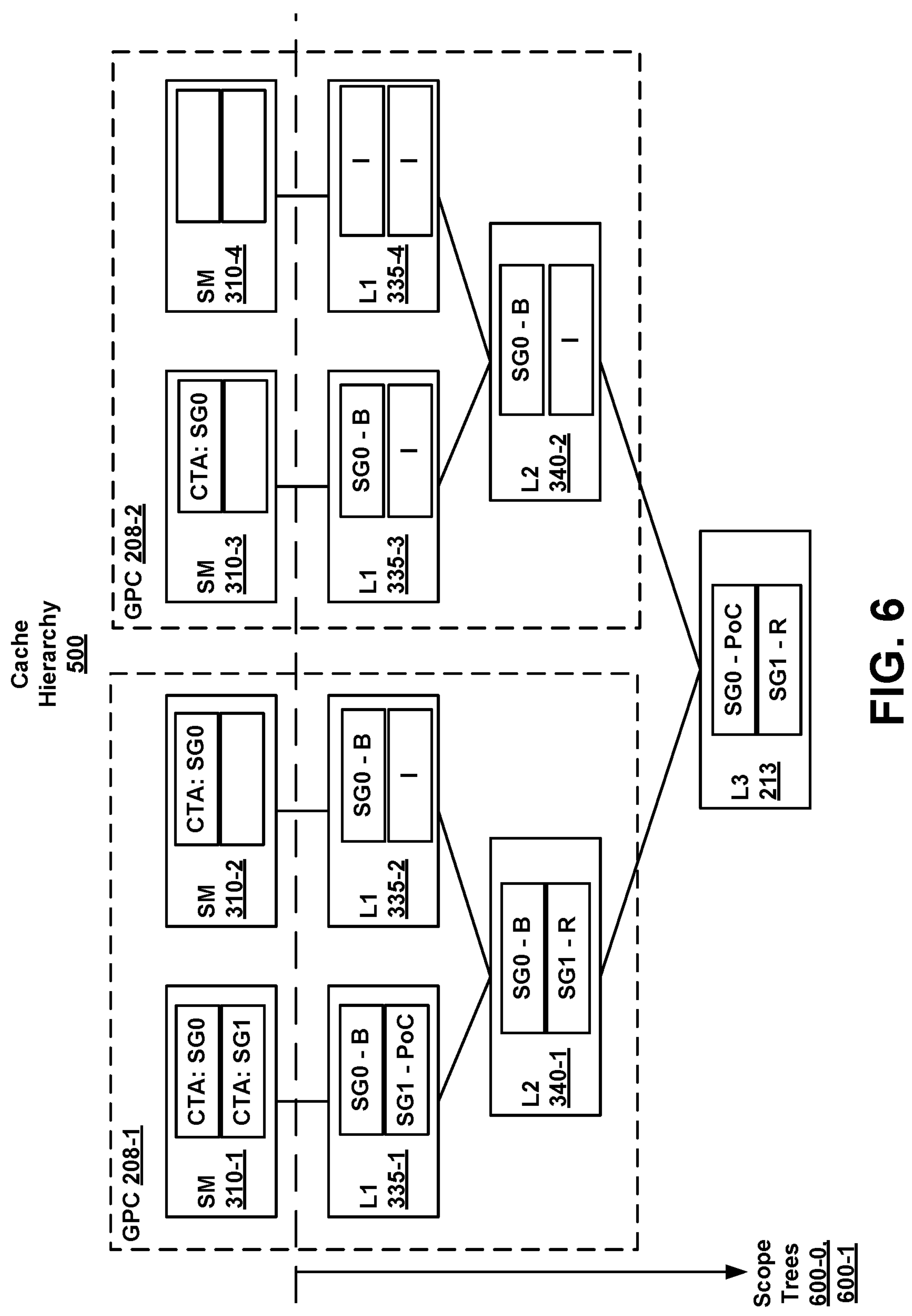
FIG. 6 illustrates exemplar scope trees stored in the cache hierarchy of FIG. 5, according to various embodiments.

FIG. 6 illustrates exemplar scope trees 600 stored in the cache hierarchy 500 of FIG. 5, according to various embodiments. As shown in the illustrated example of FIG. 6, there are two active scope groups, SG0 and SG1, within the cache hierarchy 500. Scope groups SG0 and SG1 are considered to be active as threads in the scope groups SG0 and SG1 are executing on SMs 310 coupled to the cache hierarchy 500. For example, threads in the scope group SG0 are executing on SMs 310-1 and 310-2 included in the first GPC 208-1 and SM 310-3 included in the second GPC 208-1. Moreover, thread(s) in the scope group SG1 are executing on the SM 310-1 included in the first GPC 208-1. Persons skilled in the art will understand that the number of scope groups illustrated in FIG. 6 are provided as a non-limiting example, and that in other examples, more or fewer than two scope groups can be active in the cache hierarchy 500.

As further shown in the illustrated example of FIG. 6, scope trees 600-0 and 600-1 are stored in the cache hierarchy 500. Scope tree 600-0 corresponds to the scope group SG0 and scope tree 600-1 corresponds to the scope group SG1. The scope tree 600-0 indicates the respective state associated with the scope group SG0 for each cache memory included in the cache hierarchy 500. That is, each cache memory in the cache hierarchy 500 is in, or assigned to, a respective state that corresponds to the scope group SG0 and is indicated by the scope tree 600-0. Similarly, the scope tree 600-1 indicates the respective state associated with the scope group SG1 for each cache memory included in the cache hierarchy 500. That is, each cache memory in the cache hierarchy 500 is in, or assigned to, a respective state that corresponds to the scope group SG1 and is indicated by the scope tree 600-1. In some examples, a particular cache memory can be in a first state associated with a first scope group, such as SG0, and at the same time be in a second, different, state associated with a second scope group, such as SG1. As will be described in more detail herein, in operation, the STPCs 505 use the scope trees 600-0, 600-1 to track and update the respective states of each cache memory associated with the scope groups SG0, SG1.

At a given time, an individual cache memory included in the cache hierarchy 500 can be in one of four states with respect to each active scope group in the cache hierarchy 500. With respect to the illustrated example of FIG. 6, each cache memory in the cache hierarchy 500 can be in a respective state associated with the scope group SG0 and a respective state associated with the scope group SG1. The four states associated with a particular scope group, which can hereinafter be referred to as scope group states, include the invalid or null state, the point of coherence (PoC) state, the branch state, and the root state. The null state is a scope group state in which a cache memory does not include any valid data entries associated with a particular scope group. The null state can be indicated by the scope tree directory of a STPC within a cache memory not including any entries associated with the particular scope group. Scope tree directories are discussed in greater detail below in conjunction with FIGS. 7-8. As described above, the PoC state is a scope group state in which a cache memory is visible to all SMs 310 executing threads in the associated scope group. The branch state is a scope group state in which a cache memory is downstream of the PoC for a particular scope group. The root state is a scope group state in which a cache memory is upstream of the PoC for a particular scope group. The PoC state, branch state, or root state of a cache memory with respect to a particular scope group can be indicated by an entry associated with the particular scope group within a scope tree directory of a STPC residing in the cache memory.

Referring back to the illustrated example of FIG. 6, the scope tree 600-0 indicates the respective scope group state associated with scope group SG0 of each cache memory included in the cache hierarchy 500. As shown, the L3 cache 213 is in the PoC state for the scope group SG0. The L3 cache 213 is the point of coherence for scope group SG0 because the L3 cache 213 is visible to all of the SMs 310 that are executing threads in the scope group SG0 (e.g., SM 310-1, SM 310-2, and SM 310-3). As further shown, L1 caches 335-1, 335-2, and 335-3 and L2 caches 340-1, 340-2 are in the branch state, or “B” state, for scope group SG0. Importantly, the L1 caches 335-1, 335-2, and 335-3 and L2 caches 340-1, 340-2 are in the branch state because the L1 caches 335-1, 335-2, and 335-3 and L2 caches 340-1, 340-2 are downstream of the point of coherence for scope group SG0. In addition, L1 cache 335-4 does not include a scope tree directory entry allocated for the scope group SG0, which is shown as an entry with the null state, or “I” state.

In the illustrated example of FIG. 6, the L3 cache 213 is both the highest level of cache in the cache hierarchy 500 and the point of coherence of the scope group SG0. Accordingly, none of cache memories in the cache hierarchy 500 are in a root state, or “R” state, for the scope group SG0 because there are not any cache memory levels that are upstream of the point of coherence for the scope group SG0. However, if the illustrated example of FIG. 6 was expanded to include a fourth level (L4) of cache that is upstream of the L3 cache 213, the L4 cache would be assigned to the root state for the scope group SG0.

The scope tree 600-1 indicates the respective scope group state associated with scope group SG1 of each cache memory included in the cache hierarchy 500. As shown, the L1 cache 335-1 is in the PoC state for the scope group SG1. The L1 cache 335-1 is the point of coherence for scope group SG1 because the L1 cache 335-1 is visible to all of the SMs 310 that are executing threads in the scope group SG1. In this example, SM 310-1 is the only SM executing thread(s) in the scope group SG1. As further shown, L2 cache 340-1 and L3 cache 213 are in the root state, or “R” state, for the scope group SG1. Importantly, the L2 cache 340-1 and the L3 cache 213 are in the root state because the L2 cache 340-1 and the L3 cache 213 are upstream of the point of coherence for the scope group SG1. As further shown, L1 caches 335-2, 335-3, and 335-4 and the L2 cache 340-2 are in the null state, or “I” state, for scope group SG1.

In the illustrated example of FIG. 6, the L1 cache 335-1 is both in the lowest level of cache in the cache hierarchy 500 and the point of coherence of the scope group SG1. Accordingly, none of the cache memories in the cache hierarchy 500 are in a branch state, or “B” state, for the scope group SG1 because there are not any cache memory levels that are downstream of the point of coherence for the scope group SG1. However, if the illustrated example of FIG. 6 was changed such that the point of coherence for scope group SG1 was in an L2 cache 340, one or more L1 caches 235 would be assigned to the branch state for the scope group SG1.

Figures 7, 8:
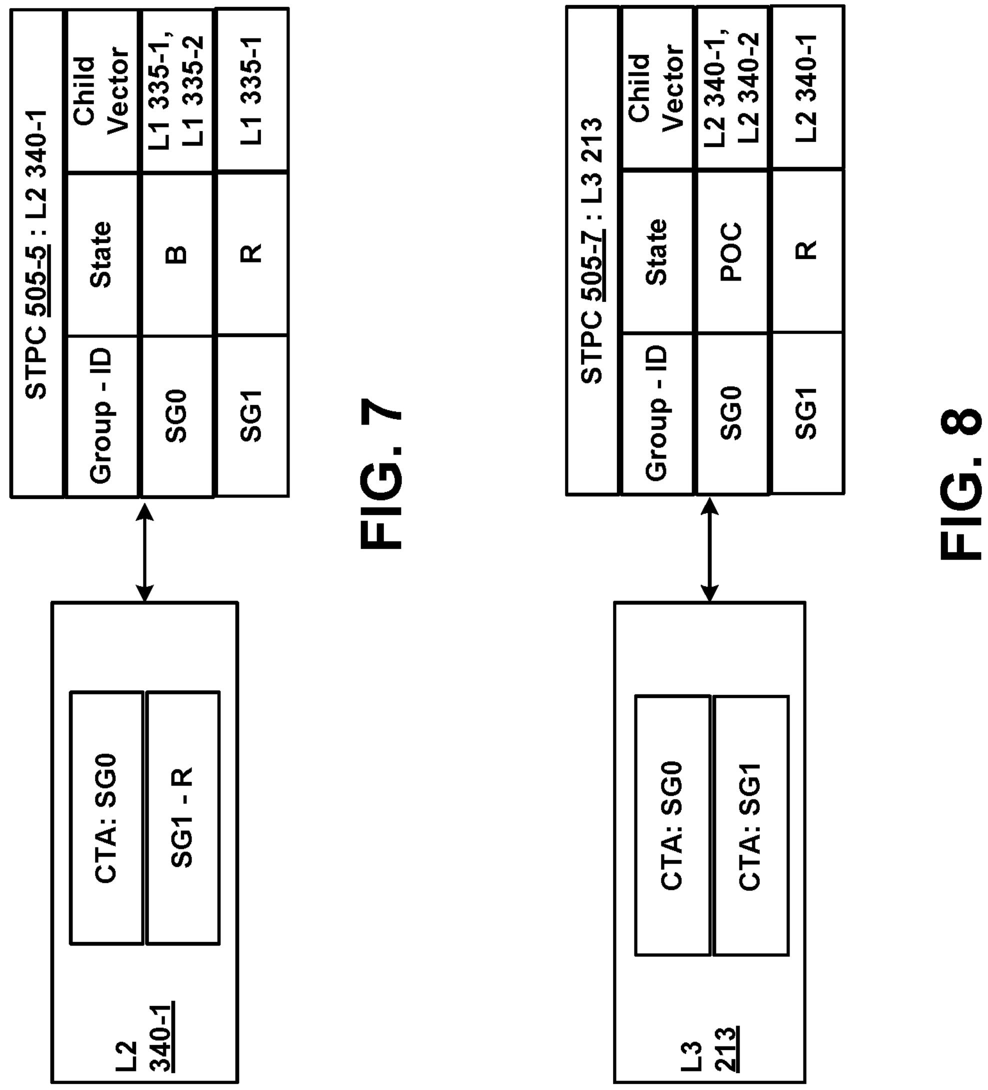
FIG. 7 is a more detailed illustration of a scope tree controller for a level two cache block included in the exemplar scope tree of FIG. 6, according to various embodiments.
FIG. 8 is a more detailed illustration of a scope tree controller for a level three cache block included in the exemplar scope tree of FIG. 6, according to various embodiments.

As described above, the STPCs 505 use scope trees to track and update the respective scope group states of cache memories included in a cache hierarchy. FIG. 7 is a more detailed illustration of a scope tree controller for a level two cache block included in the exemplar scope trees of FIG. 6, according to various embodiments. In particular, FIG. 7 illustrates the STPC 505-5 that resides in the L2 cache 340-1 included in the scope trees 600-0, 600-1. As shown, the STPC 505-5 is implemented as a table, or directory, (also referred to herein as a “scope tree directory”) that includes a first column that indicates the scope group ID, a second column that indicates the scope group state for a respective scope group, and a third column that indicates the child cache memories of the L2 cache 340-1 for respective scope groups. In the illustrated example of FIG. 7, the STPC 505-5 includes a scope tree directory entry that (1) indicates the L2 cache 340-1 is in the branch state for scope group SG0, and (2) includes a child vector with pointers to the L1 cache 335-1 and the L1 cache 335-2 for the scope group SG0. The L1 caches 335-1 and 335-2 are child caches of the L2 cache 340-1 for scope group SG0 because the L1 caches 335-1 and 335-2 are in the branch state for scope group SG0 and are downstream of and immediately coupled to the L2 cache 340-1 in the scope tree 600-0. Furthermore, in the illustrated example of FIG. 7, the STPC 505-5 includes a scope tree directory entry that (1) indicates the L2 cache 340-1 is in the root state for scope group SG1, and (2) includes a child vector with a pointer to the L1 cache 335-1 for the scope group SG1. The L1 cache 335-1 is a child cache of the L2 cache 340-1 for scope group SG1 because the L1 cache 335-1 is in the PoC state for scope group SG1 and is downstream of and immediately coupled to the L2 cache 340-1 in the scope tree 600-1.

Similarly, FIG. 8 is a more detailed illustration of a scope tree controller for a level three cache block included in the exemplar scope trees of FIG. 6, according to various embodiments. In particular, FIG. 8 illustrates the STPC 505-7 that resides in the L3 cache 213 included in the scope trees 600-0, 600-1. As shown, the STPC 505-7 is implemented as a table, or directory, (also referred to herein as a “scope tree directory”) that includes a first column that indicates the scope group ID, a second column that indicates the scope group state for a respective scope group, and a third column that indicates the child caches of the L3 cache 213 for respective scope groups. In the illustrated example of FIG. 8, the STPC 505-7 includes a scope tree directory entry that (1) indicates the L3 cache 213 is in the PoC state for scope group SG0, and (2) includes a child vector pointing to L2 cache 340-1 and L2 cache 340-2 for the scope group SG0. The L2 caches 340-1 and 340-2 are child caches of the L3 cache 213 for scope group SG0 because the L2 caches 340-1 and 340-2 are in the branch state for scope group SG0 and are downstream of and immediately coupled to the L3 cache 213 in the scope tree 600-0. Furthermore, in the illustrated example of FIG. 8, the STPC 505-7 includes a scope tree directory entry that (1) indicates the L3 cache 213 is in the root state for scope group SG1, and (2) includes a child vector pointing to the L2 cache 340-1 for the scope group SG1. The L2 cache 340-1 is a child cache of the L3 cache 213 for scope group SG1 because the L2 cache 340-1 is in the root state for scope group SG1 and is downstream of and immediately coupled to the L3 cache 213 in the scope tree 600-1. Although the STPCs 505-5 and 505-7 are illustrated as tables in the illustrated examples of FIGS. 7 and 8, persons skilled in the art will understand that STPCs can be implemented in other formats and data structures suitable for implementing a scope tree directory. For example, the child vectors can be replaced with a technique that utilizes broadcasts and counters to determine the child caches of a cache that are associated with a particular scope group.

Figure 9:
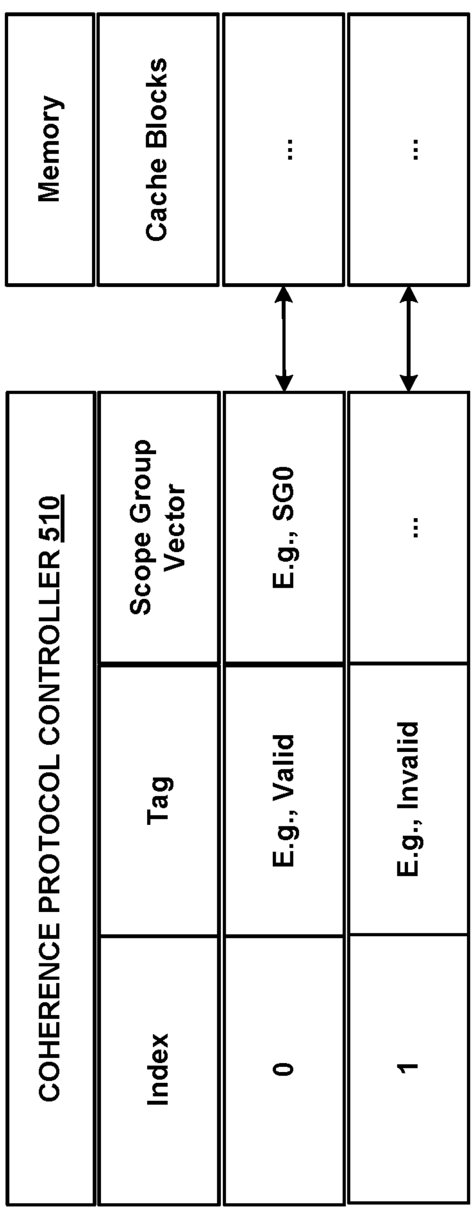
FIG. 9 illustrates a conceptual block diagram of a cache coherence protocol controller, according to various embodiments.

FIG. 9 illustrates a conceptual block diagram of a cache coherence protocol controller, according to various embodiments. In particular, FIG. 9 illustrates a CPC 510 that can reside in an individual cache memory included in the cache hierarchy 500. As shown, the CPC 510 is implemented as a table, or directory, that includes a first column that indicates an index of a cache block, a second column that indicates tag for data stored in the cache block, and a third column that indicates the scope group ID associated with data stored in the cache block. In some embodiments, data stored in a cache block can be assigned various tags. For example, in some embodiments, the tags can include invalid, valid, dirty, and/or partially dirty. In such cases, the invalid tag indicates that data is outdated and has not yet been fetched from a parent cache, the dirty tag indicates that data is dirty, the valid tag indicates that data is clean, and the partially dirty tag indicates that data is partially dirty. As further shown in FIG. 9, the CPC 510 is coupled to the cache blocks that store the data entries in the cache memory in which the CPC 510 resides. In operation, the CPC 510 can access and/or modify the data entries stored in the cache blocks. When the CPC 510 updates or modifies a data entry stored in a cache block, the CPC 510 correspondingly updates one or more of the index, the tag, or the scope group vector associated with the modified data entry. Although the CPCs 510 is illustrated as a table in the illustrated example of FIG. 9, persons skilled in the art will understand that CPCs can be implemented in other formats and data structures suitable for implementing a cache coherence controller.

Figure 10A:
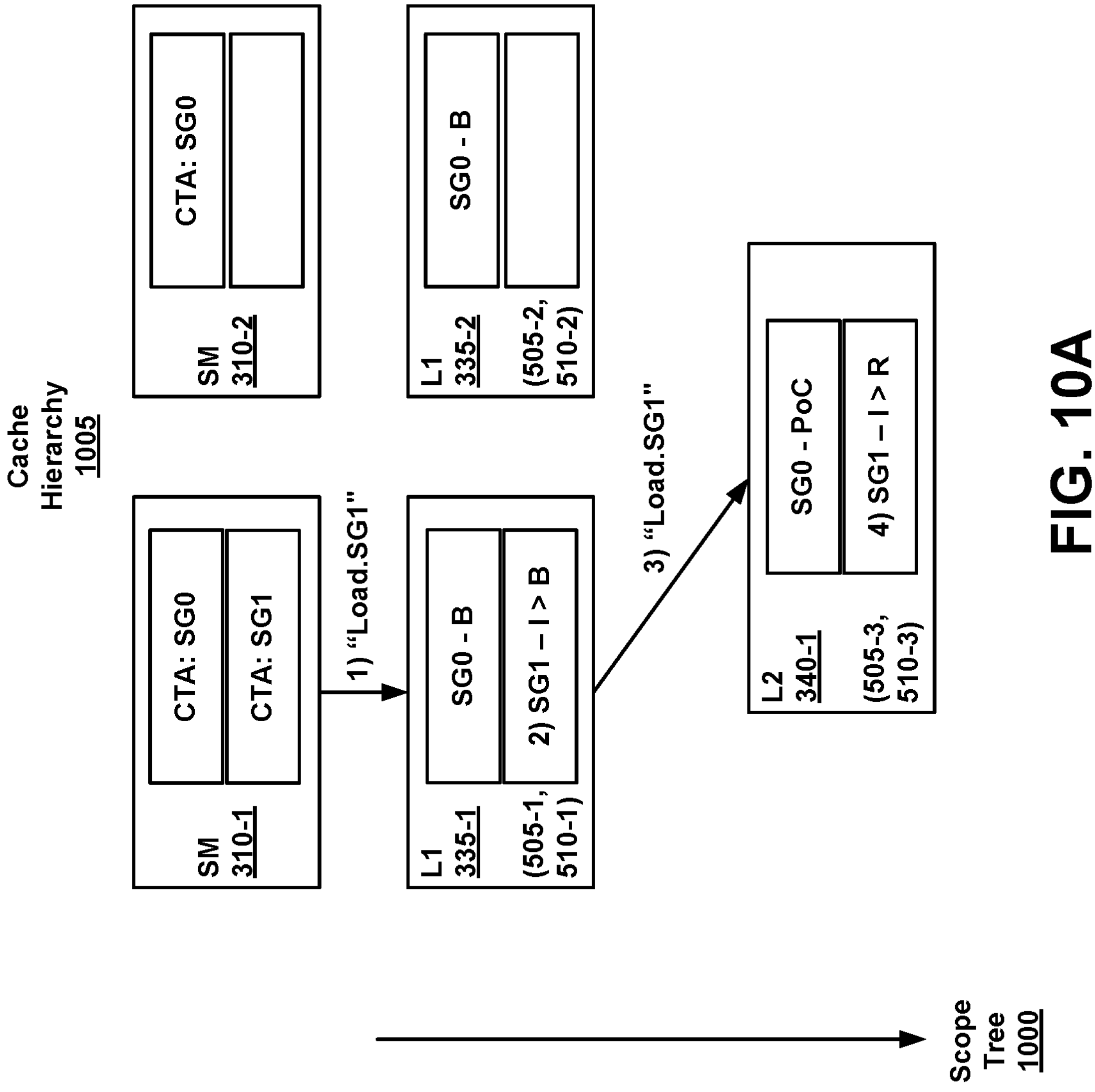
FIGS. 10A and 10B illustrate a conceptual block diagram of an exemplar growing scope tree, according to various embodiments.
Figure 10B:
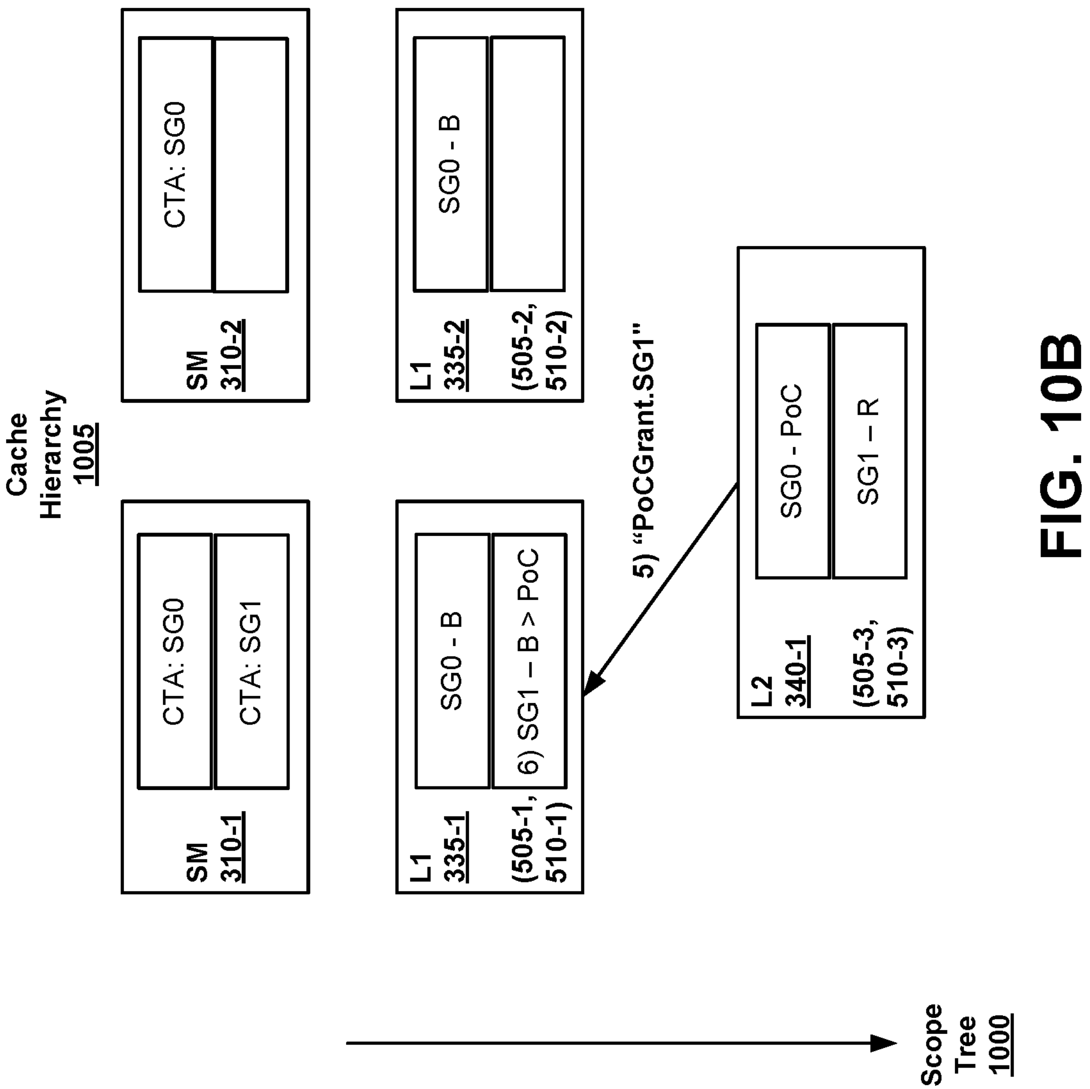

In operation, when an SM 310 starts executing threads in a scope group, the STPCs 505 can generate and grow a new scope tree for the scope group. FIGS. 10A and 10B illustrate a conceptual block diagram of an exemplar growing scope tree, according to various embodiments. In particular, FIGS. 10A and 10B illustrate conceptual block diagrams of growing a scope tree 1000 associated with the scope group SG1 that is implemented, or stored, in a cache hierarchy 1005. Note that FIGS. 10A and 10B also illustrate an exemplar scope tree for a scope group SG0 that has already been generated and grown. However, for explanatory purposes, the descriptions of FIGS. 10A and 10B will focus on the process of growing the scope tree 1000 for scope group SG1 in the cache hierarchy 1005. As will be described herein, the process for growing the scope tree 1000 is performed in combination by the various STPCs 505 and/or CPCs 510 that reside in the cache memories included in the cache hierarchy 1005.

In the illustrated example of FIGS. 10A and 10B, the cache hierarchy 1005 includes two levels of a cache (e.g., a first level (L1) and a second level (L2)). However, persons skilled in the art will understand that the levels of caches illustrated in FIGS. 10A and 10B are non-limiting, and that in other examples, more than two levels of cache can be included in the cache hierarchy 1005. The L1 caches 335-1 and 335-2 included in the cache hierarchy 1005 are considered to be the furthest "downstream" cache memories in cache hierarchy 1005 because the L1 caches 335-1, 335-2 are closest to the SMs 310. In contrast, in the illustrated example of FIGS. 10A and 10B, the L2 cache 340-1 is considered to be the highest level cache, or furthest "upstream" cache memory, because the L2 cache 340-1 is furthest away from the SMs 310. As further shown in the illustrated examples of FIGS. 10A and 10B, each cache memory includes a respective STPC 505 and a respective CPC 510. For example, a first STPC 505-1 and a first CPC 510-1 resides in the L1 cache 335-1, a second STPC 505-2 and a second CPC 510-2 reside in the L1 cache 335-2, and a third STPC 505-3 and a third CPC 510-3 resides in the L2 cache 340-1. Persons skilled in the art will understand that the description of growing the scope tree 1000 associated with scope group SG1 in the cache hierarchy 1005 is equally applicable to the process of growing a scope tree within a cache hierarchy that includes more than two levels of cache memory.

Now with reference to FIG. 10A, the STPC 505*s* determine that the SM 310-1 has started executing thread(s) in the scope group SG1 and begin the process of growing the scope tree 1000 for the scope group SG1. For example, after the SM 310-1 starts executing thread(s) in the scope group SG1, the SM 310-1 can transmit a memory access request annotated with the scope group ID ". SG1" to the L1 cache 335-1 immediately coupled to the SM 310-1. In the illustrated example of FIG. 10A, the memory access request is a load command "Load. SG1." However, persons skilled in the art will understand that a load command is just one non-limiting example of a memory access request that an SM 310 can forward to a cache memory while executing thread(s) in a scope group. Further, although described herein primarily with respect to atomic transactions for simplicity, it should be understood that, in some embodiments, concurrent transactions can be serialized using, e.g., transient states.

As shown, the STPC 505-1 residing in the L1 cache 335-1 receives the "Load. SG1" request from the SM 310-1. After receiving the "Load. SG1" request, the STPC 505-1 determines whether a scope tree directory of the STPC 505-1 includes an entry associated with scope group SG1, or if the scope tree directory only includes entries associated with other scope groups and/or entries with the null, or "I" state. If no scope tree directory entries are associated with scope group SG1, then the L1 cache 335-1 is not yet part of the scope tree for scope group SG1. In the illustrated example of FIG. 10A, the scope tree directory of the STPC 505-1 initially includes an entry with the null state, or "I" state, but no entry associated with scope group SG1. However, because the L1 cache 335-1 that includes the STPC 505-1 is used by the SM 310-1 that executes thread(s) in the scope group SG1 (as indicated by the Load.SG1 request), the L1 cache 335-1 needs to be added to the scope tree for scope group SG1.

In response to receiving the "Load. SG1" request and determining that the scope tree directory of the STPC 505-1 does not include an entry associated with scope group SG1, the STPC 505-1 allocates an entry associated with scope group SG1 in the scope tree directory. In the example of FIG. 10A, the STPC 505-1 allocates a scope tree directory entry associated with scope group SG1 by changing a scope tree directory entry from the null state to the branch state, or "B" state, for scope group SG1. Then, the STPC 505-1 continues the process of growing the scope tree 1000 for scope group SG1 by forwarding the "Load. SG1" request to the next, higher level of cache in the cache hierarchy 1005. In the illustrated example of FIG. 10A, the STPC 505-1 forwards the "Load. SG1" request to the L2 cache 340-1.

After receiving the "Load. SG1" request, the STPC 505-3 that resides in the L2 cache 340-1 determines whether a scope tree directory of the STPC 505-3 includes an entry associated with scope group SG1, or if the scope tree directory only includes entries associated with other scope groups and/or entries with the null state, or "I" state. If no scope tree directory entries are associated with scope group SG1, then the L2 cache 340-1 is not yet part of the scope tree for scope group SG1. In the illustrated example of FIG. 10A, the scope tree directory of the STPC 505-3 initially includes an entry with the null state, or "I" state, but no entry associated with scope group SG1. However, because the L2 cache 340-1 that includes the STPC 505-3 is used by the SM 310-1 that executes a thread in the scope group SG1 (as indicated by the Load.SG1 request), the L2 cache 340-1 also needs to be added to the scope tree for scope group SG1.

In response to receiving the "Load. SG1" request and determining that the scope tree directory of the STPC 505-3 does not include an entry associated with scope group SG1, the STPC 505-3 allocates an entry associated with scope group SG1 in the scope tree directory. In the example of FIG. 10A, the STPC 505-3 allocates a scope tree directory entry associated with scope group SG1 by changing a scope tree directory entry from the null state to the root state, or "R" state, for scope group SG1. The STPC 505-3 sets the scope tree directory entry associated with scope group SG1 to the root state because the L2 cache 340-1 is the highest level cache in the cache hierarchy 1005 and does not have any additional child caches associated with scope group SG1. The STPC 505-3 further adds a pointer to the L1 cache 335-1 to the child vector of the scope tree directory entry associated with scope group SG1. However, if in another example the cache hierarchy 1005 includes an additional level of cache (e.g., level three, level four, etc.), the STPC 505-3 would instead set the scope tree directory entry to indicate the L2 cache 340-1 is in the branch state for scope group SG1 and repeat the steps described above with respect to growing the scope tree 1000 in the L1 cache 335-1.

Referring now to the illustrated example of FIG. 10B, the highest level cache memory, L2 cache 340-1, in the cache hierarchy 1005 has been assigned to a root state for the first scope group SG1. However, the STPCs 505 have not yet assigned a cache memory in the cache hierarchy 1005 to be the point of coherence for the scope tree 1000. Accordingly, after determining that L2 cache 340-1 is the highest level cache in the cache hierarchy 1005 and allocating a scope tree directory entry with the root state for the scope group SG1, the STPC 505-3 grants a PoC token for scope group SG1 to the L1 cache 335-1. Illustratively, the STPC 505-3 transmits a message "PoCGrant. SG1" that grants the PoC token for scope group SG1 to the L1 cache 335-1.

When the STPC 505-1 receives the PoC token from the STPC 505-3, the STPC 505-1 determines whether to assign the scope group state of the L1 cache 335-1 to the PoC state for the scope group SG1 or to forward the PoC token for the scope group SG1 to another cache memory in the cache hierarchy 1005. In the illustrated example of FIG. 10B, the STPC 505-1 determines to assign the scope group state of the L1 cache 335-1 to the PoC state for the scope group SG1 in response to receiving the PoC token because the L1 cache 335-1 is currently in the branch state for the scope group SG1 and the L1 cache 335-1 has no child caches or more than one child cache entry in the child vector of the entry associated with scope group SG1 in the scope tree directory of STPC 505-1. Accordingly, in the illustrated examples of FIGS. 10A and 10B, the STPC 505-1 changes the scope group state of the scope tree directory entry associated with scope group SG1 from the branch state to the PoC state. If there existed an L0 cache downstream of the L1 cache 335-1, the STPC 505-1 would forward the PoC token and set the scope tree directory entry associated with scope group SG1 to the root state, as the L1 cache 335-1 would be upstream from the point of coherence.

The example of growing the scope tree 1000 for scope group SG1 described with respect to FIGS. 10A and 10B ends with the L1 cache 335-1 being assigned to the PoC state for the scope group SG1. As shown in FIG. 10B, L1 cache 335-1 is the point of coherence for the scope tree 1000 because the L1 cache 335-1 is the cache memory in cache hierarchy 1005 that is furthest downstream and visible to all SMs 310 executing threads in the scope group SG1, which includes only SM 310-1. However, persons skilled in the art will understand that, in operation, the STPCs 505 can continue to shrink and/or grow the scope tree 1000 as additional SMs 310 execute threads in the scope group SG1. Moreover, persons skilled in the art will understand that the process for growing the scope tree 1000 described with respect to FIGS. 10A and 10B can be effectively scaled for growing scope trees in cache hierarchies that include more than two levels of cache.

More generally, in some embodiments, for atomic transactions, the scope tree state transition diagram for memory accesses and scope tree control and data messages is as shown below in Table 1. In Table 1,/refers to a change to a new state (if not in an entry, the scope tree state remains as is), REQC refers to a source cache of a request, {CV} refers to a child vector, and-refers to a message never being observed in such a state.

TABLE 1

| Scope Tree State Machine | Memory Access | PoCMigration | PoCGrant | Write Back Data from child cache |
|---|---|---|---|---|
| I | Add REQC to {CV}; Forward request to parent cache; /B | — | — | — |
| B | Add REQC to {CV}; | — | If single REQC in {CV}: Forward to child cache /R Else: /PoC | — |
| PoC | Add REQC to {CV}; | Send Write back dirty data; Wait for write back of dirty data to complete; Send PoCGrant token; /B | — | Write to cache memory OR forward to parent root cache node |
| R | Send PoCMigration request to child | Send Write back dirty data; Forward | Wait for write back of dirty data | Write to cache memory OR |

TABLE 1-continued

| Scope Tree State Machine | Memory Access | PoCMigration | PoCGrant | Write Back Data from child cache |
|---|---|---|---|---|
| | in CV; Add REQC to CV; /R* | PoCMigration request to child in CV. | to complete; forward PoCGrant token; /B | forward to parent root cache node |
| R* | — | — | /PoC | Write to cache memory OR forward to parent root cache node |

Figure 11:
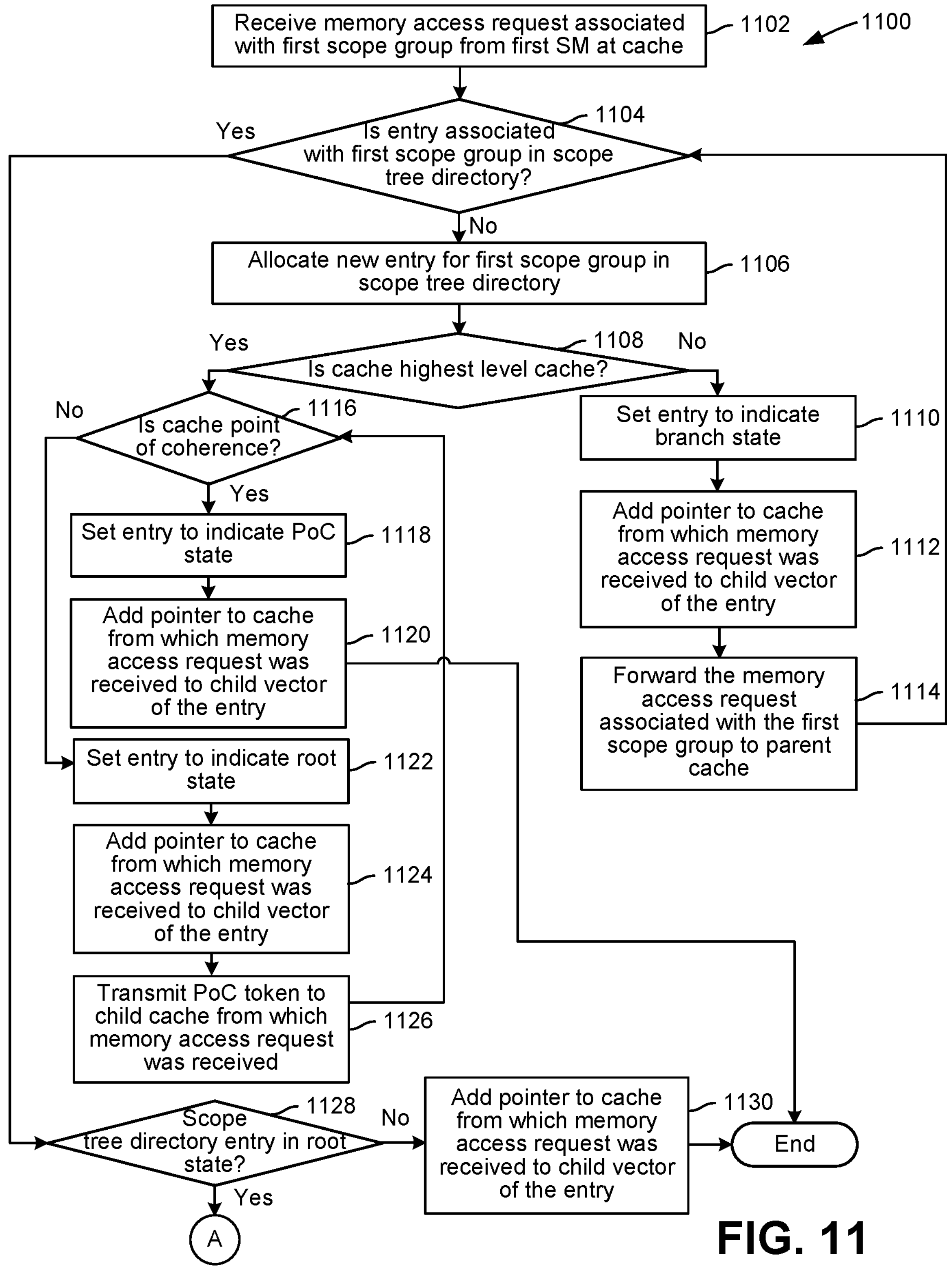
FIG. 11 is a flow diagram of method steps for growing a scope tree, according to various embodiments.

FIG. 11 is a flow diagram of method steps for growing a scope tree, according to various embodiments. The method operations can be performed by one or more of the STPCs 505. Additionally or alternatively, the method operations can be performed by one or more of the CPC 510, the SMs 310, processing units and/or alternative accelerators including, without limitation, CPUs, GPUs, DMA units, IPUs, NPUs, TPUs, NNPs, DPUs, VPUs, ASICs, FPGAs, and/or the like, in any combination. Furthermore, one or more of the method operations can be performed atomically by multiple STPCs 505 and/or SMs 310 executing in parallel. Although the method operations are described in conjunction with the systems of FIGS. 1-10B, persons of ordinary skill in the art will understand that any system configured to perform the method operations, in any order, is within the scope of the present disclosure.

As shown, a method 1100 begins at operation 1102, where a cache receives a memory access request that is associated with a first scope group and originates from a first SM. As described, in some embodiments, the code of an application can include annotations that threads of the application belong to particular scope groups. In some embodiments, in addition to or in lieu of threads belonging to scope groups being annotated within code, threads belonging to scope groups can also be annotated by a driver and/or a scheduler. During the execution of thread(s) belonging to a particular scope group on an SM, the thread(s) can make memory access requests, such as the Load.SG1 request described above in conjunction with FIG. 10A, that indicate the scope group to which the thread(s) belongs.

At operation 1104, an STPC (e.g., one of STPCs 505) residing in the cache determines whether a scope tree directory of the STPC includes an entry associated with the first scope group.

If the scope tree directory does not include an entry associated with the first scope group, then the method 1100 continues to operation 1106. At operation 1106, the STPC of the cache allocates a new entry for the first scope group in the scope tree directory of the STPC.

At operation 1108, if the cache is not the highest level cache, then the method 1100 continues to operation 1110. At operation 1110, the STPC sets the entry to indicate a branch state.

At operation 1112, the STPC adds a pointer to the cache from which the memory access request was received to a child vector of the entry associated with the first scope group.

Then at operation 1114, the STPC forwards the memory access request associated with the first scope group to a parent cache of the cache. The parent cache is a next higher level cache coupled to the cache.

The method 1100 then returns to operation 1104, where an STPC of the parent cache determines whether the scope tree directory of that STPC stores an entry associated with the first scope group.

On the other hand, if at operation 1108 the cache is the highest level cache, then the method 1100 proceeds directly to operation 1116, where the STPC of the cache determines whether the cache is the point of coherence for the first scope group. As described, the point of coherence is a cache that is visible to all of the SMs that are executing threads in the first scope group. In general for a given scope group, if a cache has exactly a single child cache and either a parent cache of the cache is in the root state or the cache is the highest level cache, then the cache is in the root state. If a cache has either multiple children or is the lowest level cache, and a parent cache of the cache is in the root state, then the cache is the point-of-coherence. Otherwise, the cache is in the branch state. A cache in the branch state can have none, one or multiple child caches. For a given scope group, all caches downstream of the cache that is the point-of-coherence are always in the branch state, while all caches upstream are in the root state.

If the STPC of the cache determines that the cache is the point of coherence, then at operation 1118, the STPC sets the entry to indicate the PoC state.

At operation 1120, the STPC adds a pointer to the cache from which the memory access request was received to a child vector of the entry.

On the other hand, if the STPC of the cache determines that the cache is not the point of coherence, then at operation 1122, the STPC sets the entry to indicate the root state.

At operation 1124, the STPC adds a pointer to the cache from which the memory access request was received to a child vector of the entry.

At operation 1126, the STPC transmits a point of coherence token for the first scope group to the child cache from which the memory access request was received. The method 1100 then returns to operation 1116, where a STPC of the child cache determines whether the child cache is the point of coherence for the first scope group, etc.

Returning to operation 1104, if the STPC of the cache determines that the scope tree directory includes an entry associated with the first scope group, then the method 1100 proceeds directly to operation 1128, where the STPC determines whether the scope tree directory entry associated with the first scope group is in the root state.

If the scope tree directory entry associated with the first scope group is not in the root state, then at operation 1130, the STPC adds a pointer to the cache from which the memory access request was received to a child vector of the entry associated with the first scope group, assuming that child vector does not already include a pointer to the cache from which the memory access request was received. The method 1100 then ends.

Although the method 1100 for growing a scope tree is shown as ending, it should be noted that if the memory access request received at operation 1102 hits in the cache, then the cache can respond to the memory access request. In some embodiments, whether the cache can respond depends on the type of access, the scope tree directory state, and the CPC state. In such cases, given a scope tree directory has a valid entry, a read access associated with the first scope group can hit if the STPC of the cache is in any state except invalid and the CPC of the cache indicates based on its internal state that the data being requested is valid. In addition, an acquire access associated with the first scope group will invalidate all data stored in the cache that is associated with the first scope group if the STPC of the cache indicates the branch state. The acquire access can hit in the cache if the STPC indicates the cache is in the point of coherence state or a subsequent parent root state and if the CPC state indicates valid data. That is, a cache can only serve an acquire if the cache is the point of coherence (or if the data is not present in the PoC, a subsequent root node). Unlike a normal read, an acquire cannot read data from a cache in branch state. Table 2 illustrates how memory access requests are handled in some embodiments, including how a memory access hit is permitted if data being requested is valid in a cache.

TABLE 2

| Scope Tree State | Load | Acquire | Write | Release |
|---|---|---|---|---|
| I | Miss | Miss | Miss | Miss |
| B | Hit - If data in cache is already associated with SG; Else Miss | Miss & Invalidate all data associated with SG in cache | Hit | Write back all dirty data to parent cache, before forwarding release. Cache can optionally maintain clean copy. |
| PoC | Hit | Hit | {1) Hit | Hit |
| R | Hit | Hit | {1) Hit | Hit |

In Table 2, {1) depends on the write policy. If the write policy is a write-back policy, then a write can complete at a cache in the branch state and the written data is tracked as dirty. If the write policy is a write-through policy, then the dirty data is written through the hierarchy directly to the point of coherence cache. All caches that forward the write-through request may maintain a valid clean copy of the data. In addition, as shown in Table 2, in some embodiments, a load operation may hit in any cache in the scope tree that stores valid data, and the load operation is forwarded upstream in the cache hierarchy until a copy of the data requested is found. In some embodiments, an acquire operation must not hit in any cache downstream of the point of coherence, as a hit would fetch stale data, and the acquire operation must also invalidate any data associated with the scope group upstream until the point of coherence cache is reached. The point of coherence cache does not need to be invalidated. In some embodiments, a release memory access request must write back all dirty data associated with the scope group in the caches the request traverses to the point of coherence cache of the scope group. In some embodiments, a write memory access for a write back policy to a cache that is initially not part of the tree can behave in two ways. First, a cache that receives the write memory access and enters a branch state for the scope group can maintain a valid clean copy of the data and forward the write to a parent cache as the cache is not part of the scope tree yet, and the forwarded write request hits in a parent cache that is in the branch state and therefore already part of the scope tree. The parent cache maintains the dirty copy of the data and must write back the dirty copy of the data at a subsequent release. Alternatively, a cache that receives the write memory access and enters a branch state for the scope group can track the data written as dirty and forward the write request without the data to a parent cache that simply registers the cache as a child cache, thereby adding the cache logically to the scope tree, and drops the WriteNoData request.

On the other hand, if at operation 1128 the scope tree directory entry associated with the first scope group is in the root state, then the STPC can perform a migration of the point of coherence upstream in the scope tree, described in greater detail below in conjunction with FIG. 17. The STPC performs a migration of the point of coherence upstream if and only if the scope tree directory entry associated with the first scope group is in the root state and the child vector of the entry only has a single other child cache (which will be the case if cache is in the root state).

Figure 12:
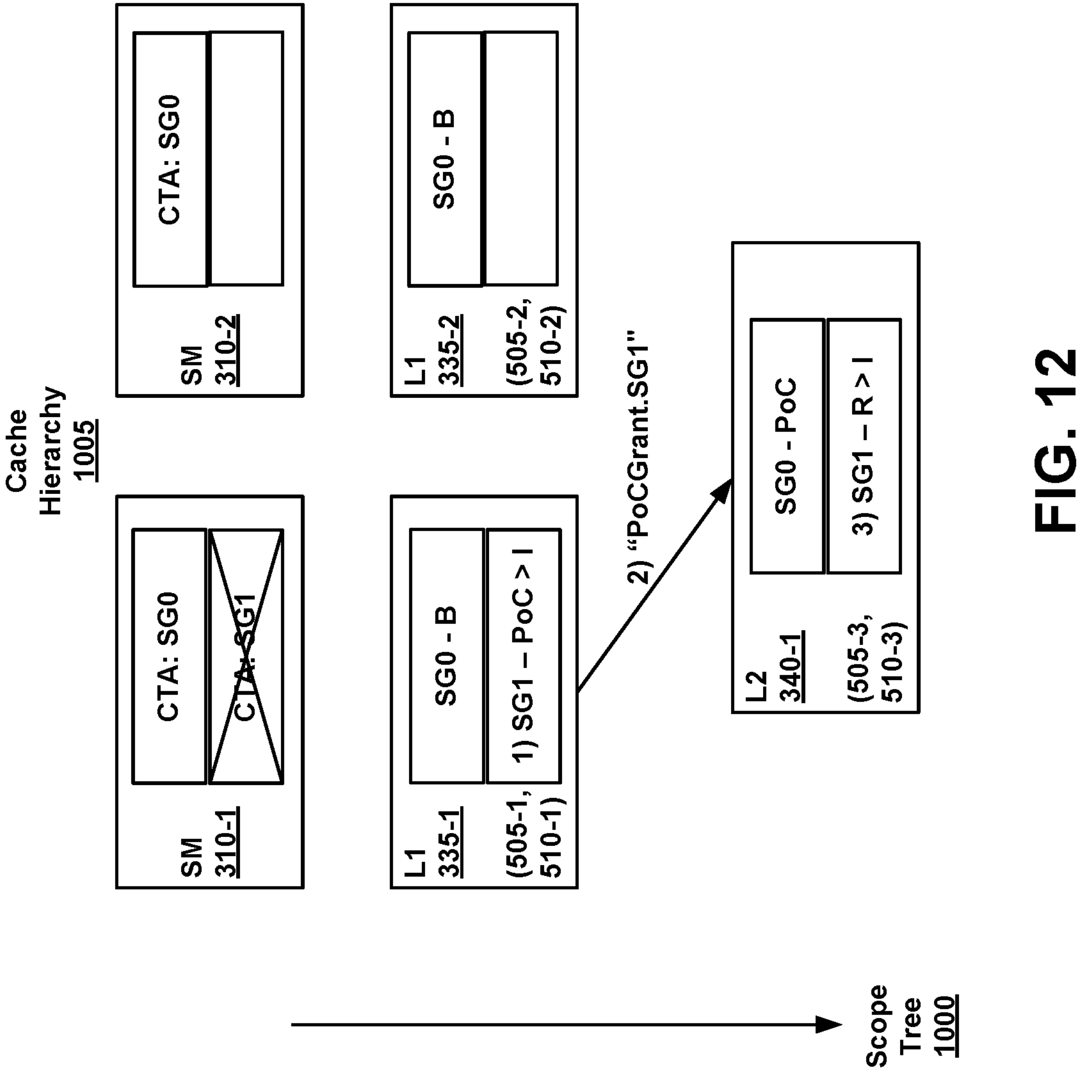
FIG. 12 illustrates a conceptual block diagram of an exemplar shrinking scope tree, according to various embodiments.

In some instances, the STPCs 505 can shrink the scope tree for a scope group. FIG. 12 illustrates a conceptual block diagram of an exemplar shrinking scope tree, according to various embodiments. In particular, FIG. 12 illustrates a conceptual block diagram of shrinking the scope tree 1000 associated with the scope group SG1 that is implemented, or stored in, the cache hierarchy 1005. Note that FIG. 12 also illustrates an exemplar scope tree for a scope group SG0 that is stored in the cache hierarchy 1005. However, for explanatory purposes, the description of FIG. 12 will focus on the process of shrinking the scope tree 1000 for scope group SG1 in the cache hierarchy 1005. As will be described herein, the process for shrinking the scope tree 1000 is performed in combination by the various STPCs 505 and/or CPCs 510 that reside in the cache memories included in the cache hierarchy 1005.

As described above with respect to the illustrated examples of FIGS. 10A and 10B, in the illustrated example of FIG. 12, the cache hierarchy 1005 includes two levels of a cache (e.g., a first level (L1) and a second level (L2)). However, persons skilled in the art will understand that the levels of caches illustrated in FIG. 12 are non-limiting, and that in other examples, more than two levels of cache can be included in the cache hierarchy 1005. The L1 caches 335-1 and 335-2 included in the cache hierarchy 1005 are considered to be the furthest "downstream" cache memories in cache hierarchy 1005 because the L1 caches 335-1, 335-2 are closest to the SMs 310. In contrast, the L2 cache 340-1 is considered to be the highest level, or furthest "upstream," cache memory because the L2 cache 340-1 is furthest away from the SMs 310. As further shown in the illustrated example of FIG. 12, each cache memory includes a respective STPC 505 and a respective CPC 510. For example, a first STPC 505-1 and a first CPC 510-1 reside in the L1 cache 335-1, a second STPC 505-2 and a second CPC 510-2 reside in the L1 cache 335-2, and a third STPC 505-3 and a third CPC 510-3 reside in the L2 cache 340-1. Persons skilled in the art will understand that the description of shrinking the scope tree 1000 associated with scope group SG1 in the cache hierarchy 1005 is equally applicable to the process of shrinking a scope tree within a cache hierarchy that includes more than two levels of cache memory.

Now with reference to FIG. 12, an example in which the STPCs 505 shrink the scope tree 1000 for the scope group SG1 is shown. In some embodiments, a replacement policy can be employed to clear entries in the scope tree directory of a STPC, thereby freeing those entries for assignment to other scope groups. For example, the replacement policy could be a least recently used policy clearing entries associated with scope groups for which memory access requests were least recently received. In some embodiments, SMs that stop executing threads associated with a scope group can transmit messages annotated with scope group IDs (e.g., ".SG1") associated with the threads that have stopped executing. In some embodiments, STPCs can determine that SMs have stopped executing threads in a scope group when the STPCs have not received a memory access request associated with the scope group for a predefined amount of time.

In the example of FIG. 12, the STPC 505-1 residing in the L1 cache 335-1 determines that the SM 310-1 has stopped executing threads in the scope group SG1 in response to receiving a message annotated with the scope group ID ".SG1." In response to determining that the SM 310-1 has stopped executing threads in the scope group SG1, the STPC 505-1 that resides in the L1 cache 335-1 immediately coupled to the SM 310-1 removes an entry associated with scope group SG1 from the scope tree directory of the STPC 505-1, which is shown as changing a state of the scope tree directory entry associated with scope group SG1 to the null, or "I" state. Furthermore, since the L1 cache 335-1 was the PoC for the scope group SG1, the STPC 505-1 further grants the PoC token to the parent cache memory, L2 cache 340-1, in the cache hierarchy 1005. Illustratively, the STPC 505-1 transmits a "PoCGrant. SG1" message to the L2 cache 340-1. In some examples, the STPC 505-1 further deletes and/or removes any data associated with the scope group SG1 from the L1 cache 335-1. In some examples, the STPC 505-1 instructs the CPC 510-1 to delete and/or remove any data associated with the scope group SG1 from the L1 cache 335-1, and the CPC 510-1 removes the data associated with the scope group SG1 from the L1 cache 335-1.

In response to receiving the PoC token for the scope group SG1, the STPC 505-3 that resides in the L2 cache 340-1 determines whether to change the scope group state of an entry associated with scope group SG1 in a scope tree directory of the STPC 505-3 to the PoC state, the root state, or the null state. The STPC 505-3 makes this determination based on the current scope group state of the L2 cache 340-1 for the scope group SG1 and/or based on any child caches in scope group SG1, as indicated by a child vector of the scope tree directory entry associated with scope group SG1. In the illustrated example of FIG. 12, the STPC 505-3 determines that the L2 cache 340-1 is in the root state and does not have any child caches associated with the scope group SG1. Accordingly, in response to determining that the L2 cache 340-1 is in the root state and does not have any child caches associated with the scope group SG1, the STPC 505-3 removes the scope tree directory entry associated with scope group SG1 by changing a state of the scope tree directory entry to the null, or "I" state. However, if in another example the STPC 505-3 determines that the L2 cache 340-2 has two child caches in scope group SG1 (e.g., L1 cache 335-2 and some other L1 cache), the STPC 505-3 could change the state of the scope tree directory entry associated with scope group SG1 to indicate the PoC state. Furthermore, if in another example the STPC 505-3 determines that the L2 cache 340-2 has one additional child cache in scope group SG1, the STPC 505-3 could grant the PoC token to the additional child cache and change the state of the scope tree directory entry associated with scope group SG1 to indicate the root state.

In some examples, the STPC 505-3 further deletes and/or removes any data associated with the scope group SG1 from the L2 cache 340-1. In some examples, the STPC 505-3 instructs the CPC 510-3 to delete and/or remove any data associated with the scope group SG1 from the L2 cache 340-1, and the CPC 510-2 removes the data associated with the scope group SG1 from the L2 cache 340-1. The example of shrinking the scope tree 1000 for scope group SG1, described with respect to FIG. 12, ends with the STPC 505-3 removing the entry associated with the scope group SG1 from the scope tree directory of the STPC 505-3 by assigning the data entry to the null, or "I" state that is not associated with any scope group. Persons skilled in the art will understand that, in operation, the STPCs 505 can continue to shrink and/or grow the scope tree 1000 as additional SMs 310 begin or cease executing threads in the scope group SG1. Moreover, persons skilled in the art will understand that the process for growing the scope tree 1000 described with respect to FIG. 12 can be effectively scaled for shrinking scope trees in cache hierarchies that include more than two levels of cache memory.

Figure 13:
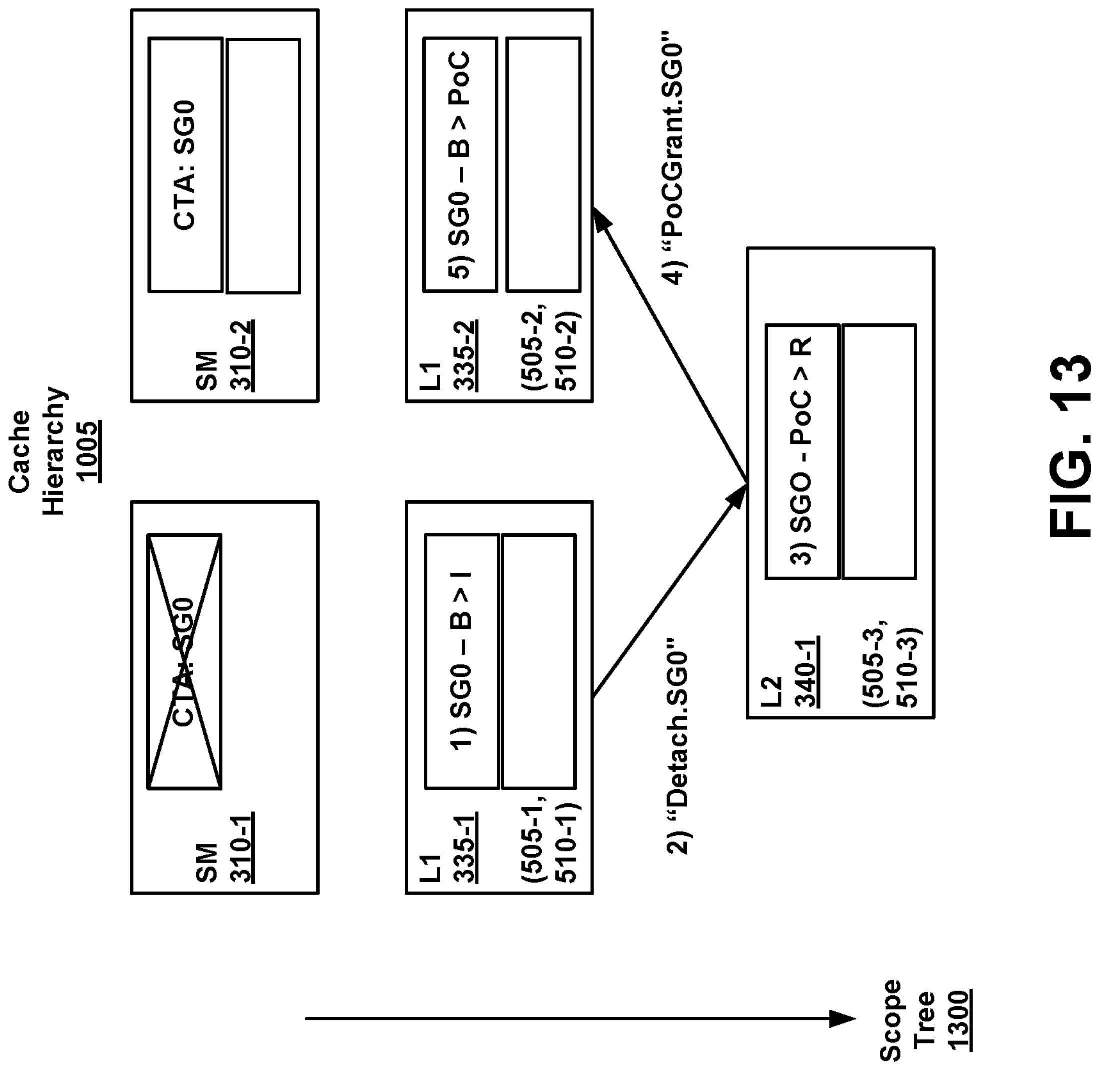
FIG. 13 illustrates a conceptual block diagram of another exemplar shrinking scope tree, according to various embodiments.

FIG. 13 illustrates a conceptual block diagram of another exemplar shrinking scope tree, according to various embodiments. In particular, FIG. 13 illustrates a conceptual block diagram of shrinking a scope tree 1300 associated with the scope group SG0 that is implemented, or stored in, the cache hierarchy 1005. As will be described herein, the process for shrinking the scope tree 1300 is performed in combination by the various STPCs 505 and/or CPCs 510 that reside in the cache memories included in the cache hierarchy 1005.

As described above with respect to the illustrated examples of FIGS. 10A, 10B, and 12, in the illustrated example of FIG. 13, the cache hierarchy 1005 includes two levels of a cache (e.g., a first level (L1) and a second level (L2)). However, persons skilled in the art will understand that the levels of cache memory illustrated in FIG. 13 are non-limiting, and that in other examples, more than two levels of cache memory can be included in the cache hierarchy 1005. The L1 caches 335-1 and 335-2 included in the cache hierarchy 1005 are considered to be the furthest "downstream" cache memories in cache hierarchy 1005 because the L1 caches 335-1, 335-2 are closest to the SMs 310. In contrast, the L2 cache 340-1 is considered to be the highest level, or furthest "upstream," cache memory because the L2 cache 340-1 is furthest away from the SMs 310. As further shown in the illustrated example of FIG. 13, each cache memory includes a respective STPC 505 and a respective CPC 510. For example, a first STPC 505-1 and a first CPC 510-1 resides in the L1 cache 335-1, a second STPC 505-2 and a second CPC 510-2 resides in the L1 cache 335-2, and a third STPC 505-3 and a third CPC 510-3 resides in the L2 cache 340-1. Persons skilled in the art will understand that the description of shrinking the scope tree 1300 associated with scope group SG0 in the cache hierarchy 1005 is equally applicable to the process of shrinking a scope tree within a cache hierarchy that includes more than two levels of cache memory.

Now with reference to FIG. 13, an example in which the STPCs 505 shrink the scope tree 1300 for the scope group SG0 is shown. In some embodiments, a replacement policy, such as a least recently used policy, can be employed to clear entries in the scope tree directory of a STPC, thereby freeing those entries for assignment to other scope groups. In some embodiments, SMs that stop executing threads associated with a scope group can transmit messages annotated with the scope group IDs (e.g., ".SG1") associated with the threads that have stopped executing. In some embodiments, STPCs can determine that SMs have stopped executing threads in a scope group when the STPCs have not received a memory access request associated with the scope group for a predefined amount of time.

In the example of FIG. 13, the STPC 505-1 residing in the L1 cache 335-1 determines that the SM 310-1 has stopped executing threads in the scope group SG1 in response to receiving a message annotated with the scope group ID ".SG1." In response to determining that the SM 310-1 has stopped executing threads in the scope group SG1, the STPC 505-1 that resides in the L1 cache 335-1 immediately coupled to the SM 310-1 removes an entry associated with scope group SG1 from the scope tree directory of the STPC 505-1, which is shown as changing a state of the scope tree directory entry associated with scope group SG1 from the branch state to the null, or "I" state.

In addition, the STPC 505-1 transmits a "Detach. SG0" message to the parent L2 cache 340-1, where the "Detach. SG0" message indicates to the parent L2 cache 340-1 that the L1 cache 335-1 should be detached from the scope tree associated with scope group SG0. In some examples, the STPC 505-1 further deletes and/or removes any data associated with the scope group SG0 from the L1 cache 335-1. In some examples, the STPC 505-1 instructs the CPC 510-1 to delete and/or remove any data associated with the scope group SG0 from the L1 cache 335-1, and the CPC 510-1 removes the data associated with the scope group SG0 from the L1 cache 335-1.

Continuing with reference to FIG. 13, the STPC 505-3 that resides in the L2 cache 340-1 receives the "Detach. SG0" message, and the STPC 505-3 determines that the L2 cache 340-1 the point of coherence for scope group SG0, which can be indicated by an entry associated with scope group SG0 in a scope tree directory of the STPC 505-3. In response to determining that the L2 cache 340-1 is the point of coherence for the scope group SG0 and because there exists exactly a single remaining child cache of the L2 cache 340-1 that is associated with scope group SG0 (as indicated by a child vector of the scope tree directory entry), namely L1 cache 335-2, the STPC 505-3 changes the scope tree directory entry associated with scope group SG0 to indicate the root state. It should be noted that if there existed multiple remaining child caches associated with scope group SG0, the scope tree directory entry would remain indicating the PoC state.

In addition, the STPC 505-3 determines whether to grant the PoC for the scope group SG0 to a child cache based on the child caches associated with the scope group SG0. In the illustrated example of FIG. 13, based on the scope tree directory entry associated with scope group SG0 including a child vector that points to only the L1 cache 335-2, the STPC 505-3 determines that the L2 cache 340-2 has one child cache associated with the scope group SG0, namely the L1 cache 335-2. In such a case, it would be correct to keep the L2 cache 340-2 as the point of coherence, or to migrate the point of coherence to the L1 cache 335-2, because both the L2 cache 340-2 and the L1 cache 335-2 are visible to all SMs executing threads associated with scope group SG0, namely SM 310-2. Illustratively, the STPC 505-3 transmits a "PoCGrant. SG0" token to the L1 cache 335-2.

In response to receiving the PoC token for the scope group SG0, the STPC 505-2 that resides in the L1 cache 335-2 determines whether to change the scope group state of the L1 cache 335-2 to the PoC state. The STPC 505-2 makes this determination based on the current scope group state of the L1 cache 335-2 for the scope group SG0 and/or based on the child caches of the L1 cache 335-2 that are associated with scope group SG0. In the illustrated example of FIG. 13, the STPC 505-2 determines, based on an entry associated with scope group SG0 in the scope tree directory of STPC 505-2, that the L1 cache 335-2 is (1) in the branch state, (2) does not have any child caches associated with the scope group SG0, and (3) is the lowest level cache. In response, the STPC 505-2 changes the scope group state of the L1 cache 335-2 from the branch state to the PoC state for the scope group SG0 by updating the scope tree directory entry associated with scope group SG0 to indicate the PoC state.

The example of shrinking the scope tree 1300 for scope group SG0 described with respect to FIG. 13 ends with the L1 cache 335-2 being assigned to the PoC state for the scope group SG0. However, persons skilled in the art will understand that, in operation, the STPCs 505 can continue to shrink and/or grow the scope tree 1300 as additional SMs 310 begin or cease executing threads in the scope group SG0. Moreover, persons skilled in the art will understand that the process for shrinking the scope tree 1300 described with respect to FIG. 13 can be effectively scaled for shrinking scope trees in cache hierarchies that include more than two levels of cache memory.

Figure 14A:
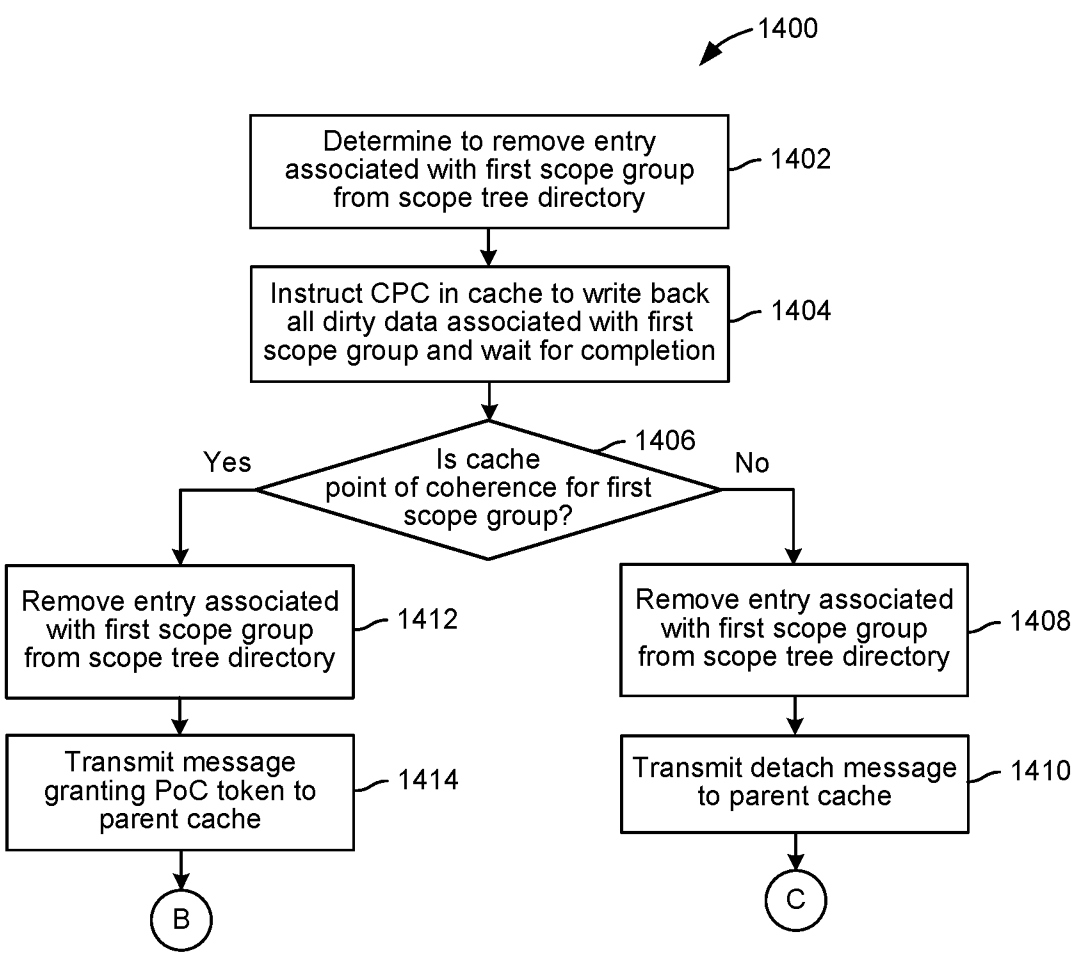
FIGS. 14A-14B illustrate a flow diagram of method steps for shrinking a scope tree, according to various embodiments.
Figure 14B:
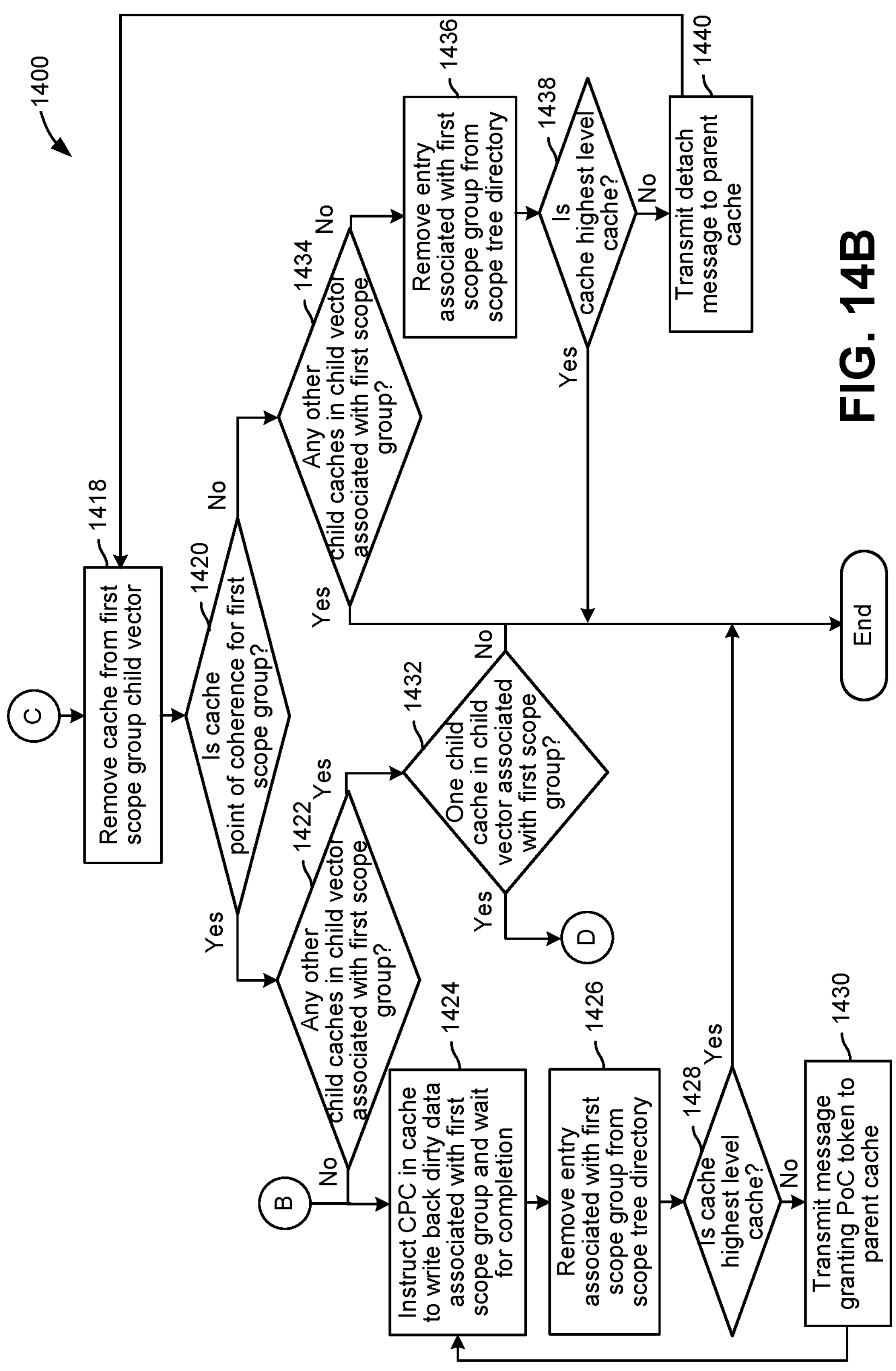

FIGS. 14A-14B illustrate a flow diagram of method steps for shrinking a scope tree, according to various embodiments. The method operations can be performed by one or more of the STPCs 505. Additionally or alternatively, the method operations can be performed by one or more of the CPC 510, the SMs 310, processing units and/or alternative accelerators including, without limitation, CPUs, GPUs, DMA units, IPUs, NPUs, TPUs, NNPs, DPUs, VPUs, ASICs, FPGAs, and/or the like, in any combination. Furthermore, one or more of the method operations can be performed atomically by multiple STPCs 505 and/or SMs 310 executing in parallel. Although the method operations are described in conjunction with the systems of FIGS. 1-13, persons of ordinary skill in the art will understand that any system configured to perform the method operations, in any order, is within the scope of the present disclosure.

As shown in FIG. 14A, a method 1400 begins at operation 1402, where an STPC in a cache determines to remove an entry associated with a first scope group from a scope tree directory of the STPC. In some embodiments, the STPC can implement a replacement policy, such as a least recently used replacement policy, to periodically remove some entries in the scope tree directory, such as by changing the state of least recently used entries to the null state so that those entries can be reallocated for other scope groups. In some embodiments, an application running on SMs can request to remove an entry in the scope tree directory associated with a particular scope group, such as when computations being performed by the application have completed.

At operation 1404, the STPC instructs the CPC in the cache to write back all dirty data associated with the first scope group to a parent cache, and the STPC waits for completion of the write-back.

At operation 1406, the STPC determines whether the cache is the point of coherence for the first scope group. In some embodiments, the entry associated with the first scope group that is removed from the scope tree directory includes state information indicating whether the cache is the point of coherence for the first scope group.

If the STPC determines that the cache is not the point of coherence for the first scope group, then at operation 1408, the STPC removes the entry associated with the first scope group from the scope tree directory of the STPC.

Then, at operation 1410, the STPC transmits a detach message specifying the first scope group (e.g., the "Detach. SG0" message described above in conjunction with FIG. 13) to a parent cache, which is a next higher level cache to which the cache is coupled. The detach message indicates the cache that includes the STPC should be removed from the scope tree for the first scope group.

On the other hand, if the STPC determines at operation 1406 that the cache is the point of coherence for the first scope group, then the method 1400 continues to operation 1412, where the STPC removes the entry associated with the first scope group from the scope tree directory of the STPC.

Then, at operation 1414, the STPC transmits a message granting a point of coherence token (e.g., the "PoCGrant. SG1" message described above in conjunction with FIG. 12) to the parent cache.

As shown in FIG. 14B, in response to receiving the detach message transmitted at operation 1408, the parent cache removes the cache from a child vector of an entry associated with the first scope group in a scope tree directory of the STPC in the parent cache at operation 1418.

At operation 1420, if the parent cache is the point of coherence for the first scope group, then the method 1400 continues to operation 1422. Similar to the description above in conjunction with operation 1404, in some embodiments, the entry associated with the first scope group that is removed from the scope tree directory at operation 1408 includes state information indicating whether the parent cache is the point of coherence for the first scope group.

At operation 1422, if there are no other child caches in the child vector of the entry associated with the first scope group in the scope tree directory of the STPC in the parent cache, or after receiving the message granting the point of coherence token transmitted at operation 1414, the method 1400 continues to operation 1424.

At operation 1424, the STPC in the parent cache instructs the CPC in the parent cache to write back dirty data associated with the first scope group to a parent cache (of the parent cache, assuming such a parent cache exists), and the STPC waits for completion of the write-back.

At operation 1426, the STPC in the parent cache removes the entry associated with the first scope group from the scope tree directory of the STPC.

At operation 1428, if the parent cache is the highest level cache, then the method 1400 ends. On the other hand, if the parent cache is not the highest level cache, then the method 1400 continues to operation 1430, where the STPC in the parent cache transmits a message granting a point of coherence token to a parent cache (of the parent cache). The method 1400 then returns to operation 1424, where a STPC in the parent cache (of the parent cache) instructs a CPC in the parent cache (of the parent cache) to write back dirty data associated with the first scope group to another parent cache (assuming there is such a parent cache), and the STPC waits for completion of the write-back.

Returning to operation 1422, if there is any other child cache in the child vector of the entry associated with the first scope group in the scope tree directory of the STPC in the parent cache, then the method 1400 continues to operation 1432. At operation 1432, if there is more than one child cache in the child vector of the entry associated with the first scope group in the scope tree directory of the STPC in the parent cache, then the method 1400 ends. On the other hand, if there is exactly one child cache in the child vector of the entry associated with the first scope group in the scope tree directory of the STPC in the parent cache, then the STPC in the parent cache determines whether to migrate the point of coherence downstream or to make the parent cache the point of coherence. The STPC transmits a message migrating the point of coherence downstream if the STPC determines to migrate the point of coherence downstream, as discussed in greater detail below in conjunction with FIGS. 16C and 18.

Returning to operation 1420, if the parent cache is not the point of coherence for the first scope group, then the method 1400 continues to operation 1434. At operation 1434, if there are other child caches in the child vector of the entry associated with the first scope group in the scope tree directory of the STPC in the parent cache, then the method 1400 ends. On the other hand, if there are no other child caches in the child vector of the entry associated with the first scope group in the scope tree directory of the STPC in the parent cache, then the method 1400 continues to operation 1436, where the STPC in the parent cache removes the entry associated with the first scope group from the scope tree directory of the STPC in the parent cache.

At operation 1438, if the parent cache is the highest level cache, then the method 1400 ends. On the other hand, if the parent cache is not the highest level cache, then the method 1400 continues to operation 1438, where the STPC in the parent cache transmits a detach message specifying the first scope group to a parent cache (of the parent cache). Operation 1438 is similar to operation 1408, described above in conjunction with FIG. 14A. The method 1400 then returns to operation 1418, where, in response to receiving the detach message, an STPC in the parent cache of the parent cache removes the parent cache from the child vector of an entry associated with the first scope group in a scope tree directory of the STPC in the parent cache of the parent cache.

Figure 15:
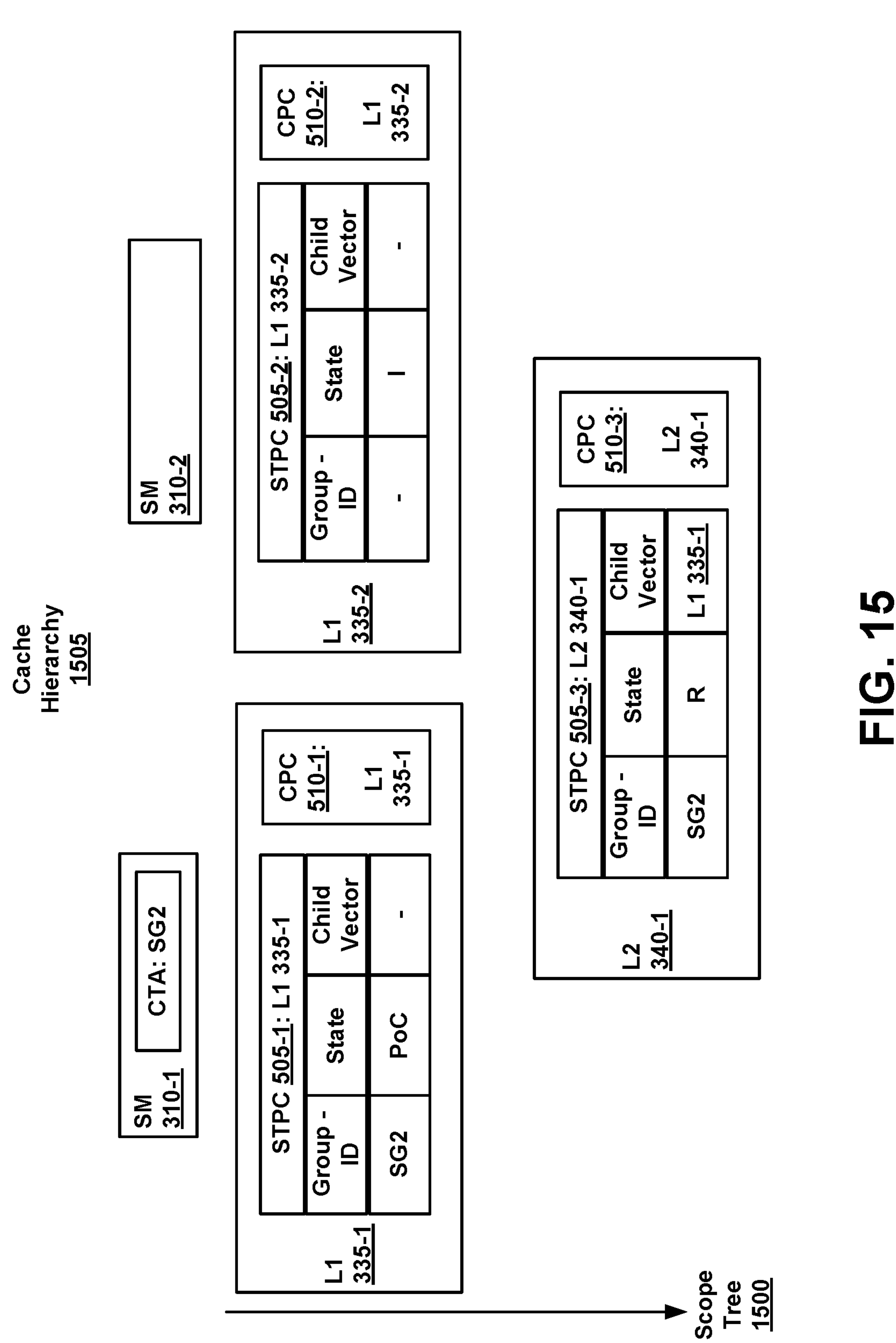
FIG. 15 illustrates a conceptual block diagram of an exemplar scope tree stored in a cache hierarchy, according to various embodiments.

FIG. 15 illustrates a conceptual block diagram of an exemplar scope tree 1500 stored in a cache hierarchy 1505, according to various embodiments. As described herein, as SMs 310 start and/or stop executing threads in various scope groups, the STPCs 505 can dynamically update the scope trees for the various scope groups to improve efficiency and communication latencies of a cache hierarchy. In many cases, updating a scope tree at runtime includes migrating the point of coherence in a scope tree as new SMs 310 start executing threads in a scope group that corresponds to an existing scope tree and/or as SMs 310 stop executing threads in a scope group that corresponds to an existing scope tree.

In the illustrated example of FIG. 15, the cache hierarchy 1505 includes two levels of a cache memory (e.g., a first level (L1) and a second level (L2)). However, persons skilled in the art will understand that the levels of cache memory illustrated in FIG. 15 are non-limiting, and that in other examples, more than two levels of cache memory can be included in the cache hierarchy 1505. The L1 caches 335-1 and 335-2 included in the cache hierarchy 1505 are considered to be the furthest "downstream" cache memories in cache hierarchy 1505 because the L1 caches 335-1, 335-2 are closest to the SMs 310. In contrast, the L2 cache 340-1 is considered to be the highest level, or furthest "upstream," cache memory because the L2 cache 340-1 is furthest away from the SMs 310. As further shown in the illustrated example of FIG. 15, each cache memory includes a respective STPC 505 and a respective CPC 510. For example, a first STPC 505-1 and a first CPC 510-1 reside in the L1 cache 335-1, a second STPC 505-2 and a second CPC 510-2 reside in the L1 cache 335-2, and a third STPC 505-3 and a third CPC 510-3 reside in the L2 cache 340-1.

FIG. 15 illustrates the state of the scope tree 1500 for scope group SG2 before a point of coherence for the scope tree 1500 is migrated. As shown in FIG. 15, the SM 310-1 coupled to the L1 cache 335-1 is currently executing thread(s) in the scope group SG2. However, the SM 310-2 coupled to the L1 cache 335-2 is not currently executing any threads in the scope group SG2. Accordingly, in the illustrated example of FIG. 15, the L1 cache 335-1 is in the PoC state for scope group SG2 because the L1 cache 335-1 is the furthest downstream cache memory in the cache hierarchy 1505 that is visible to all SMs 310 executing threads in the scope group SG2. As further shown in FIG. 15, the L2 cache 340-1 is in the root state for scope group SG2, and the L1 cache 335-2 is in the null state with respect to scope group SG2. The process of migrating the PoC in the scope tree 1500 will now be described.

FIGS. 16A-16E illustrate conceptual block diagrams for migrating a point of coherence in the exemplar scope tree 1500 of FIG. 15, according to various embodiments. With respect to FIG. 16A, the SM 310-2 coupled to the L1 cache 335-2 starts executing threads in the scope group SG2. In some examples, after the SM 310-2 starts executing threads in the scope group SG2, the SM 310-2 can forward, or transmit, a memory access request annotated with the scope group ID ". SG2" to the L1 cache 335-2. In the illustrated example of FIG. 16A, the memory access request is a load command "Load. SG2." However, persons skilled in the art will understand that a load command is just one non-limiting example of a memory access request that an SM 310 can transmit to a cache memory while executing threads in a scope group.

Figure 16A:
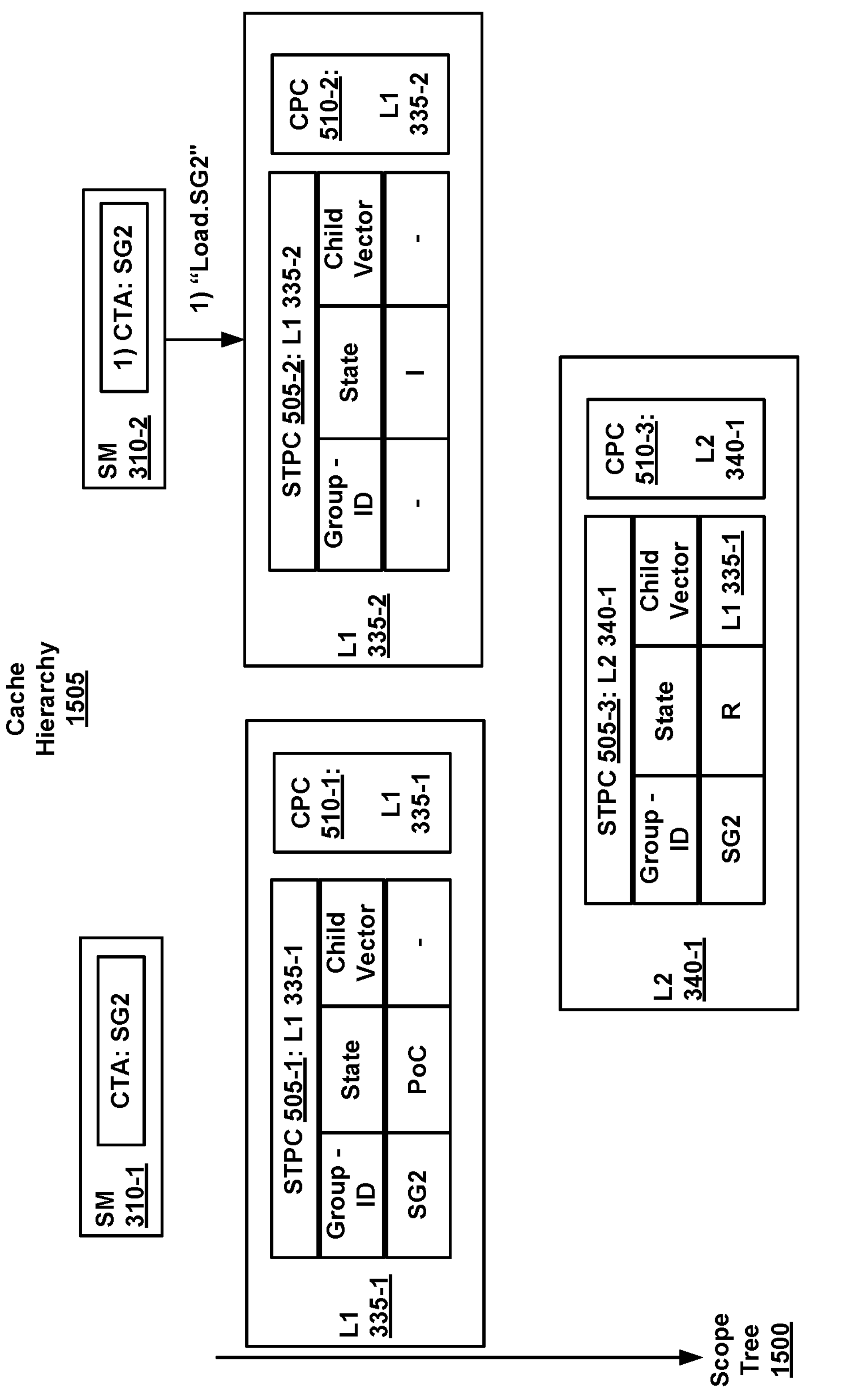
FIGS. 16A-16E illustrate conceptual block diagrams of exemplar migrations of a point of coherence in the scope tree of FIG. 15, according to various embodiments.
Figure 16B:
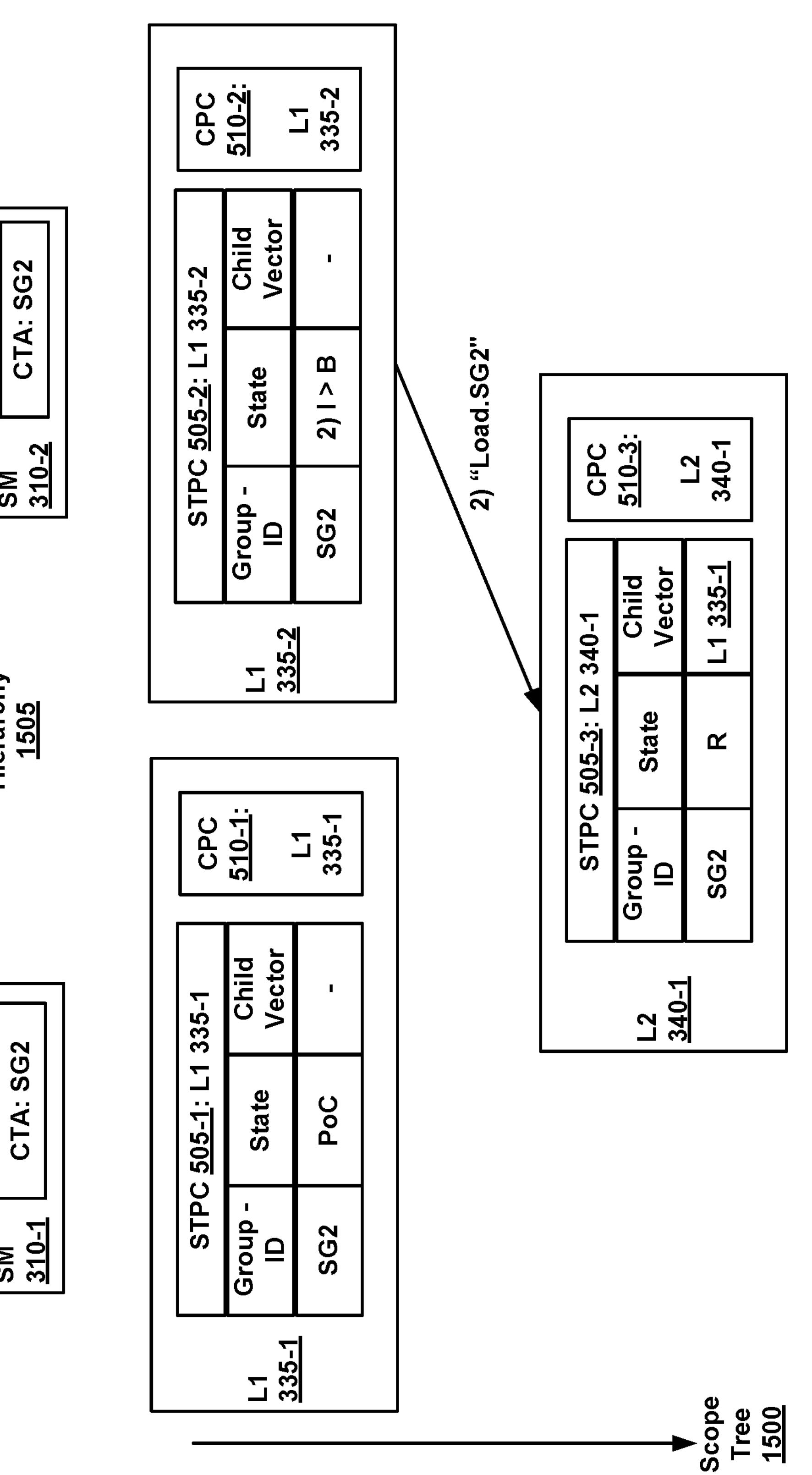

Referring now to FIG. 16B, the STPC 505-2 residing in the L1 cache 335-2 receives the "Load. SG2" request from the SM 310-2. After receiving the "Load. SG2" request, the STPC 505-2 determines whether a scope tree directory of the STPC 505-2 includes an entry associated with scope group SG2, or if the scope tree directory only includes entries associated with other scope groups and/or entries with the null, or "I" state. If no scope tree directory entries are associated with scope group SG2, then the L1 cache 335-2 is not yet part of the scope tree for scope group SG2. In the illustrated example of FIG. 16B, the scope tree directory of the STPC 505-2 initially includes an entry with the null, or "I" state, but no entry associated with scope group SG2. However, because the L1 cache 335-2 that includes the STPC 505-2 is used by the SM 310-2 that executes thread(s) in the scope group SG2 (as indicated by the Load.SG2 request), the L1 cache 335-1 needs to be added to the scope tree for scope group SG2.

In response to receiving the "Load. SG2" request and determining that the scope tree directory of the STPC 505-2 does not include an entry associated with scope group SG2, the STPC 505-2 allocates an entry associated with scope group SG2 in the scope tree directory. In the example of FIG. 16B, the STPC 505-1 allocates a scope tree directory entry associated with scope group SG2 by changing a scope tree directory entry from the null, or "I" state to the branch state, or "B" state, for scope group SG2. Furthermore, the STPC 505-2 determines to not serve the "Load. SG2" memory access request. Stated another way, the "Load. SG2" memory access request misses. Accordingly, the STPC 505-2 forwards the "Load. SG2" memory access request to the next, higher level of cache memory in the cache hierarchy 1005. In the illustrated example of FIG. 16B, the STPC 505-2 forwards the "Load. SG2" memory access request to the L2 cache 340-1.

Figure 16C:
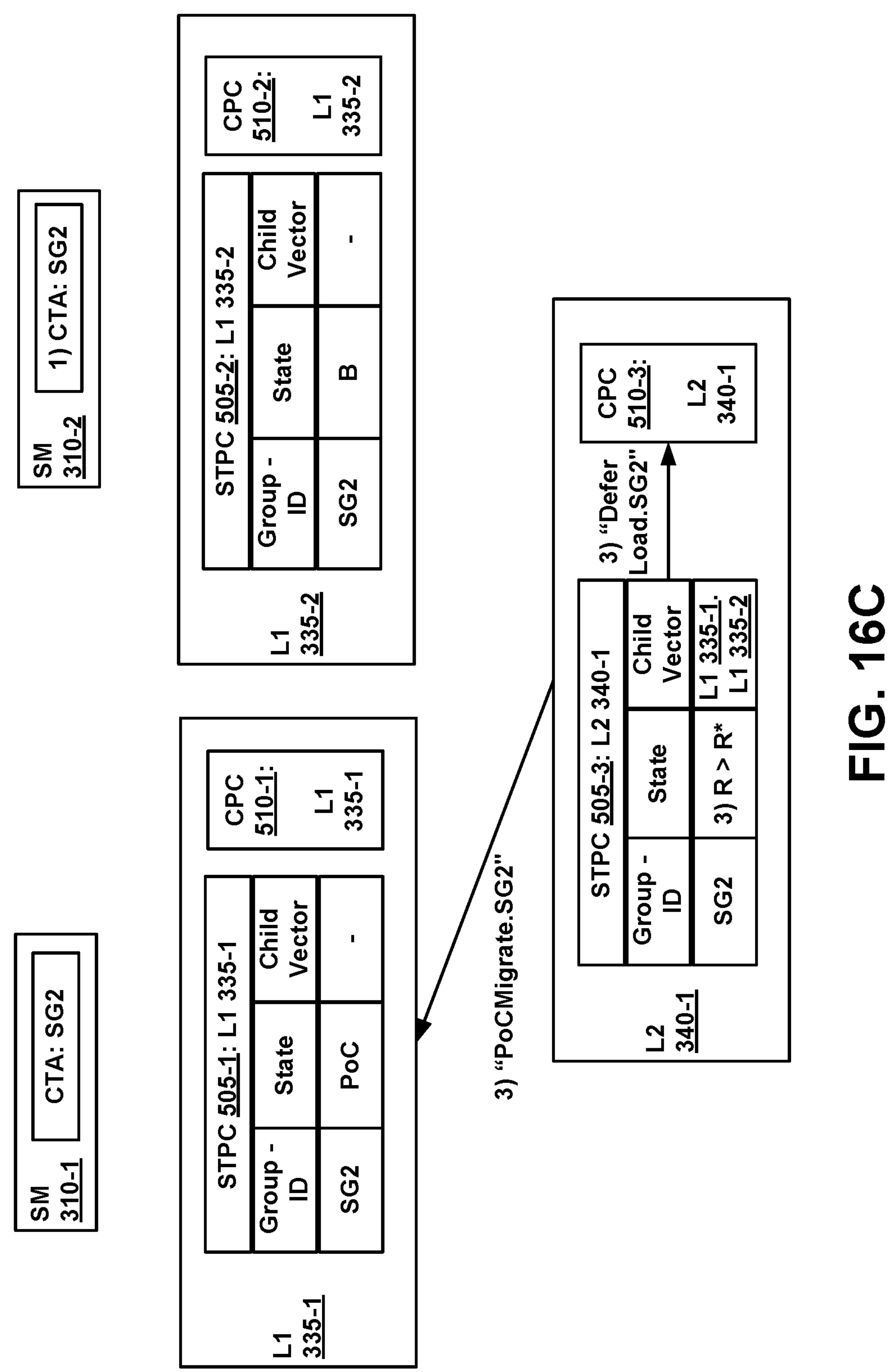

Referring now to FIG. 16C, the STPC 505-3 residing in the L2 cache 340-1 receives the forwarded "Load. SG2" memory access request from the L1 cache 335-2. When the STPC 505-3 receives the forwarded "Load. SG2" memory access request, the STPC 505-3 determines based on a scope tree directory entry associated with scope group SG2 that the L2 cache 340-1 is currently in the root state for scope group SG2 and already has a child cache memory, namely the L1 cache 335-1, that is associated with scope group SG2. Because L2 cache 340-1 now has multiple child cache memories associated with scope group SG2, namely the L1 cache 335-1 and the L1 cache 335-2, the STPC 505-3 determines that the L2 cache 340-1 should be the point of coherence for scope group SG2 rather than a root of the scope tree for scope group SG2. In response, the STPC 505-3 changes the scope group state of the L2 cache 340-1 in the scope tree directory entry from the root state, or "R" state, to the transient root, or "R*" state, and the STPC 505-3 further transmits a "PoCMigrate. SG2" request to the child cache memory L1 cache 335-1. The "PoCMigrate. SG2" request is a request for the PoC token from the child L1 cache 335-1 or other descendant cache memory that is the current point of coherence. Moreover, the "PoCMigrate. SG2" request functions as a request for consistent data associated with the scope group SG2. Consistent data associated with the scope group SG2 refers to data that was previously modified and is associated with the scope group SG2 that is currently stored in the point of coherence cache memory for scope group SG2. Alternatively, in the illustrated example of FIG. 16C, consistency can also be ensured if any data written that is associated with any scope group is forwarded to the L2 cache 340-1.

In addition, the STPC 505-3 adds a pointer to the L1 cache 335-2 to the child vector included in the scope tree directory entry associated with scope group SG2, and the STPC 505-3 transmits a "Defer Load. SG2" command to the CPC 510-3 that resides in the L2 cache 340-1. The "Defer Load. SG2" instructs the CPC 510-3 to refrain from serving the "Load. SG2" request, as the data entries associated with scope group SG2 and stored in the L2 cache 340-1 are potentially inconsistent with the data entries associated with SG2 that are stored at the point of coherence for scope group SG2. In some examples, in response to receiving the "Defer Load. SG2" command, the CPC 510-3 changes the value of the tag for data entries in L2 cache 340-1 associated with scope group SG2 to invalid.

Figure 16D:
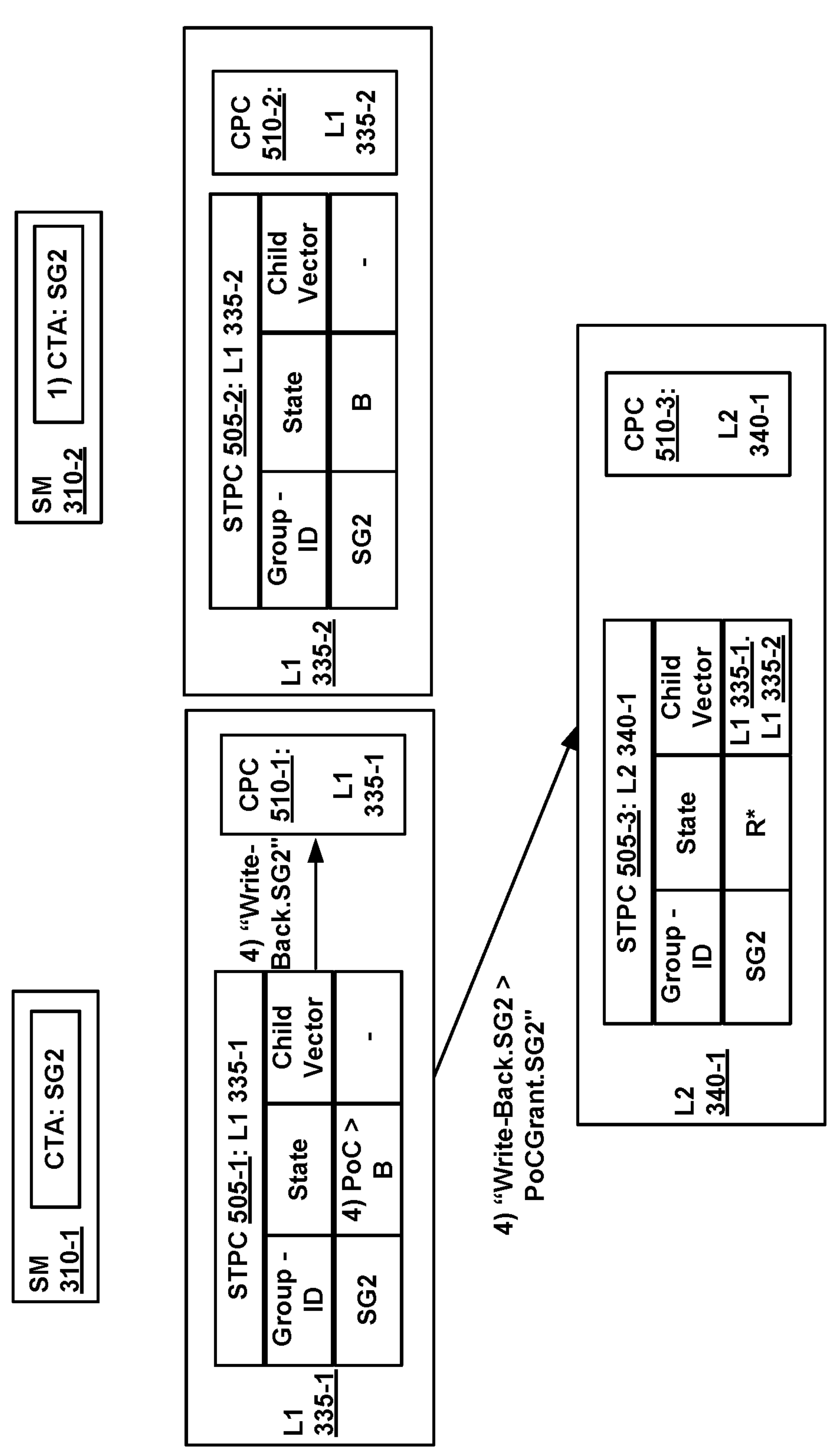

Referring now to FIG. 16D, the STPC 505-1 residing in the L1 cache 335-1 receives the "PoCMigrate. SG2" command from the STPC 505-3. In response, the STPC 505-1 instructs the CPC 510-1 residing in the L1 cache 335-1 to transmit copies of the data entries associated with scope group SG2 stored in L1 cache 335-1 to the L2 cache 340-1. Alternatively, the CPC 510-1 can transmit all data entries associated with any scope to the L2 cache 340-1. Illustratively, the STPC 505-1 transmits a "Write-Back. SG2" command to the CPC 510-1, and in response, the CPC 510-1 writes back any data associated with scope group SG2 and stored in the L1 cache 335-1 to the L2 cache 340-1. The data associated with scope group SG2 that is written back from the CPC 510-1 to the L2 cache 340-1 includes dirty data (and can also include clean data without violating correctness, although only writing back dirty data is enough to enforce consistency). In addition, the data associated with scope group SG2 that is written back from the CPC 510-1 to the L2 cache 340-1 is considered "consistent data" associated with scope group SG2.

After dirty data has been written back to the point of coherence cache, namely the L2 cache 340-1, and was hence made consistent, the L1 cache 335-1 can maintain a local copy of the data that is now considered clean in the cache, but the cache 335-1 does not have to maintain such a local copy of the data. In summary, dirty data is usually inconsistent if the dirty data is stored in a cache that is in the branch state, and such dirty data must be made visible to the point of coherence cache at a release memory access operation. Clean data may be inconsistent in a cache that is in the branch state, and such clean data must be invalidated at an acquire memory access operation, to ensure that a subsequent load operation misses in the branch caches and retrieves consistent data from the point of coherence cache. In addition, data in the point of coherence cache and root caches is always consistent.

After the CPC 510-1 writes back the data associated with scope SG2 to the L2 cache 340-1 and further in response to receiving the "PoCMigrate. SG2" request, the STPC 505-1 updates an entry in the scope tree directory of the STPC 505-1 that is associated with scope SG2 to indicate that the L1 cache 335-1 is in the branch state for scope group SG2, and the STPC 505-1 transmits the PoC token for scope group SG2 to the L2 cache 340-1. Illustratively, the STPC 505-1 transmits the PoC token to the L2 cache 340-1 via a "PoCGrant. SG2" message. In some embodiments, the "PoCGrant. SG2" message behaves when traveling upstream like a release operation by checking that every child cache has completed a write back of all dirty data to the STPC cache in the transient state. Only when the write back of each cache that forwards the message that includes the point of coherence token to the cache in the transient state is completed is the message that includes the point of coherence token forwarded to the next parent cache.

Figure 16E:
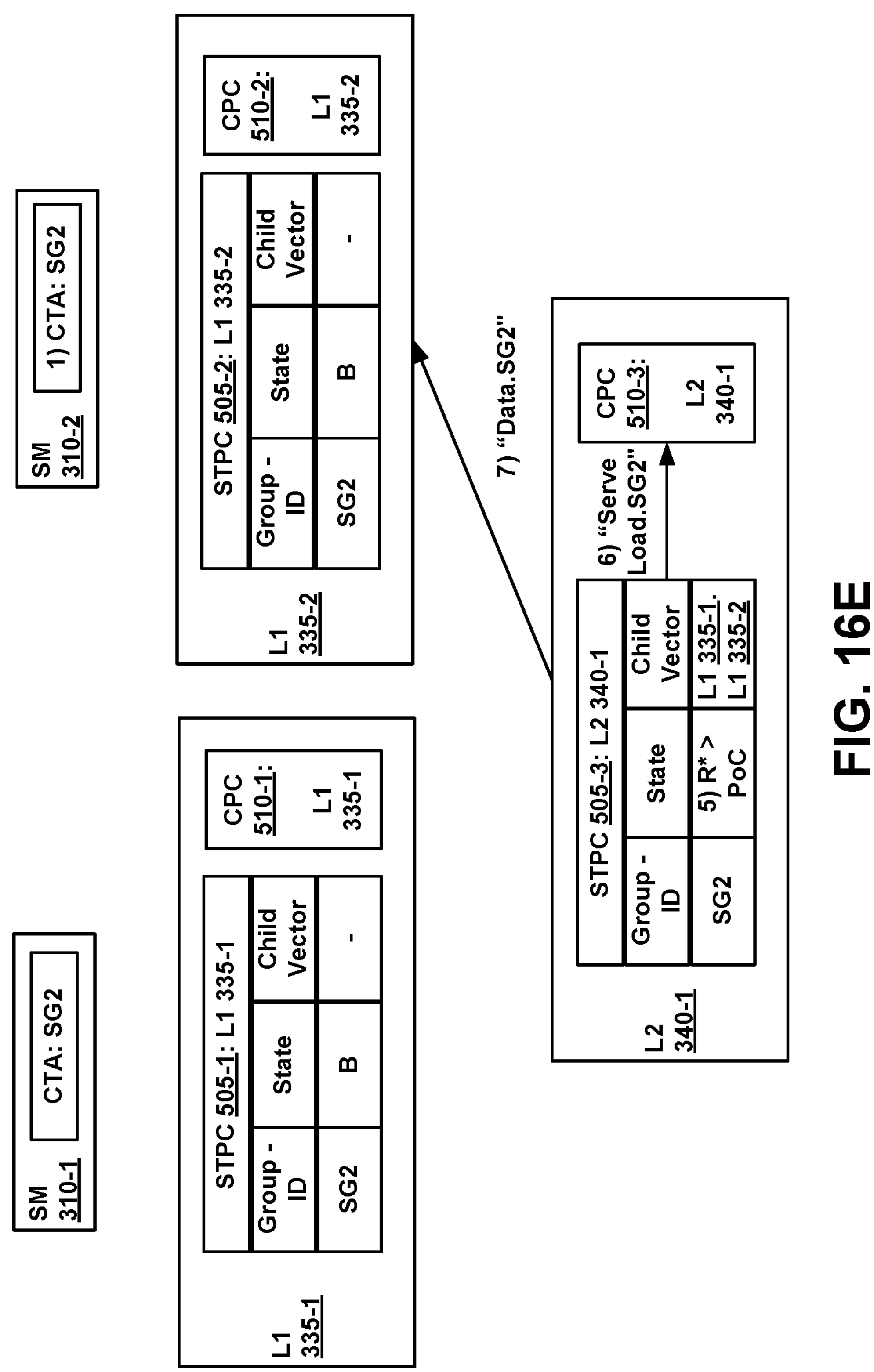

Referring now to FIG. 16E, the L2 cache 340-1 receives the consistent data associated with scope group SG2. Illustratively, the CPC 510-3 residing in the L2 cache 340-1 receives the "WriteBack. SG2," which includes the copies of consistent data that is associated with SG2 and stored in the L1 cache 335-1. In response, the CPC 510-3 updates data entries associated with scope group SG2 and stored in the L2 cache 340-1 to include the consistent data associated with scope group SG2. For example, the CPC 510-3 can replace any existing, inconsistent data entries associated with scope group SG2 and stored in the L2 cache 340-1 with the consistent data associated with scope group SG2 that is received from the L1 cache 335-1. Accordingly, data entries in a cache (e.g., L2 cache 340-1) associated with a scope group for which the scope group directory indicates the cache is in a point of coherence or root state are always consistent. However, a point of coherence cache may remove data from the local cache at any time. If the removed data is dirty, the point of coherence cache must write the dirty copy back to a parent cache. A subsequent write to dirty data will simply overwrite the data with a newer value. In addition, in some embodiments, data written back by the CPC 510-1 of the L1 cache 335-1 that the CPC 510-3 does not store locally in the cache memory of the L2 cache 340-1 is forwarded to the next higher memory level (not shown), such as a parent cache or in the case of highest level cache backing memory.

Furthermore, the L2 cache 340-1 receives the PoC token from the L1 cache 335-1. Because the STPC 505-3 that resides in the L2 cache 340-1 also receives the "PoCGrant. SG2" message from the L1 cache 335-1 that grants the PoC token, the STPC 505-3 updates an entry associated with scope group SG2 in the scope tree directory of the STPC 505-3 to indicate the L2 cache 340-1 is the PoC state for scope group SG2. Illustratively, the STPC 505-3 changes the scope tree directory entry from the transient root state to the PoC state for scope group SG2. After assigning the L2 cache 340-1 to the PoC state for scope group SG2, the STPC 505-3 instructs the CPC 510-3 residing in the L2 cache 340-1 to serve the "Load. SG2" memory access request with the consistent data associated with scope group SG2 that is now stored in the L2 cache 340-1. Illustratively, the STPC 505-3 transmits a "Serve Load. SG2" command to the CPC 510-3. In response to receiving the "Serve Load. SG2" command, the CPC 510-3 writes, or transmits, the consistent data associated with scope group SG2 to the L1 cache 335-2 to serve the initial "Load. SG2" memory access request.

Although not shown, the CPC 510-2 residing in the L1 cache 335-2 then receives the consistent data associated with scope group SG2 from L2 cache 340-1 and can update the data entries associated with scope group SG2 and stored in the L1 cache 335-2 to include the consistent data associated with scope group SG2. In addition, the STPC 505-2 can instruct the CPC 510-2 to serve the "Load. SG2" memory access request. In response, the CPC 510-2 provides, or transmits, the consistent data associated with scope group SG2 to the SM 310-2.

The example of migrating the PoC in the scope tree 1500 described with respect to FIGS. 16A-16E ends with the PoC migrating to the L2 cache 340-1 and the "Load. SG2" memory access request being served with consistent data. However, persons skilled in the art will understand that, in operation, the STPCs 505 can continue to migrate the PoC in the scope tree 1500 as additional SMs 310 begin or cease executing threads in the scope group SG2. Moreover, persons skilled in the art will understand that the process for migrating the PoC in the scope tree 1500 described with respect to FIGS. 16A-16E can be effectively scaled for migrating PoCs in scope trees in cache hierarchies that include more than two levels of cache memory.

Figure 17:
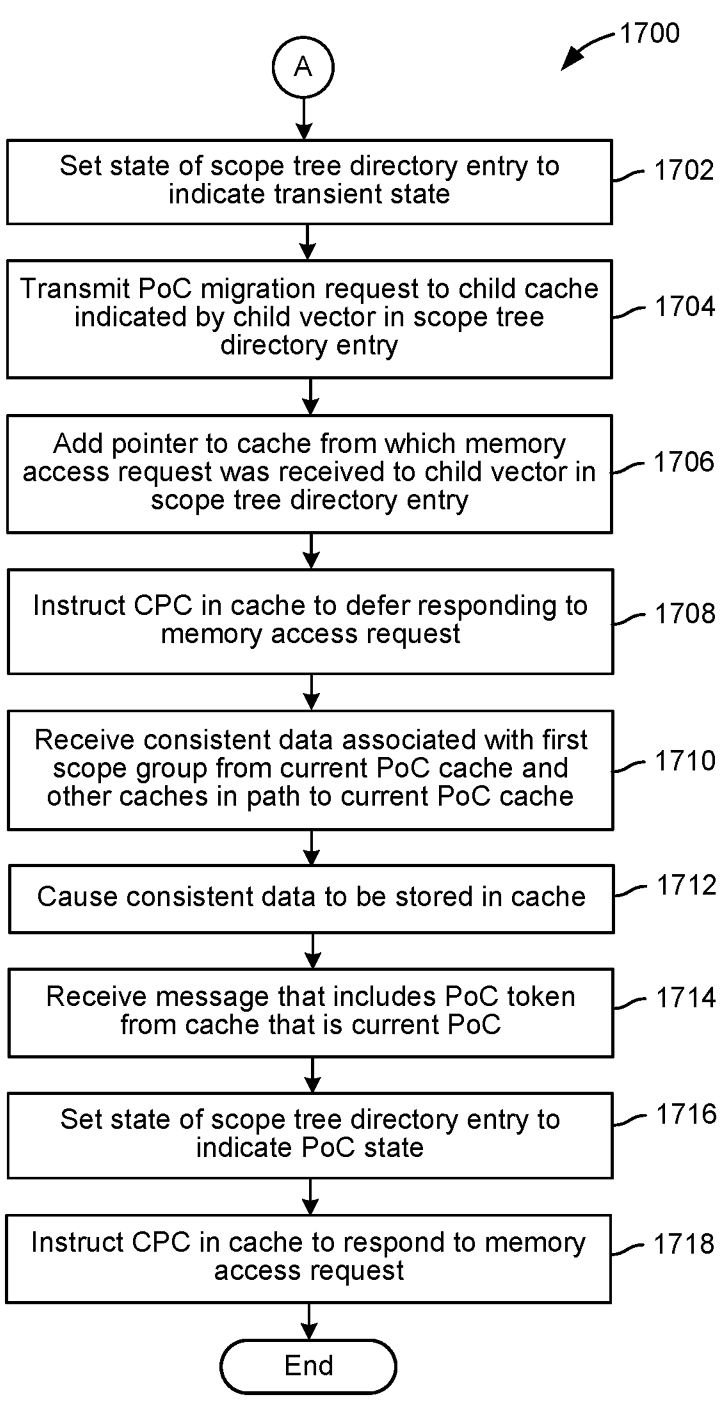
FIG. 17 is a flow diagram of method steps for migrating a point of coherence upstream in a scope tree, according to various embodiments.

FIG. 17 is a flow diagram of method steps for migrating a point of coherence upstream in a scope tree, according to various embodiments. The method operations can be performed by one or more of the STPCs 505. Additionally or alternatively, the method operations can be performed by one or more of the CPC 510, the SMs 310, processing units and/or alternative accelerators including, without limitation, CPUs, GPUs, DMA units, IPUs, NPUs, TPUs, NNPs, DPUs, VPUs, ASICS, FPGAs, and/or the like, in any combination. Furthermore, one or more of the method operations can be performed atomically by multiple STPCs 505 and/or SMs 310 executing in parallel. Although the method operations are described in conjunction with the systems of FIGS. 1-16E, persons of ordinary skill in the art will understand that any system configured to perform the method operations, in any order, is within the scope of the present disclosure.

As shown, a method 1700 begins at operation 1702, where after receiving a memory access request associated with a first scope group, determining that an entry associated with the first scope group exists in a scope tree directory, and determining that a scope tree directory entry associated with the first scope group is in a root state at operations 1102, 1104, and 1128 of the method 1100, respectively, an STPC in a cache sets the state of the scope tree directory entry to a transient state.

At operation 1704, the STPC transmits a point of coherence migration request to a child cache indicated by the child vector in the scope tree directory entry associated with the first scope group. The point of coherence migration request is a request for the one of the child cache or descendants of the child cache that is currently the point of coherence to migrate the point of coherence to the cache that includes the STPC. It should be understood that the cache has only a single child cache because the cache was previously in the root state and each root state cache has a single child cache.

At operation 1706, the STPC adds a pointer to the cache from which the memory access request was received at operation 1102 to the child vector of the entry associated with the first scope group.

At operation 1708, the STPC instructs the CPC in the cache to defer responding to the memory access request until after the point of coherence migration is completed.

At operation 1710, the STPC receives consistent data (e.g., via the Write-Back.SG2 message described above in conjunction with FIG. 16D) associated with the first scope group from a cache that is the current point of coherence and other cache(s), if any, between the cache that includes the STPC and the cache that is the current point of coherence. The consistent data can include dirty data that is transmitted upstream through other caches in the path from the current point of coherence to the current STPC, if any, to the cache that includes the STPC. It should be noted that the point of coherence migration request transmitted by the STPC at operation 1704 to the current point of coherence cache may be forwarded by zero or more child caches (in the root state) that are in the path between the STPC and the point of coherence cache. For all such child caches in the path, the point of coherence migration request causes the CPCs in the child caches to write back any dirty data associated with the scope group to the STPC cache in the transient state. Doing so ensures the data is consistent. In response to the point of coherence migration request, the STPC in the current point of coherence cache will also transmit a message that includes a point of coherence token (e.g., the PoCGrant.SG2 message described above in conjunction with FIG. 16D) and grants the point of coherence. In some embodiments, the message that includes the point of coherence token behaves when traveling upstream like a release operation by checking that every child cache has completed the write back of all dirty data to the STPC cache in the transient state. Only when the write back of each cache that forwards the message that includes the point of coherence token to the cache in the transient state is completed is the message that includes the point of coherence token forwarded to the next parent cache. Forwarding the message that includes the point of coherence token through all child caches to the cache that issued the point of coherence migration request helps ensure that all child caches in the path have completed writing back their local dirty data to the cache that transmitted the point of coherence migration request.

At operation 1712, the STPC causes the cache that includes the STPC to store the consistent data. In some embodiments, the STPC can control a CPC in the cache to store the consistent data in one or more data entries associated with the first scope group. Although described with respect to storing the consistent data for simplicity, when the CPC is unable to store all of the consistent data, the data that cannot be stored is forwarded upstream to a parent cache or, if the cache is the highest level cache, the data that cannot be stored is written to memory.

At operation 1714, the STPC further receives a message that includes a point of coherence token (e.g., the PoCGrant.SG2 message described above in conjunction with FIG. 16D) from a cache that is the current point of coherence. Generation of such a message that includes the point of coherence token and forwarding of the same through all child caches in the path between the cache that is the current point of coherence and the cache that issued the point of coherence migration request is described above in conjunction with operation 1710.

At operation 1716, the STPC sets a state of the scope tree directory entry associated with the first scope group to indicate the point of coherence state.

At operation 1718, the STPC instructs the CPC in the cache to respond to the memory access request. In some embodiments, the CPC can respond to the memory access request using the consistent data stored in the cache at operation 1712. Although described with respect to responding to the memory access request, if the memory access request instead misses in the CPC, the memory access request is forwarded to a parent cache.

Figure 18:
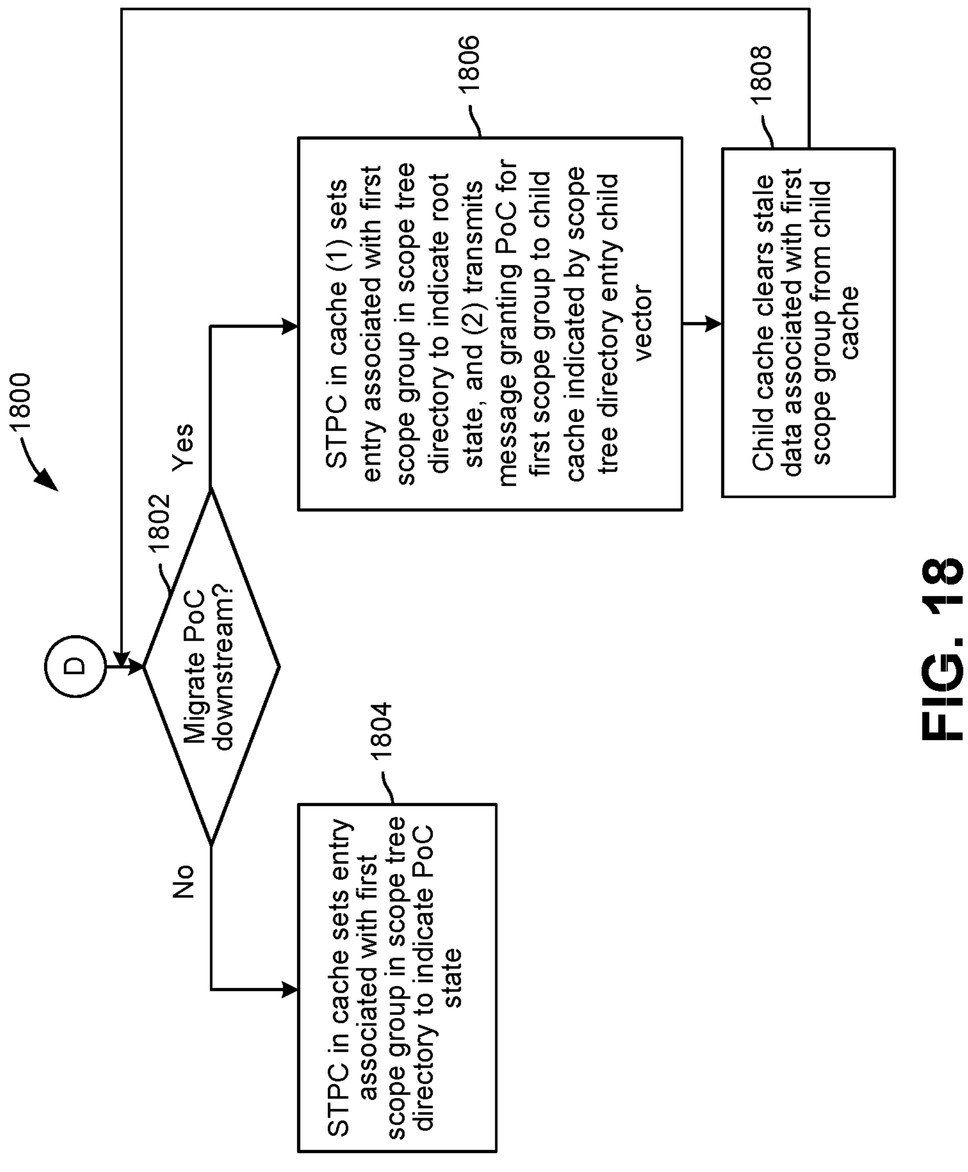
FIG. 18 is a flow diagram of method steps for migrating a point of coherence downstream in a scope tree, according to various embodiments.

FIG. 18 is a flow diagram of method steps for migrating a point of coherence downstream in a scope tree, according to various embodiments. The method operations can be performed by one or more of the STPCs 505. Additionally or alternatively, the method operations can be performed by one or more of the CPC 510, the SMs 310, processing units and/or alternative accelerators including, without limitation, CPUs, GPUs, DMA units, IPUs, NPUs, TPUs, NNPs, DPUs, VPUs, ASICS, FPGAs, and/or the like, in any combination. Furthermore, one or more of the method operations can be performed atomically by multiple STPCs 505 and/or SMs 310 executing in parallel. Although the method operations are described in conjunction with the systems of FIGS. 1-16E, persons of ordinary skill in the art will understand that any system configured to perform the method operations, in any order, is within the scope of the present disclosure.

As shown, a method 1800 begins at operation 1802, where if there is exactly one child cache in the child vector of the entry associated with the first scope group in the scope tree directory of the STPC in the (parent) cache at operation 1432 of the method 1400, an STPC residing in the cache determines whether to migrate the point of coherence downstream. In some embodiments, the STPC can determine to keep the point of coherence at the cache or, instead, to migrate the point of coherence downstream based on any technically feasible criteria. It should be understood that keeping the point of coherence at the cache is correct, but migrating the point of coherence downstream can reduce memory access latencies and improve performance.

If the STPC determines not to migrate the point of coherence downstream, then at operation 1804, the STPC sets an entry associated with a first scope group in a scope tree directory of the STPC to indicate a point of coherence state.

On the other hand, if the STPC determines to migrate the point of coherence downstream, then at operation 1806, the STPC (1) sets the entry associated with the first scope group in the scope tree directory of the STPC to indicate a root state, and (2) transmits a message granting the point of coherence token for the first scope group to a child cache indicated by a child vector of an entry associated with the first scope group that is in the scope tree directory of the STPC.

At operation 1808, the child cache clears stale data associated with the first scope group from the child cache. In some embodiments, the child cache can maintain scope group vectors indicating the scope groups associated with each cache block in cache memory, as described above in conjunction with FIG. 9. The method 1800 then returns to operation 1802, where a STPC in the child cache determines whether to migrate the point of coherence further downstream or, instead, to keep the point of coherence at the child cache.

Figure 19:
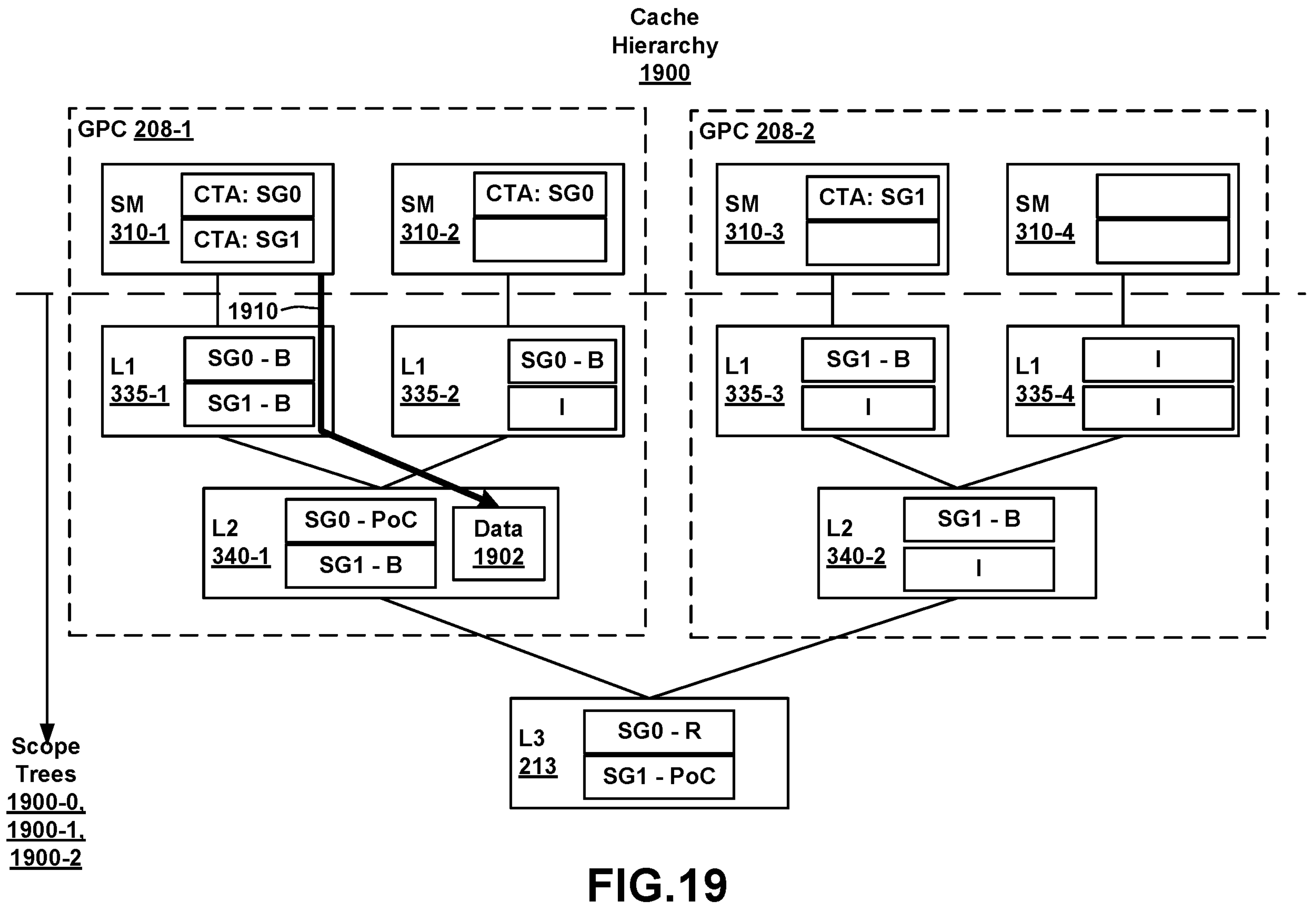
FIG. 19 illustrates a conceptual block diagram of an exemplar memory release operation, according to various embodiments.

FIG. 19 illustrates a conceptual block diagram of an exemplar memory release operation, according to various embodiments. As described, the threads encompassed in a CTA can generally be scheduled on any SMs (or other compute units). The SMs that execute threads in a CTA associated with a scope group can communicate by writing and reading data from caches within a scope tree for the scope group. Advantageously, the writes and reads are limited to the caches within the scope tree, rather than involving all caches in the cache hierarchy, which can reduce access latencies and data movement relative to prior art approaches. The process of communicating by writing and reading data from caches is also sometimes referred to as a "synchronization" operation.

A synchronization operation generally includes a memory release operation, during which data is written by one SM, and a memory acquire operation, during which the data is read by one or more other SMs. In order to enforce coherence within a scope group, all memory accesses from a SM executing a thread associated with the scope group need to become visible at a cache that is the point of coherence for the scope group when a synchronization operation is performed. Accordingly, a unique point of coherence is required for all of the threads associated with a given scope group. By tracking the point of coherence according to the techniques described above in conjunction with FIGS. 5-18, synchronization operations can complete at the cache in the hierarchy that is the point of coherence, which is the cache that is shared by all threads associated with the scope group and can be spatially closest to the cooperating SMs executing the threads. Further, by propagating dirty data to the cache that is the point of coherence, the dirty data becomes visible to all threads associated with the scope group, without requiring the dirty data to be written past the cache that is the point of coherence to higher level caches.

In some embodiments, when an entry for a scope group is allocated for the first time in a scope tree directory of a STPC in a cache memory, all data stored in the cache memory is initially inconsistent for the scope group. However, once a scope tree is constructed, cache memories in the branch state of the scope tree may already include valid data. Whether the data is valid or not for cache memories in the branch state depends on the CPC state, which can indicate a cache line is valid, invalid, etc., as described above in conjunction with FIG. 9. After a first read a cache line is in the state valid. To enforce coherence, the threads associated with the scope group perform synchronization operations that invalidate the data tracked by the cache controllers for the scope group in all caches between the processing unit and the cache that is the point of coherence. The invalidations enforce that accesses subsequent to the synchronization read consistent data from the cache that is the point of coherence. The scope tree is not changed during synchronization operations, but the STPCs use the scope tree to determine where the point of coherence is located to guarantee that a load operation fetches consistent data for the subsequent accesses.

An exemplar memory release operation in a synchronization operation is shown in FIG. 19. As shown, a cache hierarchy 1900 includes similar cache memories as the cache hierarchy 500, described above in conjunction with FIG. 5. Although the cache hierarchy 1900 is shown as including three levels of caches, persons skilled in the art will understand that the levels of caches illustrated in FIG. 19 are non-limiting, and that in other examples, fewer or more than three levels of cache can be included in the cache hierarchy 1900.

Illustratively, a SM 310-1 has made a memory release request 1910 that is associated with scope group SG0 (e.g., a "Release. SG0" request). In response to the memory release request 1910, data 1902 associated with the memory release request 1910 is written through L1 cache 335-1, which is a branch of the scope tree for scope group SG0, and down to L2 cache 340-1, which is the point of coherence for scope group SG0. The data 1902 is then stored in the L2 cache 340-1. Notably, the data 1902 is not further written down to the L3 cache 213, which is a root of the scope tree for scope group SG0. Accordingly, memory access latencies and data movement are reduced relative to if the data 1902 were written down to the L3 cache 213.

In some embodiments, on a release operation issued by a thread associated with a given scope group, the STPC in a cache that is the point of coherence for the scope group can ensure that all preceding loads and stores have completed at the point-of-coherence cache. In some embodiments, to reduce write and release coherence traffic from SMs, the STPCs are also able to handle write-back caches, allowing the STPCs to effectively confine the coherence traffic to caches below the point-of-coherence cache. In such cases, write-back hardware support can permit the STPCs to coalesce partial writes to the same cacheline without requiring extra hardware. To reduce the burstiness of write-back traffic on a release, caches downstream of the point-of-coherence cache can eagerly write-back dirty cache lines and maintain only a clean copy when upstream interconnect bandwidth becomes available.

Figure 20:
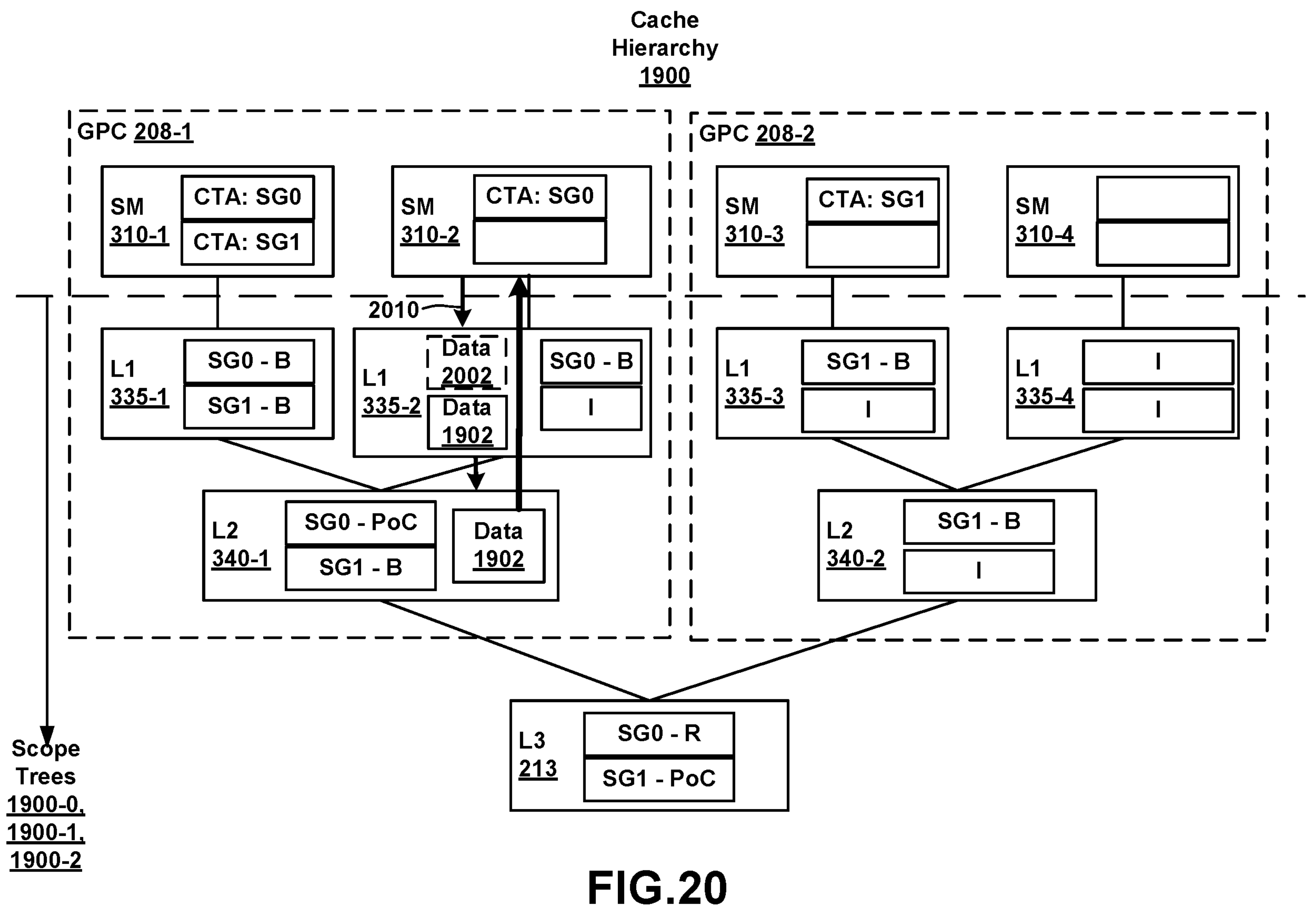
FIG. 20 illustrates a conceptual block diagram of an exemplar memory acquire operation, according to various embodiments.

FIG. 20 illustrates a conceptual block diagram of an exemplar memory acquire operation, according to various embodiments. Although the cache hierarchy 1900 in FIG. 20, which is the same as the cache hierarchy in FIG. 19, is shown as including three levels of caches, persons skilled in the art will understand that the levels of caches illustrated in FIG. 20 are non-limiting, and that in other examples, fewer or more than three levels of cache can be included in the cache hierarchy 1900. As shown, a memory acquire request 2010 by SM 310-2 that is associated with scope group SG0 can result in a determination that L1 cache 335-2 is a branch of the scope tree for scope group SG0. In some embodiments, the L1 cache 335-2 can be identified as a branch of the scope tree for scope group SG0 based on a scope tree directory entry associated with the scope group SG0 maintained by an STPC in L1 cache 335-2. In response to determining that the L1 cache 335-2 is a branch of the scope tree, data 2002 associated with the scope group SG0 or specified by the memory acquire request 2010 is deleted (shown in ghosted lines) from the L1 cache 335-2. Deleting the data 2002 ensures that subsequent reads of such data associated with the scope group SG0 will miss in the L1 cache 335-2, resulting in the most recent updated data being fetched from a higher level cache that is a point of coherence for scope group SG0, shown as L2 cache 340-1. Neither the cache that is the point of coherence, nor any caches upstream of the point-of-coherence cache in the cache hierarchy needs to invalidate data associated with the scope group SG0 that is stored in those caches. Instead, only caches that are descendants of the point-of-coherence cache need to perform self-invalidations. In some embodiments, an ID of the scope group (e.g., SG0) is used to mask the self-invalidations such that only cache lines associated with the scope group become invalid. In addition, data that is stored in the caches below the point-of-coherence cache and that are not associated with the scope group SG0 do not need to be invalidated, effectively shielding such data from being falsely acquired. Accordingly, data can be retained in caches that are in relatively close proximity to SMs (or other computational units) with requiring data stored in caches upstream of a point-of-coherence cache to be invalidated, thereby improving the performance and energy efficiency of a processing unit, such as a GPU, especially as caches grow ever larger.

In the example of FIG. 20, the L2 cache 340-1 is identified as the point of coherence of scope group SG0 based on an associated scope tree directory entry in the L2 cache 340-1.

In response to such an identification, data 1902 to satisfy the memory acquire request 2010 is fetched from the L2 cache 340-1 and returned to the SM 310-2. A copy of the fetched data 1902 can also be stored in the L1 cache 335-2. Further, the memory acquire does not involve the L3 cache 213, and data in the L3 cache 213 is not cleared out during the memory acquire operation.

Figure 21:
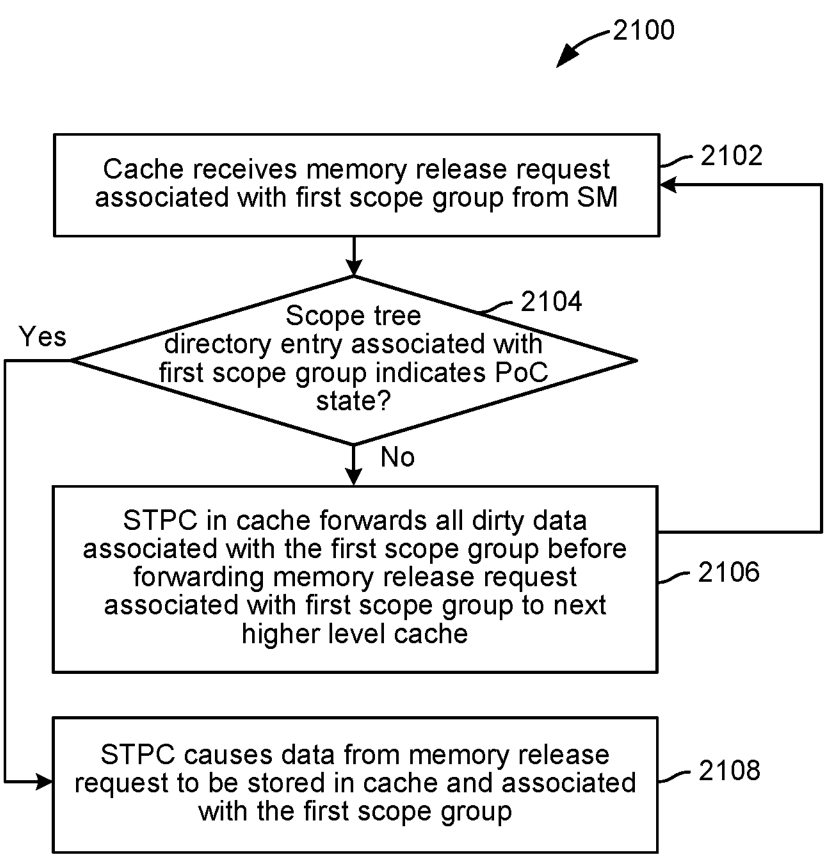
FIG. 21 is a flow diagram of method steps for performing a memory release operation, according to various embodiments.

As illustrated in FIGS. 20-21, scope groups can be used to limit how far membars (release operations) and cache self-invalidations (acquire operations) need to be conveyed upstream in a cache hierarchy. As described, the point of coherence can be the lowest level cache in the scope tree that is visible to all SMs serving threads of a scope group. By tracking the point of coherence, memory access traffic can be confined to lower-level cache hierarchies, while avoiding cache levels above the point-of-coherence cache. In addition, synchronizations using scope groups can guarantee visibility of memory accesses among threads associated with the scope groups.

Although described herein primarily with respect to release and acquire operations as reference examples of memory access operations, other types of operations (e.g., atomics, matrix multiply accumulate (MMA), other barriers, etc. operations) can also be performed using scope groups in some embodiments. For example, in some embodiments, atomic operations associated with a given scope group can be served at a cache that is the point of coherence for the given scope group. In such cases, the scope group can enable fast scoped atomics at the point-of-coherence cache. As another example, in some embodiments, other types of barriers that behave differently, such as a full barrier that writes back dirty data and also invalidates all local copies, can be implemented.

FIG. 21 is a flow diagram of method steps for performing a memory release operation, according to various embodiments. The method operations can be performed by one or more of the STPCs 505. Additionally or alternatively, the method operations can be performed by one or more of the CPC 510, the SMs 310, processing units and/or alternative accelerators including, without limitation, CPUs, GPUs, DMA units, IPUs, NPUs, TPUs, NNPs, DPUs, VPUs, ASICs, FPGAs, and/or the like, in any combination. Furthermore, one or more of the method operations can be performed atomically by multiple STPCs 505 and/or SMs 310 executing in parallel. Although the method operations are described in conjunction with the systems of FIGS. 1-20, persons of ordinary skill in the art will understand that any system configured to perform the method operations, in any order, is within the scope of the present disclosure.

As shown, a method 2100 begins at operation 2102, where a cache receives a memory release request associated with a first scope group (e.g., the memory release request 1910 described above in conjunction with FIG. 19). The memory release request can be made by an SM executing thread(s) associated with the first scope group.

At operation 2104, a STPC residing in the cache determines whether an entry associated with the first scope group in a scope tree directory of the STPC indicates the cache is in a point of coherence state. Operation 2104 assumes that the entry associated with the first scope group exists in the scope tree directory of the STPC. If no such entry exists, then the STPC can grow the scope tree in response to the memory release request, as described above in conjunction with FIG. 11.

If the scope tree directory entry associated with the first scope group does not indicate a point of coherence state, then at operation 2106, the cache forwards all dirty data associated with the first scope group before forwarding the memory release request associated with the first scope group to a next higher level, parent cache. The release memory request acts as a flush for the dirty data in all branch caches that the release memory request traverses, pushing dirty data upstream on the way to the point of coherence. Any branch cache can potentially hold dirty data associated with a scope group, as the dirty data in the caches may be evicted as time passes and therefore is sent by the caches towards the highest level cache and backing memory. The method 2100 then returns to operation 2102, where the parent cache receives the memory release request and a STPC of the parent cache determines whether a scope tree directory entry associated with the first scope group indicates a point of coherence state, etc.

On the other hand, if the scope tree directory entry associated with the first scope group indicates the point of coherence state, then at operation 2108, the STPC causes the CPC in the cache to store data from the memory release request and associate the stored data with the first scope group. In some embodiments, the CPC maintains scope group vector(s) for cache block(s) that store the data from the memory writes and releases, and the scope group vector(s) include the first scope group to indicate the association between the data stored in the cache block(s) and the first scope group, as described above in conjunction with FIG. 9.

Figure 22:
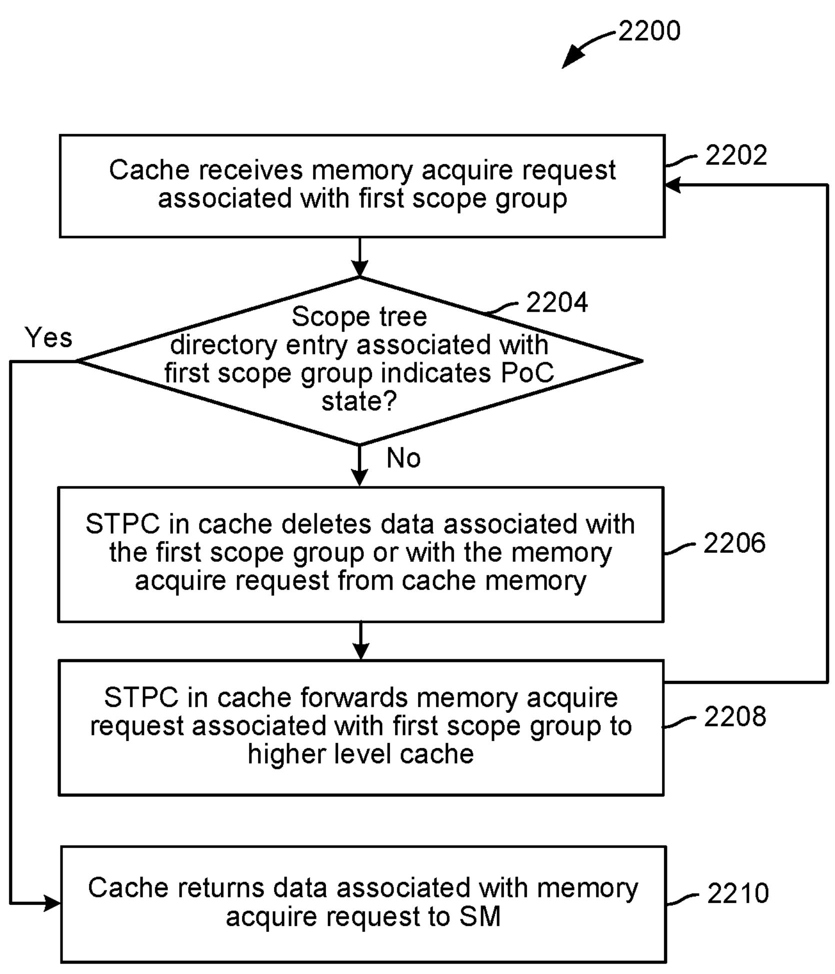
FIG. 22 is a flow diagram of method steps for performing a memory acquire operation, according to various embodiments.

FIG. 22 is a flow diagram of method steps for performing a memory acquire operation, according to various embodiments. The method operations can be performed by one or more of the STPCs 505. Additionally or alternatively, the method operations can be performed by one or more of the CPC 510, the SMs 310, processing units and/or alternative accelerators including, without limitation, CPUs, GPUs, DMA units, IPUs, NPUs, TPUs, NNPs, DPUs, VPUs, ASICs, FPGAs, and/or the like, in any combination. Furthermore, one or more of the method operations can be performed atomically by multiple STPCs 505 and/or SMs 310 executing in parallel. Although the method operations are described in conjunction with the systems of FIGS. 1-21, persons of ordinary skill in the art will understand that any system configured to perform the method operations, in any order, is within the scope of the present disclosure.

As shown, a method 2200 begins at operation 2202, where a cache receives a memory acquire request associated with a first scope group (e.g., the memory acquire request 2010 described above in conjunction with FIG. 20). The memory acquire request can be made by an SM executing thread(s) associated with the first scope group.

At operation 2204, a STPC residing in the cache determines whether an entry associated with the first scope group in a scope tree directory of the STPC indicates the cache is in a point of coherence state. Operation 2204 assumes that the entry associated with the first scope group exists in the scope tree directory of the STPC. If no such entry exists, then the STPC can grow the scope tree in response to the memory acquire request, as described above in conjunction with FIG. 11.

If the STPC residing in the cache determines that the scope tree directory entry associated with the first scope group does not indicate the point of coherence state, then at operation 2206, the STPC causes data associated with the first scope group or with the memory acquire request to be deleted from the cache. The STPC causes the data associated with the first scope group or with the memory acquire request to be deleted because the cache is not the point of coherence and may, therefore, be storing out-of-date, invalid data. In some embodiments, any data associated with the scope group that is not dirty is invalidated. Otherwise, a subsequent load operation to another cache block may read stale data, thereby violating release consistency that is used for synchronization.

At operation 2208, the STPC residing in the cache forwards the memory acquire request associated with the first scope group to a higher level, parent cache. The method 2200 then returns to operation 2202, where the parent cache receives the memory acquire request, an STPC of the parent cache determines whether scope tree directory entry maintained by the STPC indicates a point of coherence state, etc.

On the other hand, if the STPC residing in the cache determines at operation 2204 that the scope tree directory entry associated with the first scope group indicates the point of coherence state, then at operation 2210, the STPC causes a CPC in the cache to return data associated with a memory acquire request to the SM that initiated the memory acquire request.

In sum, various embodiments include techniques for addressing cache coherency problems in multiprocessor and multicore systems. With the disclosed techniques, when one or more processing units coupled to a cache hierarchy execute threads in a scope group, a scope tree controller that is implemented as a distributed set of directories within cache memories of the cache hierarchy can construct a scope tree for the scope group. The scope tree is used to track respective scope group states of cache memories in the cache hierarchy and to determine whether data stored in a particular cache memory that is being used to serve a memory access request is consistent with other data associated with a scope group and stored in the cache hierarchy. In this regard, the scope tree controller prevents inconsistent data from being served to a processing unit executing threads in a scope group when one or more other processing units are executing threads in the same scope group. Furthermore, with the disclosed techniques, the scope tree controller can also migrate the point of coherence for a scope group within the cache hierarchy. In this regard, the scope tree controller can migrate the point of coherence for a particular scope group to a level of cache memory in the cache hierarchy that is visible to all processing units executing threads associated with the scope group and positioned closest to the processing units.

At least one technical advantage is that the disclosed techniques can be more readily scaled relative to prior art approaches, which allows the disclosed techniques to be implemented more effectively in multiprocessor or multicore systems that include a relatively larger number of processors, cores, and/or levels of cache. Another technical advantage of the disclosed techniques relative to the prior art is that, with the disclosed techniques, the cache within a cache hierarchy at which data associated with a given scope is written to and read from can be determined dynamically at runtime based on the number and/or locations of the processors or cores executing threads associated with the given scope group. With the disclosed techniques, overall cache use is more efficient relative to prior art approaches because data associated with scope groups can be written to and read from lower levels of cache (e.g., level one), thereby reducing access latencies and data movement relative to prior art approaches. These technical advantages provide one or more technological improvements over prior art approaches.

1. In some embodiments, a computer-implemented method for migrating a point of coherence in a cache hierarchy comprises receiving, at a first cache memory and from a second cache memory coupled to the first cache memory, a memory access request associated with a first scope group, and in response to determining that a first directory residing within the first cache memory includes a first entry indicating that (i) a third cache memory is a child of the first cache memory in a tree associated with the first scope group, and (ii) the first cache memory is a root of the tree associated with the first scope group performing one or more operations to acquire a point of coherence token from a descendant cache memory of the first cache memory in the tree associated with the first scope group, and updating the first entry to indicate that the first cache memory is a point of coherence of the tree associated with the first scope group.

2. The computer-implemented method of clause 1, further comprising updating a second entry in a second directory residing within the descendant cache memory to indicate that the descendant cache memory is a branch of the tree associated with the first scope group.

3. The computer-implemented method of clauses 1 or 2, wherein performing the one or more operations to acquire the point of coherence token comprises transmitting, from the first cache memory to the descendant cache memory, a request for the point of coherence token, updating the first entry to indicate that the first cache memory is in a transient state, and receiving the point of coherence token from the descendant cache memory, wherein the first entry is updated from indicating that the first cache memory is in the transient state to indicating that the first cache memory is the point of coherence.

4. The computer-implemented method of any of clauses 1-3, further comprising receiving, from the descendant cache memory, consistent data associated with the first scope group and the memory access request, storing the consistent data in the first cache memory, and responding to the memory access request with the consistent data.

5. The computer-implemented method of any of clauses 1-4, further comprising causing a controller to defer responding to the memory access request until after the consistent data is received from the descendant cache memory.

6. The computer-implemented method of any of clauses 1-5, wherein the first entry comprises a vector that includes a pointer to the third cache memory.

7. The computer-implemented method of any of clauses 1-6, wherein the descendant cache memory is the third cache memory.

8. The computer-implemented method of any of clauses 1-7, further comprising updating the first entry to indicate that the second cache memory is a child of the first cache memory in the tree associated with the first scope group.

9. The computer-implemented method of any of clauses 1-8, wherein the first cache memory resides in a first level of a cache hierarchy and the second cache memory resides in a second level of the cache hierarchy.

10. The computer-implemented method of any of clauses 1-9, wherein the second level of the cache hierarchy is closer than the first level of the cache hierarchy to a processing unit that issued the memory access request.

11. In some embodiments, one or more non-tangible computer readable media include instructions that, when executed, cause a scope tree controller to perform the steps of receiving, at a first cache memory and from a second cache memory coupled to the first cache memory, a memory access request associated with a first scope group, and in response to determining that a first directory residing within the first cache memory includes a first entry indicating that (i) a third cache memory is a child of the first cache memory in a tree associated with the first scope group, and (ii) the first cache memory is a root of the tree associated with the first scope group performing one or more operations to acquire a point of coherence token from a descendant cache memory of the first cache memory in the tree associated with the first scope group, and updating the first entry to indicate that the first cache memory is a point of coherence of the tree associated with the first scope group.

12. The one or more non-tangible computer readable media of clause 11, wherein the instructions further cause the scope tree controller to perform the step of updating a second entry in a second directory residing within the descendant cache memory to indicate that the descendant cache memory is a branch of the tree associated with the first scope group.

13. The one or more non-tangible computer readable media of clauses 11 or 12, wherein, prior to updating the second entry, the second entry indicates that the descendant cache memory is the point of coherence of the tree associated with the first scope group.

14. The one or more non-tangible computer readable media of any of clauses 11-13, wherein performing the one or more operations to acquire the point of coherence token comprises transmitting, from the first cache memory to the descendant cache memory, a request for the point of coherence token, updating the first entry to indicate that the first cache memory is in a transient state, and receiving the point of coherence token from the descendant cache memory, wherein the first entry is updated from indicating that the first cache memory is in the transient state to indicating that the first cache memory is the point of coherence.

15. The one or more non-tangible computer readable media of any of clauses 11-14, wherein the instructions further cause the scope tree controller to perform the steps of receiving, from the descendant cache memory, consistent data associated with the first scope group and the memory access request, storing the consistent data in the first cache memory, and responding to the memory access request with the consistent data.

16. The one or more non-tangible computer readable media of any of clauses 11-15, wherein the instructions further cause the scope tree controller to perform the step of causing a controller to defer responding to the memory access request until after the consistent data is received from the descendant cache memory.

17. The one or more non-tangible computer readable media of any of clauses 11-16, wherein the descendant cache memory is the third cache memory.

18. The one or more non-tangible computer readable media of any of clauses 11-17, wherein the first cache memory resides in a first level of a cache hierarchy and the second cache memory resides in a second level of the cache hierarchy, and the second level of the cache hierarchy is closer than the first level of the cache hierarchy to a processing unit that issued the memory access request.

19. The one or more non-tangible computer readable media of any of clauses 11-18, wherein the second cache memory is coupled to a processing unit that issued the memory access request.

20. In some embodiments, a system comprises a portion of a scope tree controller that resides within a first cache memory in a cache hierarchy, wherein, in operation, the portion of the scope tree controller receives, from a second cache memory coupled to the first cache memory, a memory access request associated with a first scope group, and in response to determining that a first directory residing within the first cache memory includes a first entry indicating that (i) a third cache memory is a child of the first cache memory in a tree associated with the first scope group, and (ii) the first cache memory is a root of the tree associated with the first scope group performs one or more operations to acquire a point of coherence token from a descendant cache memory of the first cache memory in the tree associated with the first scope group, and updates the first entry to indicate that the first cache memory is a point of coherence of the tree associated with the first group.

1. In some embodiments, a computer-implemented method for growing a tree associated with a first scope group in a cache hierarchy comprises receiving, at a first cache memory, a memory access request associated with the first scope group, in response to determining that a first directory residing within the first cache memory does not include an entry associated with the first scope group, allocating a first entry associated with the first scope group in the first directory, and setting the first entry to indicate that the first cache memory is a branch of the tree associated with the first scope group.

2. The computer-implemented method of clause 1, further comprising forwarding the memory access request to a second cache memory that is coupled to the first cache memory, in response to determining that a second directory residing within the second cache memory does not include an entry associated with the first scope group, allocating a second entry associated with the first scope group in the second directory, and adding a pointer to the first cache memory to a vector included in the second entry, wherein the vector indicates one or more child cache memories of the second cache memory in the tree associated with the first scope group.

3. The computer-implemented method of clauses 1 or 2, further comprising, in response to determining that the second cache memory is a highest level cache memory: setting the second entry to indicate the second cache memory is a root of the tree associated with the first scope group, and transmitting a first message that grants a point of coherence token from the second cache memory to the first cache memory.

4. The computer-implemented method of any of clauses 1-3, further comprising, in response to determining that the first cache memory is visible to all processing units that execute one or more threads associated with the first scope group, updating the first entry to indicate the first cache memory is a point of coherence of the tree associated with the first scope group.

5. The computer-implemented method of any of clauses 1-4, further comprising determining to remove the first entry associated with the first scope group from the first directory, in response to determining that the first entry indicates the first cache memory is the point of coherence of the tree associated with the first scope group, transmitting a second message that grants the point of coherence token from the first cache memory to the second cache memory, and removing the first entry associated with the first scope group from the first directory.

6. The computer-implemented method of any of clauses 1-5, further comprising, in response to determining that the vector included in the second cache memory is empty, removing the second entry associated with the first scope group from the second directory.

7. The computer-implemented method of any of clauses 1-6, further comprising determining to remove the first entry associated with the first scope group from the first directory, in response to determining that the first entry indicates the first cache memory is the branch of the tree associated with the first scope group, transmitting, from the first cache memory to the second cache memory, a message to detach the first cache memory from the tree associated with the first scope group, and removing the first entry associated with the first scope group from the first directory.

8. The computer-implemented method of any of clauses 1-7, wherein the determining to remove the first entry is based on the termination of a thread associated with the first scope group on a first processing unit that transmitted the memory access request.

9. The computer-implemented method of any of clauses 1-8, wherein the determining to remove the first entry is based on a replacement policy.

10. The computer-implemented method of any of clauses 1-9, wherein the removing the first entry from the first directory comprises updating the first entry to indicate a null state.

11. In some embodiments, one or more non-tangible computer readable media include instructions that, when executed, cause a scope tree controller to perform the steps of receiving, at a first cache memory, a memory access request associated with a first scope group, in response to determining that a first directory residing within the first cache memory does not include an entry associated with the first scope group, allocating a first entry associated with the first scope group in the first directory, and setting the first entry to indicate that the first cache memory is a branch of a tree associated with the first scope group.

12. The one or more non-tangible computer readable media of clause 11, wherein the instructions further cause the scope tree controller to perform the steps of forwarding the memory access request to a second cache memory that is coupled to the first cache memory, in response to determining that a second directory residing within the second cache memory does not include an entry associated with the first scope group, allocating a second entry associated with the first scope group in the second directory, and adding a pointer to the first cache memory to a vector included in the second entry, wherein the vector indicates one or more child cache memories of the second cache memory in the tree associated with the first scope group.

13. The one or more non-tangible computer readable media of clauses 11 or 12, wherein the instructions further cause the scope tree controller to perform the steps of, in response to determining that the second cache memory is a highest level cache memory: setting the second entry to indicate the second cache memory is a root of the tree associated with the first scope group, and transmitting a first message that grants a point of coherence token from the second cache memory to the first cache memory.

14. The one or more non-tangible computer readable media of any of clauses 11-13, wherein the instructions further cause the scope tree controller to perform the step of, in response to determining that the first cache memory is visible to all processing units that execute one or more threads associated with the first scope group, updating the first entry to indicate the first cache memory is a point of coherence of the tree associated with the first scope group.

15. The one or more non-tangible computer readable media of any of clauses 11-14, wherein the instructions further cause the scope tree controller to perform the steps of determining to remove the first entry associated with the first scope group from the first directory, in response to determining that the first entry indicates the first cache memory is the point of coherence of the tree associated with the first scope group, transmitting a second message that grants the point of coherence token from the first cache memory to the second cache memory, and removing the first entry associated with the first scope group from the first directory.

16. The computer-implemented method of any of clauses 11-15, wherein the instructions further cause the scope tree controller to perform the step of, in response to determining that the vector included in the second cache memory is empty, removing the second entry associated with the first scope group from the second directory.

17. The one or more non-tangible computer readable media of any of clauses 11-16, wherein the instructions further cause the scope tree controller to perform the steps of determining to remove the first entry associated with the first scope group from the first directory, in response to determining that the first entry indicates the first cache memory is the branch of the tree associated with the first scope group, transmitting, from the first cache memory to the second cache memory, a message to detach the first cache memory from the tree associated with the first scope group, and removing the first entry associated with the first scope group from the first directory.

18. The one or more non-tangible computer readable media of any of clauses 11-17, wherein the determining to remove the first entry is based on the termination of a thread associated with the first scope group on a first processing unit that transmitted the memory access request.

19. The one or more non-tangible computer readable media of any of clauses 11-18, wherein the determining to remove the first entry is based on a replacement policy.

20. In some embodiments, a system comprises a portion of a scope tree controller that resides within a first cache memory in a cache hierarchy, wherein, in operation, the portion of the scope tree controller receives a memory access request associated with a first scope group, in response to determining that a first directory residing within the first cache memory does not include an entry associated with the first scope group, allocates a first entry associated with the first scope group in the first directory, and sets the first entry to indicate that the first cache memory is a branch of a tree associated with the first scope group.

1. In some embodiments, a computer-implemented method for performing a synchronization operation comprises receiving, at a first cache memory, a memory release request that is associated with a first scope group, in response to determining that the first cache memory is a point of coherence of the first scope group, storing first data included in the memory release request in the first cache memory, receiving, at the first cache memory, a memory acquire request associated with the first scope group, and in response to determining that the first cache memory is the point of coherence of the first scope group, responding to the memory acquire request with the first data stored in the first cache memory.

2. The computer-implemented method of clause 1, wherein the first cache memory is determined to be the point of the coherence of the first scope group based on information in a directory residing within the first cache memory.

3. The computer-implemented method of clauses 1 or 2, wherein the first cache memory is determined to be the point of coherence of the first scope group based on a tree of one or more cache memories associated with the first scope group, and the tree of cache memories is maintained via one or more directories residing within the one or more cache memories.

4. The computer-implemented method of any of clauses 1-3, further comprising receiving, at a second cache memory, the memory release request that is associated with the first scope group, and in response to determining that the second cache memory is not a point of coherence of the first scope group, forwarding the memory release request from the second cache memory to the first cache memory.

5. The computer-implemented method of any of clauses 1-4, further comprising writing back dirty data associated with the first scope group from the second cache memory to the first cache memory.

6. The computer-implemented method of any of clauses 1-5, further comprising receiving, at a second cache memory, the memory acquire request that is associated with the first scope group, and in response to determining that the second cache memory is not a point of coherence of the first scope group removing inconsistent data associated with the first scope group and the memory acquire request from the second cache memory, and forwarding the memory acquire request to the first cache memory.

7. The computer-implemented method of any of clauses 1-6, further comprising in response to determining second data associated with the memory acquire request is not stored in the first cache memory, forwarding the memory acquire request to a third cache memory that is a root of the first scope group.

8. The computer-implemented method of any of clauses 1-7, wherein the memory release request and the memory acquire request are issued by a plurality of threads executing on different processing units.

9. The computer-implemented method of any of clauses 1-8, wherein the plurality of threads are annotated as belonging to the first scope group by a driver, by a scheduler, or within code of an application.

10. The computer-implemented method of any of clauses 1-9, wherein the first cache memory is visible to all processing units that execute one or more threads associated with the first scope group.

11. In some embodiments, one or more non-tangible computer readable media include instructions that, when executed, cause a first cache memory to perform the steps of receiving, at the first cache memory, a memory release request that is associated with a first scope group, in response to determining that the first cache memory is a point of coherence of the first scope group, storing first data included in the memory release request in the first cache memory, receiving, at the first cache memory, a memory acquire request associated with the first scope group, and in response to determining that the first cache memory is the point of coherence of the first scope group, responding to the memory acquire request with the first data stored in the first cache memory.

12. The one or more non-tangible computer readable media of clause 11, wherein the first cache memory is determined to be the point of the coherence of the first scope group based on information in a directory residing within the first cache memory.

13. The one or more non-tangible computer readable media of clauses 11 or 12, wherein the first cache memory is determined to be the point of coherence of the first scope group based on a tree of one or more cache memories associated with the first scope group, and the tree of cache memories is maintained via one or more directories residing within the one or more cache memories.

14. The one or more non-tangible computer readable media of any of clauses 11-13, wherein the instructions further cause a second cache memory to perform the steps of receiving, at the second cache memory, the memory release request that is associated with the first scope group, and in response to determining that the second cache memory is not a point of coherence of the first scope group, forwarding the memory release request to the first cache memory.

15. The one or more non-tangible computer readable media of any of clauses 11-14, wherein the instructions further cause the second cache memory to perform the step of writing back dirty data associated with the first scope group from the second cache memory to the first cache memory.

16. The one or more non-tangible computer readable media of any of clauses 11-15, wherein the instructions further cause a second cache memory to perform the steps of receiving, at the second cache memory, the memory acquire request that is associated with the first scope group, and in response to determining that the second cache memory is not a point of coherence of the first scope group removing inconsistent data associated with the first scope group and the memory acquire request from the second cache memory, and forwarding the memory acquire request to the first cache memory.

17. The one or more non-tangible computer readable media of any of clauses 11-16, wherein the second cache memory is closer to the first processing unit than the first cache hierarchy.

18. The one or more non-tangible computer readable media of any of clauses 11-17, wherein the first cache memory is visible to all processing units that execute one or more threads associated with the first scope group.

19. The one or more non-tangible computer readable media of any of clauses 11-18, wherein the memory release request and the memory acquire request are issued by a plurality of threads that execute on different processing units and are associated with the first scope group.

20. In some embodiments, a system comprises a first portion of a scope tree controller that resides within a first cache memory in a cache hierarchy, wherein, in operation, the first portion of the scope tree controller receives a memory release request that is associated with a first scope group, in response to determining that the first cache memory is a point of coherence of the first scope group, causes first data included in the memory release request to be stored in the first cache memory, receives a memory acquire request associated with the first scope group, and in response to determining that the first cache memory is the point of coherence of the first scope group, causes a response to the memory acquire request with the first data stored in the first cache memory.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and/or variations will be apparent to those of ordinary skill in the art without departing from the scope and/or spirit of the described embodiments.

Aspects of the present embodiments can be embodied as a system, method, or computer program product. Accordingly, aspects of the present disclosure can take the form of an entirely hardware embodiment, an entirely software embodiment (including firmware, resident software, micro-code, etc.) or an embodiment combining software and/or hardware aspects that can all generally be referred to herein as a "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described herein with reference to flowchart illustrations and/or block diagrams of methods, apparatus (systems) and/or computer program products according to embodiments of the disclosure. It will be understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors can be, without limitation, general purpose processors, special-purpose processors, application-specific processors, or field-programmable gate arrays.

The flowcharts and/or block diagrams in the figures illustrate the architecture, functionality, and/or operation of possible implementations of systems, methods, and/or computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that perform the specified functions or acts, or combinations of special purpose hardware and/or computer instructions.

While the preceding is directed to embodiments of the present disclosure, other and/or further embodiments of the disclosure can be devised without departing from the basic scope thereof, and/or the scope thereof is determined by the claims that follow.

What is claimed is:

1. A computer-implemented method for migrating a point of coherence in a cache hierarchy, the method comprising:

receiving, at a first cache memory and from a second cache memory coupled to the first cache memory, a memory access request associated with a first scope group; and in response to determining that a first directory residing within the first cache memory includes a first entry indicating that (i) a third cache memory is a child of the first cache memory in a tree associated with the first scope group, and (ii) the first cache memory is a root of the tree associated with the first scope group:

performing one or more operations to acquire a point of coherence token from a descendant cache memory of the first cache memory in the tree associated with the first scope group, and updating the first entry to indicate that the first cache memory is a point of coherence of the tree associated with the first scope group.

2. The computer-implemented method of claim 1, further comprising updating a second entry in a second directory residing within the descendant cache memory to indicate that the descendant cache memory is a branch of the tree associated with the first scope group.

3. The computer-implemented method of claim 1, wherein performing the one or more operations to acquire the point of coherence token comprises:

transmitting, from the first cache memory to the descendant cache memory, a request for the point of coherence token;

updating the first entry to indicate that the first cache memory is in a transient state; and receiving the point of coherence token from the descendant cache memory, wherein the first entry is updated from indicating that the first cache memory is in the transient state to indicating that the first cache memory is the point of coherence.

4. The computer-implemented method of claim 1, further comprising:

receiving, from the descendant cache memory, consistent data associated with the first scope group and the memory access request;

storing the consistent data in the first cache memory; and responding to the memory access request with the consistent data.

5. The computer-implemented method of claim 4, further comprising causing a controller to defer responding to the memory access request until after the consistent data is received from the descendant cache memory.

6. The computer-implemented method of claim 1, wherein the first entry comprises a vector that includes a pointer to the third cache memory.

7. The computer-implemented method of claim 1, wherein the descendant cache memory is the third cache memory.

8. The computer-implemented method of claim 1, further comprising updating the first entry to indicate that the second cache memory is a child of the first cache memory in the tree associated with the first scope group.

9. The computer-implemented method of claim 1, wherein the first cache memory resides in a first level of a cache hierarchy and the second cache memory resides in a second level of the cache hierarchy.

10. The computer-implemented method of claim 9, wherein the second level of the cache hierarchy is closer than the first level of the cache hierarchy to a processing unit that issued the memory access request.

11. One or more non-transitory computer readable media including instructions that, when executed, cause a scope tree controller to perform the steps of:

receiving, at a first cache memory and from a second cache memory coupled to the first cache memory, a memory access request associated with a first scope group; and in response to determining that a first directory residing within the first cache memory includes a first entry indicating that (i) a third cache memory is a child of the first cache memory in a tree associated with the first scope group, and (ii) the first cache memory is a root of the tree associated with the first scope group:

performing one or more operations to acquire a point of coherence token from a descendant cache memory of the first cache memory in the tree associated with the first scope group, and updating the first entry to indicate that the first cache memory is a point of coherence of the tree associated with the first scope group.

12. The one or more non-transitory computer readable media of claim 11, wherein the instructions further cause the scope tree controller to perform the step of updating a second entry in a second directory residing within the descendant cache memory to indicate that the descendant cache memory is a branch of the tree associated with the first scope group.

13. The one or more non-transitory computer readable media of claim 12, wherein, prior to updating the second entry, the second entry indicates that the descendant cache memory is the point of coherence of the tree associated with the first scope group.

14. The one or more non-transitory computer readable media of claim 11, wherein performing the one or more operations to acquire the point of coherence token comprises:

transmitting, from the first cache memory to the descendant cache memory, a request for the point of coherence token;

updating the first entry to indicate that the first cache memory is in a transient state; and receiving the point of coherence token from the descendant cache memory, wherein the first entry is updated from indicating that the first cache memory is in the transient state to indicating that the first cache memory is the point of coherence.

15. The one or more non-transitory computer readable media of claim 11, wherein the instructions further cause the scope tree controller to perform the steps of:

receiving, from the descendant cache memory, consistent data associated with the first scope group and the memory access request;

storing the consistent data in the first cache memory; and responding to the memory access request with the consistent data.

16. The one or more non-transitory computer readable media of claim 15, wherein the instructions further cause the scope tree controller to perform the step of causing a controller to defer responding to the memory access request until after the consistent data is received from the descendant cache memory.

17. The one or more non-transitory computer readable media of claim 11, wherein the descendant cache memory is the third cache memory.

18. The one or more non-transitory computer readable media of claim 11, wherein the first cache memory resides in a first level of a cache hierarchy and the second cache memory resides in a second level of the cache hierarchy, and the second level of the cache hierarchy is closer than the first level of the cache hierarchy to a processing unit that issued the memory access request.

19. The one or more non-transitory computer readable media of claim 11, wherein the second cache memory is coupled to a processing unit that issued the memory access request.

20. A system comprising:

a portion of a scope tree controller that resides within a first cache memory in a cache hierarchy, wherein, in operation, the portion of the scope tree controller:

receives, from a second cache memory coupled to the first cache memory, a memory access request associated with a first scope group; and in response to determining that a first directory residing within the first cache memory includes a first entry indicating that (i) a third cache memory is a child of the first cache memory in a tree associated with the first scope group, and (ii) the first cache memory is a root of the tree associated with the first scope group:

performs one or more operations to acquire a point of coherence token from a descendant cache memory of the first cache memory in the tree associated with the first scope group, and updates the first entry to indicate that the first cache memory is a point of coherence of the tree associated with the first group.

* * * * *